(12) United States Patent
Kurth et al.

(10) Patent No.: US 9,744,499 B2
(45) Date of Patent: *Aug. 29, 2017

(54) HYBRID NANOPARTICLE TFC MEMBRANES

(71) Applicant: LG NANOH2O, INC., El Segundo, CA (US)

(72) Inventors: Christopher James Kurth, Eden Prairie, MN (US); Jeffrey Alan Koehler, Pasadena, CA (US); Meijuan Zhou, Fremont, CA (US); Brett Anderson Holmberg, Los Angeles, CA (US); Robert Leon Burk, Seattle, WA (US)

(73) Assignee: LG NANOH2O, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,003

(22) Filed: Oct. 8, 2015

(65) Prior Publication Data
US 2016/0030897 A1    Feb. 4, 2016

Related U.S. Application Data

(63) Continuation of application No. 14/305,335, filed on Jun. 16, 2014, now Pat. No. 9,254,465, which is a
(Continued)

(51) Int. Cl.
*B01D 61/00* (2006.01)
*C02F 1/44* (2006.01)
(Continued)

(52) U.S. Cl.
CPC ....... *B01D 67/0006* (2013.01); *B01D 61/002* (2013.01); *B01D 61/025* (2013.01);
(Continued)

(58) Field of Classification Search
CPC .... B01D 61/025; B01D 69/125; B01D 71/56; B01D 2323/36; B01D 67/0079;
(Continued)

(56) References Cited

U.S. PATENT DOCUMENTS

| 3,133,132 A | 5/1964 | Loeb et al. |
| 3,133,137 A | 5/1964 | Loeb et al. |

(Continued)

FOREIGN PATENT DOCUMENTS

| CA | 2388500 | 4/2001 |
| CA | 2600481 | 9/2006 |

(Continued)

OTHER PUBLICATIONS

Alexandre et al., "Polymer-layered silicate nanocomposites: preparation, properties and uses of a new class of materials," Materials Science and Engineering, 28 (2000):1-63.
(Continued)

*Primary Examiner* — Ana Fortuna
(74) *Attorney, Agent, or Firm* — Dentons US LLP

(57) ABSTRACT

Reverse osmosis membranes made by interfacial polymerization of a monomer in a nonpolar (e.g. organic) phase together with a monomer in a polar (e.g. aqueous) phase on a porous support membrane. Interfacial polymerization process is disclosed for preparing a highly permeable RO membrane, comprising: contacting on a porous support membrane, a) a first solution containing 1,3-diaminobenzene, and b) a second solution containing trimesoyl chloride, wherein at least one of solutions a) and b) contains nanoparticles when said solutions are first contacted, and recovering a highly permeable RO membrane.

15 Claims, 11 Drawing Sheets

Related U.S. Application Data continuation of application No. 14/064,375, filed on Oct. 28, 2013, now abandoned, which is a continuation of application No. 13/459,902, filed on Apr. 30, 2012, now Pat. No. 8,603,340, which is a continuation of application No. 12/424,533, filed on Apr. 15, 2009, now Pat. No. 8,177,978.

(60) Provisional application No. 61/045,262, filed on Apr. 15, 2008, provisional application No. 61/045,234, filed on Apr. 15, 2008, provisional application No. 61/045,237, filed on Apr. 15, 2008, provisional application No. 61/045,247, filed on Apr. 15, 2008, provisional application No. 61/045,249, filed on Apr. 15, 2008, provisional application No. 61/045,252, filed on Apr. 15, 2008, provisional application No. 61/079,794, filed on Jul. 10, 2008, provisional application No. 61/088,666, filed on Aug. 13, 2008, provisional application No. 61/104,905, filed on Oct. 13, 2008, provisional application No. 61/122,341, filed on Dec. 12, 2008, provisional application No. 61/122,342, filed on Dec. 12, 2008, provisional application No. 61/122,343, filed on Dec. 12, 2008, provisional application No. 61/122,344, filed on Dec. 12, 2008, provisional application No. 61/122,345, filed on Dec. 12, 2008, provisional application No. 61/122,346, filed on Dec. 12, 2008, provisional application No. 61/122,347, filed on Dec. 12, 2008, provisional application No. 61/122,348, filed on Dec. 12, 2008, provisional application No. 61/122,350, filed on Dec. 12, 2008, provisional application No. 61/122,351, filed on Dec. 12, 2008, provisional application No. 61/122,352, filed on Dec. 12, 2008, provisional application No. 61/122,354, filed on Dec. 12, 2008, provisional application No. 61/122,355, filed on Dec. 12, 2008, provisional application No. 61/122,357, filed on Dec. 13, 2008, provisional application No. 61/122,358, filed on Dec. 13, 2008, provisional application No. 61/156,388, filed on Feb. 27, 2009, provisional application No. 61/156,394, filed on Feb. 27, 2009, provisional application No. 61/164,031, filed on Mar. 27, 2009.

(51) Int. Cl.

| | | |
|---|---|---|
| *B01D 39/00* | (2006.01) | |
| *B01D 71/56* | (2006.01) | |
| *B01D 5/00* | (2006.01) | |
| *B29C 67/20* | (2006.01) | |
| *B01D 67/00* | (2006.01) | |
| *B01D 61/02* | (2006.01) | |
| *B01D 63/10* | (2006.01) | |
| *B01D 69/12* | (2006.01) | |
| *B01D 69/14* | (2006.01) | |
| *B05D 5/00* | (2006.01) | |
| *B01D 71/60* | (2006.01) | |
| *B01D 71/82* | (2006.01) | |
| *C02F 103/08* | (2006.01) | |

(52) U.S. Cl.
CPC ......... *B01D 63/10* (2013.01); *B01D 67/0079* (2013.01); *B01D 69/125* (2013.01); *B01D 69/141* (2013.01); *B01D 69/148* (2013.01); *B01D 71/56* (2013.01); *B01D 71/60* (2013.01); *B01D 71/82* (2013.01); *B05D 5/00* (2013.01); *C02F 1/441* (2013.01); *B01D 2323/36* (2013.01); *B01D 2325/48* (2013.01); *C02F 1/445* (2013.01); *C02F 2103/08* (2013.01)

(58) Field of Classification Search
CPC ...... B01D 69/148; B01D 71/60; B01D 65/08; B01D 69/12
See application file for complete search history.

(56) References Cited

U.S. PATENT DOCUMENTS

| | | |
|---|---|---|
| 3,260,691 A | 7/1966 | Lavin et al. |
| 3,351,244 A | 11/1967 | Zandberg et al. |
| 3,367,504 A | 2/1968 | Westmoreland |
| 3,417,870 A | 12/1968 | Bray |
| 3,480,588 A | 11/1969 | Lavin et al. |
| 3,567,632 A | 3/1971 | Richter et al. |
| 3,597,393 A | 8/1971 | Bach et al. |
| 3,615,024 A | 10/1971 | Michaels |
| 3,619,424 A | 11/1971 | Blanchard et al. |
| 3,642,707 A | 2/1972 | Frazer |
| 3,648,845 A | 3/1972 | Riley |
| 3,663,510 A | 5/1972 | Peterson |
| 3,687,842 A | 8/1972 | Credali et al. |
| 3,690,811 A | 9/1972 | Horning |
| 3,692,740 A | 9/1972 | Suzuki et al. |
| 3,696,031 A | 10/1972 | Credali et al. |
| 3,710,945 A | 1/1973 | Dismore |
| 3,744,642 A | 7/1973 | Scala et al. |
| 3,791,526 A | 2/1974 | Stana et al. |
| 3,878,109 A | 4/1975 | Ikeda et al. |
| 3,904,519 A | 9/1975 | McKinney et al. |
| 3,906,250 A | 9/1975 | Loeb |
| 3,920,612 A | 11/1975 | Stephens |
| 3,926,798 A | 12/1975 | Cadotte |
| 3,951,815 A | 4/1976 | Wrasidlo |
| 3,993,625 A | 11/1976 | Kurihara et al. |
| 3,996,318 A | 12/1976 | Van Heuven |
| 4,005,012 A | 1/1977 | Wrasidlo |
| 4,020,142 A | 4/1977 | Davis et al. |
| 4,039,440 A | 8/1977 | Cadotte |
| 4,048,144 A | 9/1977 | Stephens |
| 4,051,300 A | 9/1977 | Klein et al. |
| 4,060,488 A | 11/1977 | Hoover et al. |
| 4,092,424 A | 5/1978 | Brandl et al. |
| 4,188,418 A | 2/1980 | Livingston |
| 4,214,994 A | 7/1980 | Kitano et al. |
| 4,244,824 A | 1/1981 | Lange et al. |
| 4,259,183 A | 3/1981 | Cadotte |
| 4,277,344 A | 7/1981 | Cadotte |
| 4,387,024 A | 6/1983 | Kurihara et al. |
| 4,388,189 A | 6/1983 | Kawaguchi et al. |
| 4,392,960 A | 7/1983 | Kraus et al. |
| 4,492,721 A | 1/1985 | Joosten et al. |
| 4,559,139 A | 12/1985 | Uemura et al. |
| 4,567,009 A | 1/1986 | Badenhop et al. |
| 4,606,943 A | 8/1986 | Rak et al. |
| 4,693,985 A | 9/1987 | Degen et al. |
| 4,707,266 A | 11/1987 | Degen et al. |
| 4,713,438 A | 12/1987 | Harris et al. |
| 4,740,219 A | 4/1988 | Kulprathipanja et al. |
| 4,754,016 A | 6/1988 | Ai et al. |
| 4,762,619 A | 8/1988 | Gaddis et al. |
| 4,765,897 A | 8/1988 | Cadotte et al. |
| 4,765,915 A | 8/1988 | Diehl |
| 4,769,148 A | 9/1988 | Fibiger et al. |
| 4,778,596 A | 10/1988 | Linder et al. |
| 4,795,559 A | 1/1989 | Shinjou et al. |
| 4,814,082 A | 3/1989 | Wrasidlo |
| 4,830,885 A | 5/1989 | Tran et al. |
| 4,833,014 A | 5/1989 | Linder et al. |
| 4,840,977 A | 6/1989 | Crivello et al. |
| 4,842,736 A | 6/1989 | Bray et al. |
| 4,859,384 A | 8/1989 | Fibiger et al. |
| 4,872,984 A | 10/1989 | Tomaschke |
| 4,902,424 A | 2/1990 | Wrasidlo |
| 4,911,844 A | 3/1990 | Linder et al. |

(56) References Cited

U.S. PATENT DOCUMENTS

| | | |
|---|---|---|
| 4,931,362 A | 6/1990 | Zaifkovits et al. |
| 4,948,506 A | 8/1990 | Lonsdale et al. |
| 4,948,507 A | 8/1990 | Tomaschke |
| 4,950,404 A | 8/1990 | Chau |
| 4,971,697 A | 11/1990 | Douden et al. |
| 4,983,291 A | 1/1991 | Chua et al. |
| 5,002,590 A | 3/1991 | Friesen et al. |
| 5,017,680 A | 5/1991 | Sublett |
| 5,019,261 A | 5/1991 | Stengaard |
| 5,024,594 A | 6/1991 | Athayde et al. |
| 5,028,337 A | 7/1991 | Linder et al. |
| 5,032,268 A | 7/1991 | Hahn |
| 5,069,945 A | 12/1991 | Wrasidlo |
| 5,084,179 A | 1/1992 | Knight |
| 5,089,460 A | 2/1992 | Chien |
| 5,091,086 A | 2/1992 | Stengaard |
| 5,096,584 A | 3/1992 | Reddy et al. |
| 5,098,575 A | 3/1992 | Yaeli |
| 5,104,632 A | 4/1992 | Douden et al. |
| 5,108,607 A | 4/1992 | Kraus et al. |
| 5,114,582 A | 5/1992 | Sandstrom et al. |
| 5,130,025 A | 7/1992 | Lefebvre et al. |
| 5,147,541 A | 9/1992 | McDermott, Jr. et al. |
| 5,154,829 A | 10/1992 | Degen et al. |
| 5,160,617 A | 11/1992 | Huis In't Veld et al. |
| 5,160,673 A | 11/1992 | Wollbeck et al. |
| 5,173,189 A | 12/1992 | Hoshi et al. |
| 5,183,566 A | 2/1993 | Darnell et al. |
| 5,190,654 A | 3/1993 | Bauer |
| 5,234,598 A | 8/1993 | Tran et al. |
| 5,254,261 A | 10/1993 | Tomaschke et al. |
| 5,258,203 A | 11/1993 | Arthur |
| 5,262,054 A | 11/1993 | Wheeler |
| 5,269,926 A | 12/1993 | Webster et al. |
| 5,281,430 A | 1/1994 | Herron et al. |
| 5,342,431 A | 8/1994 | Anderson et al. |
| 5,376,442 A | 12/1994 | Davidson et al. |
| 5,435,957 A | 7/1995 | Degen et al. |
| 5,462,667 A | 10/1995 | Wollinsky et al. |
| 5,484,528 A | 1/1996 | Yagi et al. |
| 5,538,642 A | 7/1996 | Solie |
| 5,543,046 A | 8/1996 | Van Rijn |
| 5,576,057 A | 11/1996 | Hirose et al. |
| 5,614,099 A | 3/1997 | Hirose et al. |
| 5,650,479 A | 7/1997 | Glugla et al. |
| 5,658,460 A | 8/1997 | Cadotte et al. |
| 5,681,467 A | 10/1997 | Solie et al. |
| 5,681,473 A * | 10/1997 | Miller ............... B01D 61/02 |
| | | 210/640 |
| 5,693,227 A | 12/1997 | Costa |
| 5,733,602 A | 3/1998 | Hirose et al. |
| 5,755,964 A | 5/1998 | Mickols |
| 5,783,079 A | 7/1998 | Kumano et al. |
| 5,800,706 A | 9/1998 | Fischer |
| 5,843,351 A | 12/1998 | Hirose et al. |
| 5,876,602 A | 3/1999 | Jons et al. |
| 5,914,039 A | 6/1999 | Mahendran et al. |
| 5,919,026 A | 7/1999 | Appleton |
| 5,938,934 A | 8/1999 | Balogh et al. |
| 5,989,426 A | 11/1999 | Hirose et al. |
| 6,015,495 A | 1/2000 | Koo et al. |
| 6,024,872 A | 2/2000 | Mahendran et al. |
| 6,024,873 A | 2/2000 | Hirose et al. |
| 6,117,341 A | 9/2000 | Bray et al. |
| 6,156,680 A | 12/2000 | Goettmann |
| 6,156,867 A | 12/2000 | Aoyama et al. |
| 6,162,358 A | 12/2000 | Li et al. |
| 6,171,497 B1 | 1/2001 | Hirose et al. |
| 6,177,011 B1 | 1/2001 | Hachisuka et al. |
| 6,185,940 B1 | 2/2001 | Prueitt |
| 6,187,192 B1 | 2/2001 | Johnston et al. |
| 6,241,893 B1 | 6/2001 | Levy |
| 6,245,234 B1 | 6/2001 | Koo et al. |
| 6,277,282 B1 | 8/2001 | Kihara et al. |
| 6,284,137 B1 | 9/2001 | Hajikano et al. |
| 6,309,546 B1 | 10/2001 | Herrmann et al. |
| 6,337,018 B1 | 1/2002 | Mickols |
| 6,368,507 B1 | 4/2002 | Koo et al. |
| 6,391,205 B1 | 5/2002 | McGinnis |
| 6,406,626 B1 | 6/2002 | Murakami et al. |
| 6,413,425 B1 | 7/2002 | Hachisuka et al. |
| 6,425,936 B1 | 7/2002 | Sammons et al. |
| 6,472,016 B1 | 10/2002 | Soria et al. |
| 6,540,915 B2 | 4/2003 | Patil |
| 6,551,536 B1 | 4/2003 | Kwak et al. |
| 6,562,266 B2 | 5/2003 | Mickols |
| 6,582,495 B2 | 6/2003 | Chau et al. |
| 6,585,802 B2 | 7/2003 | Koros et al. |
| 6,605,140 B2 | 8/2003 | Guiver et al. |
| 6,652,751 B1 | 11/2003 | Kutowy et al. |
| 6,723,241 B2 | 4/2004 | Mickols |
| 6,753,396 B2 | 6/2004 | Ulbricht et al. |
| 6,755,900 B2 | 6/2004 | Koros et al. |
| 6,821,430 B2 | 11/2004 | Andou et al. |
| 6,837,996 B2 | 1/2005 | Kurth et al. |
| 6,841,075 B2 | 1/2005 | Penth et al. |
| 6,841,601 B2 | 1/2005 | Serpico et al. |
| 6,878,278 B2 | 4/2005 | Mickols |
| 6,881,336 B2 | 4/2005 | Johnson |
| 6,890,436 B2 | 5/2005 | Komatsu et al. |
| 7,018,538 B2 | 3/2006 | Leiser et al. |
| 7,048,855 B2 | 5/2006 | de la Cruz |
| 7,109,140 B2 | 9/2006 | Marand et al. |
| 7,138,058 B2 | 11/2006 | Kurth et al. |
| 7,182,894 B2 | 2/2007 | Kumar et al. |
| 7,211,320 B1 | 5/2007 | Cooper et al. |
| 7,311,982 B2 | 12/2007 | Christou et al. |
| 7,459,121 B2 | 12/2008 | Liang et al. |
| 7,490,725 B2 | 2/2009 | Pinnau et al. |
| 7,604,746 B2 | 10/2009 | Childs et al. |
| 7,871,522 B2 | 1/2011 | Stover et al. |
| 7,955,656 B2 | 6/2011 | Murayama et al. |
| 8,002,989 B2 | 8/2011 | McGinnis |
| 8,011,517 B2 | 9/2011 | Allen et al. |
| 8,017,050 B2 | 9/2011 | Freeman et al. |
| 8,029,857 B2 * | 10/2011 | Hoek ............... B01D 67/0079 |
| | | 210/490 |
| 8,147,735 B2 | 4/2012 | Buschmann |
| 8,177,978 B2 * | 5/2012 | Kurth ............... B01D 61/002 |
| | | 210/490 |
| 8,443,986 B2 | 5/2013 | Tanaka et al. |
| 8,507,612 B2 | 8/2013 | Zhu |
| 8,551,388 B2 | 10/2013 | Chalker et al. |
| 8,567,612 B2 * | 10/2013 | Kurth ............... B01D 65/08 |
| | | 210/490 |
| 8,603,340 B2 | 12/2013 | Kurth et al. |
| 8,801,635 B2 | 8/2014 | Hovorka |
| 8,801,935 B2 | 8/2014 | Koehler et al. |
| 9,022,227 B2 | 5/2015 | Na et al. |
| 2001/0050252 A1 * | 12/2001 | Mickols ............... B01D 71/56 |
| | | 210/490 |
| 2002/0074282 A1 | 6/2002 | Herrmann et al. |
| 2002/0187401 A1 | 12/2002 | Lee et al. |
| 2003/0116498 A1 * | 6/2003 | Mickols ............... B01D 69/125 |
| | | 210/483 |
| 2003/0116503 A1 | 6/2003 | Wang et al. |
| 2003/0121844 A1 | 7/2003 | Koo et al. |
| 2003/0132174 A1 | 7/2003 | Isomura et al. |
| 2004/0178135 A1 | 9/2004 | Beplate |
| 2004/0234751 A1 | 11/2004 | Sakurai et al. |
| 2005/0077243 A1 | 4/2005 | Pinnau et al. |
| 2005/0139066 A1 | 6/2005 | Miller et al. |
| 2005/0145568 A1 | 7/2005 | McGinnis |
| 2005/0173341 A1 | 8/2005 | Salinaro |
| 2005/0230305 A1 | 10/2005 | Kulkami et al. |
| 2006/0062902 A1 | 3/2006 | Sager et al. |
| 2006/0063911 A1 | 3/2006 | Cayton et al. |
| 2006/0175256 A1 | 8/2006 | Masten et al. |
| 2006/0201884 A1 | 9/2006 | Kulprathipanja et al. |
| 2006/0204812 A1 | 9/2006 | Moriyama et al. |
| 2006/0249447 A1 | 11/2006 | Yeager |
| 2007/0272628 A1 | 11/2007 | Mickols et al. |
| 2008/0149561 A1 | 6/2008 | Chu et al. |
| 2008/0237126 A1 | 10/2008 | Hoek et al. |

(56) References Cited

U.S. PATENT DOCUMENTS

| | | |
|---|---|---|
| 2008/0251447 A1 | 10/2008 | Koumoto et al. |
| 2008/0295951 A1 | 12/2008 | Hiro et al. |
| 2009/0159527 A1 | 6/2009 | Mickols et al. |
| 2009/0272692 A1 | 11/2009 | Kurth et al. |
| 2010/0006495 A1 | 1/2010 | Buschmann |
| 2010/0025330 A1 | 2/2010 | Ratto et al. |
| 2010/0044902 A1 | 2/2010 | Ohara et al. |
| 2010/0051538 A1 | 3/2010 | Freeman et al. |
| 2010/0062156 A1* | 3/2010 | Kurth .................. B01D 61/002 427/243 |
| 2010/0193428 A1 | 8/2010 | Hane et al. |
| 2011/0005997 A1* | 1/2011 | Kurth .................. B01D 65/08 210/500.27 |
| 2011/0031180 A1 | 2/2011 | Tada et al. |
| 2011/0155660 A1 | 6/2011 | Mickols et al. |
| 2011/0174728 A1 | 7/2011 | Eisen et al. |
| 2012/0048798 A1 | 3/2012 | Cheng et al. |
| 2012/0111791 A1 | 5/2012 | Freeman et al. |
| 2012/0285890 A1* | 11/2012 | Koehler ............. B01D 67/0079 210/651 |
| 2013/0284664 A1 | 10/2013 | Takagi et al. |
| 2013/0287946 A1 | 10/2013 | Jons et al. |
| 2014/0014575 A1 | 1/2014 | Kwon et al. |
| 2014/0050846 A1 | 2/2014 | Kurth et al. |
| 2015/0328588 A1* | 11/2015 | Schmidt-Leithoff .. B01D 65/08 210/650 |
| 2016/0030897 A1* | 2/2016 | Kurth .................. B01D 61/002 210/654 |

FOREIGN PATENT DOCUMENTS

| | | |
|---|---|---|
| CN | 101695636 | 4/2010 |
| CN | 101816900 | 9/2010 |
| EP | 0348041 | 12/1989 |
| JP | 61-156165 | 7/1986 |
| JP | 63-012310 | 1/1988 |
| JP | 04-126529 | 4/1992 |
| JP | 05-245349 | 9/1993 |
| JP | H08-182921 | 7/1996 |
| JP | 2000-225327 | 8/2000 |
| JP | 2006-187731 | 7/2006 |
| KR | 1020010100304 | 11/2001 |
| KR | 1020050077141 | 8/2005 |
| WO | 00/076641 | 12/2000 |
| WO | 00/078437 | 12/2000 |
| WO | 01/078882 | 10/2001 |
| WO | 02/04082 | 1/2002 |
| WO | 02/15299 | 2/2002 |
| WO | 02/051528 | 7/2002 |
| WO | 03/047734 | 6/2003 |
| WO | 03/097218 | 11/2003 |
| WO | 03/097221 | 11/2003 |
| WO | 2004/022491 | 3/2004 |
| WO | 2005/014266 | 2/2005 |
| WO | 2005/023414 | 3/2005 |
| WO | 2005/057700 | 6/2005 |
| WO | 2006/030411 | 3/2006 |
| WO | 2006/098872 | 9/2006 |
| WO | 2006/135384 | 12/2006 |
| WO | 2007/001405 | 1/2007 |
| WO | 2007/024461 | 3/2007 |
| WO | 2007/035019 | 3/2007 |
| WO | 2007/050408 | 5/2007 |
| WO | 2007/065866 | 6/2007 |
| WO | 2007/084169 | 7/2007 |
| WO | 2007/095363 | 8/2007 |
| WO | 2007/133362 | 11/2007 |
| WO | 2007/133609 | 11/2007 |
| WO | 2008/057842 | 5/2008 |
| WO | 2008/066939 | 6/2008 |
| WO | 2008/091658 | 7/2008 |
| WO | 2008/118228 | 10/2008 |
| WO | 2009/129354 | 10/2009 |
| WO | 2010/123518 | 10/2010 |
| WO | 2011/008549 | 1/2011 |

OTHER PUBLICATIONS

Arthur, "Structure-Property Relationship in a Thin Film Composite Reverse Osmosis Membrane," Journal of Membrane Science, 1989, 46:243-260.

Bae et al., "Preparation of $TiO_2$ self-assembled polymeric nanocomposite membranes and examination of their fouling mitigation effects in a membrane bioreactor system," J. Membrane Science, 266 (2005):1-5.

Bermudez et al, "Infinite Dilution Activity Coefficients in Tributyl Phosphate and Triacetin," J. Chem. Eng. Data, 2000, 45:1105-1107.

Bhattacharyya et al., "An Overview of Selected Membrane Techniques for Environmental Applications," J. Chin Inst. Chan. Eners., 2002, 33(1):62-66.

Boom et al., "Microstructures in phase inversion membranes. Part 2. The role of a polymeric additive," J. Membrane Science, 73 (1992):277-292.

Cadotte et al., "Advanced Poly (Piperazineamide) Reverse Osmosis Membranes" NT1S: Final Report, 1979, pp. 1-48.

Cadotte et al., "Continued Evaluation of in Situ-Formed Condensation Polymers for Reverse Osmosis Membranes" NTIS: Final Report, 1976, pp. 1-80 (92 pages total).

Cadotte et al., "Research on 'In Situ'-Formed Condensation Polymer for Reverse Osmosis Membranes" NTIS: Final Report, 1978, pp. 1-44 (56 pages total).

Cadotte, J.E., "Evolution of Composite Reverse Osmosis Membranes," Materials Science of Synthetic Membranes, 1985, pp. 273-294.

Camblor et al. "Characterization of nanocrystalline zeolite Beta," Microporous and Mesoporous Materials, 1998, 25(1-3):59-74.

Chui, et al. "A Chemically Functionalizable Nanoporous Material [Cu3(TMA)2(H20)3b," Science, 1999, 283:1148-1150.

Freger et al., "TFC polyamide membranes modified by grafting of hydrophilic polymers: an FT-IR/AFM/TEM study," J. Membrane Science, 209 (2002):283-292.

Goosen et al., "Fouling of Reverse Osmosis and Ultrafiltration Membranes: A Critical Review," Separation Science and Technology, 39(10):2261-2298 (2004).

Hoek et al., "Influence of Crossflow Membrane Filter Geometry and Shear Rate on Colloidal Fouling in Reverse Osmosis and Nanofiltration Separations," Environ. Engineering Science, 19(6):357-372 (2002).

Hoek et al., "Cake-Enhanced Concentration Polarization: A New Fouling Mechanism for Salt-Rejecting Membranes," Environ. Sci. Technol., 37 (2003):5581-5588.

Hoek et al., "Effect of Membrane Surface Roughness on Colloid—Membrane DLVO Interactions," Langmuir, 19 (2003):4836-4847.

Holmberg et al. "Controlling size and yield of zeolite Y nanocrystals using tetramethylammonium bromide," Microporous and Mesoporous Materials, 2003, 59(1):13-28.

Jeong et al., "Interfacial polymerization of thin film nanocomposites: A new concept for reverse osmosis membranes," Journal of Membrane Science, 2007, 294:1-7.

Kang et al., "A Novel Method of Surface Modification on Thin-Film Composite Reverse Osmosis Membrane by Grafting (Ethylene Glycol)" Polymer, 2007, 48(5):1165-1170.

Kang et al., "Direct observation of biofouling in cross-flow microfiltration: mechanisms of deposition and release," J. Membrane Science, 244(1-2):151-165 (2004).

Lau et al., "A recent progress in thin film composite membrane: A review," Desalination, 287 (2012):190-199.

Lee et al., "Effect of Operating Conditions on CaSO4 Scale Formation Mechanism in Nanofiltration for Water Softening," Wat. Res. 34(15):3854-3866 (2000).

Lemanski et al., "Effect of shell-side flows on the performance of hollow-fiber gas separation modules," J. Membrane Science, 195 (2001):215-228.

(56) References Cited

OTHER PUBLICATIONS

Li et al., "Organic Fouling and Chemical Cleaning of Nanofiltration Membranes: Measurements and Mechanisms," Environ. Sci. Technol., 38 (2004):4683-4693.
Lohokare et al., "Effect of Support Material on Ultrafiltration Membrane Performance," J. Applied Polymer Science, 99 (2006):3389-3395.
McDonnell et al., "Hydrophilic and Antimicrobial Zeolite Coatings for Gravity-Independent Water Separation," Adv. Funct. Mater., 15(2):336-340 (2005).
Rong et al., "Structure-property relationships of irradiation grafted nano-inorganic particle filled polypropylene composites," Polymer 42 (2001):167-183.
Rowsell et al., "Metal-organic frameworks: a new class of porous materials," Microporous and Mesoporous Materials, 73 (2004):3-14.
Van et al., "Surface reaction kinetics of metal β-diketonate precursors with O radicals in radical-enhanced atomic layer deposition of metal oxides," Applied Surface Science, 246 (2005):250-261.
Vrijenhoek et al., "Influence of membrane surface properties on initial rate of colloidal fouling of reverse osmosis and nanofiltration membranes," J. Membrane Science, 188 (2001):115-128.
Walker et al., "A Novel Asymmetric Clamping Cell for Measuring Streaming Potential of Flat Surfaces," Langmuir, 18 (2002):2193-2198.
Wang et al., "Formation of semi-permeable polyamide skin layers on the surface of supported liquid membranes," Journal of Membrane Science, 1998, 147:109-116.
Wang et al., "Direct Observation of Microbial Adhesion of Membranes," Environ. Sci. Technol., 39 (2005):6461-6469.
Wei et al., "A novel method of surface modification on thin-film-composite reverse osmosis membrane by grafting hydantoin derivative," J. Membrane Science, 346 (2010):152-162.
Wei et al., "Surface modification of commercial aromatic polyamide reverse osmosis membranes by graft polymerization of 3-allyl-5,5-dimethylhydantoin," J. Membrane Science, 351 (2010):222-233.
Zhu et al., "Colloidal Fouling of Reverse Osmosis Membranes: Measurements and Fouling Mechanisms," Environ. Sci. Technol., 31 (1997):3654-3662.
EPO; European Search Report Issued in European Patent Application No. 11839326.3; dated Jul. 21, 2015; 8 Pages.
Authorized Officer Hong, Written Opinion and International Search Report issued in International Patent Application No. PCT/US2010/040417 dated Jan. 28, 2011.
Authorized Officer Istvan Hathazi; Written Opinion and Search Report Issued in Singapore Patent Application No. 201007478-9; dated Jan. 19, 2012; 14 Pages.
Authorized Officer Jun Bae Cho; International Search Report and Written Opinion Issued in International Patent Application No. PCT/US2009/040732; dated Dec. 4, 2009; 10 Pages.
Authorized Officer S. Jo. International Search Report in International Application No. PCT/US2011/060157, dated Jun. 28, 2012, 9 pages.
EPO; Extended European Search Report Issued in European Patent Application No. 09732803.3; Dated Nov. 14, 2012; 9 Pages.
KIPO; Office Action Issued in Korean Patent Application No. 10-2010-7025647; dated Apr. 20, 2015; 17 Pages including English Language Translation.
SIPO; Office Action Issued in Chinese Patent Application No. 200980121483.8; dated Apr. 20, 2015; 6Pages including English Language Translation.
Government of India Patent Office; First Examination Report Issued in Indian Patent Application No. 2350/MUMNP/2010; dated Mar. 31, 2015; 2 Pages.

\* cited by examiner

HYBRID NANOPARTICLE TFC MEMBRANES

CROSS-REFERENCE TO RELATED U.S. APPLICATIONS

This application is a continuation of U.S. patent application Ser. No. 14/305,335, filed on Jun. 16, 2014, allowed, which is a continuation of U.S. patent application Ser. No. 14/064,375, filed on Oct. 28, 2013, now abandoned, which is a continuation of U.S. patent application Ser. No. 13/459,902, filed on Apr. 30, 2012, now U.S. Pat. No. 8,603,340, which is a continuation of U.S. patent application Ser. No. 12/424,533, filed on Apr. 15, 2009, now U.S. Pat. No. 8,177,978, and claims priority to U.S. Provisional application No. 61/045,262, filed on Apr. 15, 2008, and to U.S. Provisional application No. 61/045,234, filed on Apr. 15, 2008, and to U.S. Provisional application No. 61/045,237, filed on Apr. 15, 2008, and to U.S. Provisional application No. 61/045,247, filed on Apr. 15, 2008, and to U.S. Provisional application No. 61/045,249, filed on Apr. 15, 2008, and to U.S. Provisional application No. 61/045,252, filed on Apr. 15, 2008, and to U.S. Provisional application No. 61/079,794, filed on Jul. 10, 2008, and to U.S. Provisional application No. 61/088,666, filed on Aug. 13, 2008, and to U.S. Provisional application No. 61/104,905, filed on Oct. 13, 2008, and to U.S. Provisional application No. 61/122,341, filed on Dec. 12, 2008, and to U.S. Provisional application No. 61/122,342, filed on Dec. 12, 2008, and to U.S. Provisional application No. 61/122,343, filed on Dec. 12, 2008, and to U.S. Provisional application No. 61/122,344, filed on Dec. 12, 2008, and to U.S. Provisional application No. 61/122,345, filed on Dec. 12, 2008, and to U.S. Provisional application No. 61/122,346, filed on Dec. 12, 2008, and to U.S. Provisional application No. 61/122,347, filed on Dec. 12, 2008, and to U.S. Provisional application No. 61/122,348, filed on Dec. 12, 2008, and to U.S. Provisional application No. 61/122,350, filed on Dec. 12, 2008, and to U.S. Provisional application No. 61/122,351, filed on Dec. 12, 2008, and to U.S. Provisional application No. 61/122,352, filed on Dec. 12, 2008, and to U.S. Provisional application No. 61/122,354, filed on Dec. 12, 2008, and to U.S. Provisional application No. 61/122,355, filed on Dec. 12, 2008, and to U.S. Provisional application No. 61/122,357, filed on Dec. 13, 2008, and to U.S. Provisional application No. 61/122,358, filed on Dec. 13, 2008, and to U.S. Provisional application No. 61/156,388, filed on Feb. 27, 2009, and to U.S. Provisional application No. 61/156,394, filed on Feb. 27, 2009, and to U.S. Provisional application No. 61/164,031, filed on Mar. 27, 2009, all of which are incorporated by reference, in their entireties.

1. FIELD OF THE INVENTION

This invention is related to thin film composite or TFC membranes including nanoparticles and/or other additives, and more particularly to such membranes used for reverse or forward osmosis, for example to purify water.

2. BACKGROUND OF THE INVENTION

Reverse osmosis membranes, made by interfacial polymerization of a monomer in a nonpolar (e.g. organic) phase together with a monomer in a polar (e.g. aqueous) phase on a porous support membrane are known as TFC membranes and are used where flux and substantial rejection characteristics are required, for example in the purification of water.

Various materials have been added to TFC membranes to increase flux without reducing rejection characteristics and have met with limited success. Such membranes are also subject to fouling resulting in reduced flux as contaminants, for example from the brackish or seawater to be purified, build up on the surface of the discrimination layer of the TFC membrane.

What are needed are techniques for further improving flux while maintaining or improving rejection characteristics, resisting the effects of fouling, as well as techniques for improving commercial processing of such improved TFC membranes.

Figure 1:
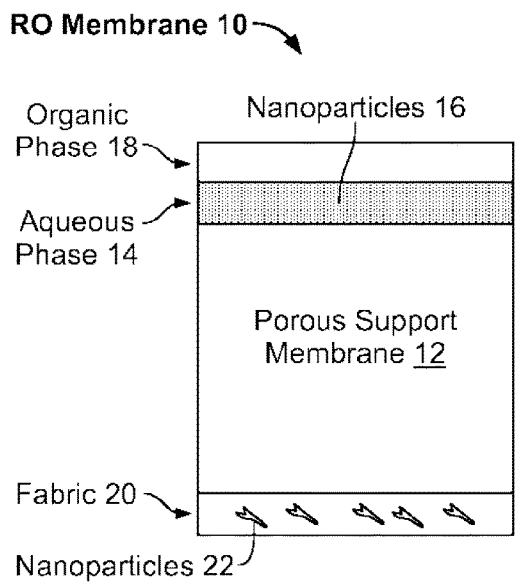
FIG. 1 is a block diagram illustrating the layers in a step in the process of preparing a TFC membrane in which nanoparticles 16 are present in aqueous phase 14.

In one aspect, improved techniques for the use of nanoparticles in TFC membranes have been developed including the combined used of nanoparticles and/or nanotubes with alkaline earth metals, monohydrolyzed TMC and/or other molecular additives in hybrid nanocomposite TFC membranes with increased flux, rejection and anti-fouling characteristics.

In another aspect, the new hybrid nanocomposite TFC membranes, together with more advantages concentrations and ranges of TMC, MPD to TMC ratios as well as the discovery of deflection points in the concentrations of additives, such as monohydrolyzed TMC, make the design and fabrication of engineered nanocomposite TFC membranes with selected flux, rejection and antifouling characteristics possible.

In a further aspect, some of the new additives, particularly the alkaline earth metals and monohydrolyzed TMC, may be used for the design and fabrication of high flux, rejection and anti-fouling TFC membranes. These membranes may also advantageously use the advantageous concentrations and ranges of TMC, MPD to TMC ratios and deflection points in the concentrations of additives to provide optimum characteristics for particular circumstances.

One object of the invention is to provide an interfacial polymerization process for preparing a highly permeable RD membrane, comprising:
  contacting on a porous support membrane,
    a) a first solution containing 1,3-diaminobenzene, and
    b) a second solution containing trimesoyl chloride,
  wherein at least one of solutions a) and b) contains well dispersed nanoparticles when said solutions are first contacted, and
  recovering a highly permeable RD membrane.

A highly permeable reverse osmosis membrane produced by a process, comprising:
  contacting on a porous support membrane,
    a) a first solution containing 1,3-diaminobenzene, and
    b) a second solution containing trimesoyl chloride,
  wherein at least one of solutions a) and b) contains well dispersed nanoparticles when said solutions are first contacted, and
  recovering a highly permeable RO membrane,
  wherein at least 20% of the membrane surface area consists of nanoparticles.
    a) a first solution containing polyamine monomer, and
    b) a second solution containing a polyfunctional acyl halide monomer, a
  wherein a molecular additive compound is present in a) or b) or both during the polymerization reaction, and
  recovering a highly permeable RO membrane.

Another object is to provide a highly permeable reverse osmosis membrane, produced by an interfacial polymerization process, comprising:
  contacting on a porous support membrane,
    a) a first solution containing a polyamine monomer and
    b) a second solution containing a polyfunctional acyl halide monomer,
  wherein a molecular additive compound is present in a) or b) or both during the polymerization reaction, and
  recovering a highly permeable RO membrane.

Another object of the invention is to provide an interfacial polymerization process for preparing a low-fouling highly permeable RO membrane, comprising:
  contacting on a porous support membrane,
    a) a first solution containing a polyamine monomer, and
    b) a second solution containing a polyfunctional acyl halide monomer,
  wherein aluminum ion is present in a) or b), or both, during the polymerization reaction,
  recovering a low-fouling, highly permeable RO membrane.

Another object is to provide a low-fouling highly permeable RO membrane, produced by an interfacial polymerization process, comprising:
  contacting on a porous support membrane,
    a) a first solution containing a polyamine monomer, and
    b) a second solution containing a polyfunctional acyl halide monomer,
  wherein aluminum ion is present in a) or b), or both, during the polymerization reaction.

Another object of the invention is to provide an interfacial polymerization process for preparing a highly permeable RO membrane, comprising:
  contacting on a porous support membrane,
    a) an aqueous solution containing metaphenylenediamine (MPD), and
    b) an organic solution containing trimesoyl chloride (TMC) and a hydrolyzed TMC species, and
  recovering a highly permeable RO membrane.

Another object is to provide a highly permeable reverse osmosis membrane, produced by an interfacial polymerization process, comprising:
  contacting on a porous support membrane,
    a) an aqueous solution containing metaphenylene diamine (MPD), and
    b) an organic solution containing trimesoyl chloride (TMC) and a hydrolyzed TMC species, and
  recovering a highly permeable RO membrane.

DETAILED DESCRIPTION OF THE PREFERRED EMBODIMENTS

For clarity, the present disclosure is divided into multiple sections, as follows:
Section A: Improved Nanoparticles for enhanced TFC membrane performance, including:
  nanoparticle dispersion and sizing,
  processing to enhance nanoparticle performance in a membrane, selecting and processing nanoparticles to release soluble metal ions, adding additional soluble metal ions to improve membrane performance, and testing of nanoparticle membranes and examples.

Section B: Hybrid TFC membranes including the following additives used in various combinations:
1. Nanoparticles,
2. Alkaline earth metal additives,
3. Nanotubes,
4. Mono-hydrolyzed TMC (mhTMC), and/or
5. Other molecular additives.

Section B1: Improved TFC membranes including the following additives used in various combinations:
1. Nanoparticles,
2. Alkaline earth metal additives,
3. Nanotubes,
4. Mono-hydrolyzed TMC (mhTMC), and/or
5. Other molecular additives.

Section C. Techniques
  c1. TMC concentration
  c2 TMC ratio
  c3. Deflection point.

Section D. Tables I-XII providing the following information, where appropriate, for each of 166 examples not included in Sections A-C, above.
  MPD & TMC concentrations and ratio,
  Aqueous and Organic Phase nanoparticles additives,
  Aqueous and Organic Phase molecular additives,
  Percentage flux improvement over control membrane without additives, and
  Flux (GFD) and Salt Rejection %.

Section E. Preparation and testing methodology for the example membranes.

Section A: Improved Nanoparticle TFC Membranes

Referring to FIG. 1, which is not drawn to scale for clarity of the description, reverse osmosis (RO) membrane 10 is synthesized using a interfacial polymerization process on a porous support membrane 12. Two immiscible solvents are used, so that a monomer in one solvent reacts with a monomer in the other solvent. The reactions are very fast and relatively high molecular weights are obtained.

Reinforcing fabric layers 20, woven or nonwoven, and made up of polymeric fibers are often employed. In some instances, fabric layer 20 may have nanoparticles 22 incorporated for added strength. Fabric layer 20 is preferably permeable to water, flat, and without stray fibers that could penetrate support 12 or thin film discrimination layer 24. It should be thin to decrease cost and to maximize membrane area, strong against extension, and mechanically resistant to deformation at high pressures. By adding nanoparticles 22 to the polymer fibers of fabric 20, more mechanically robust backings may be created that allow thinner, cheaper, and/or tougher supports to be manufactured.

In FIG. 1, aqueous phase layer 14 is shown with nanoparticles 16 dispersed therein on an upper surface of support membrane 12, and organic phase layer 18 interacts with aqueous layer 14. The interface between these layers is where the polymerization occurs.

Figure 10:
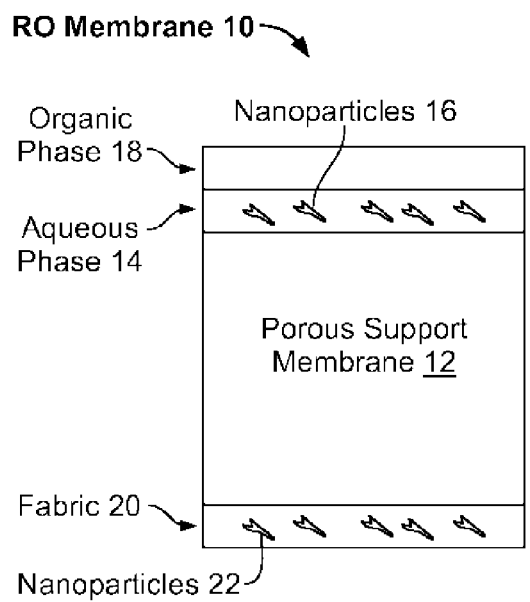
FIG. 10 is a diagrammatic view of RO membrane 10 during fabrication processing including soluble metal ions in aqueous phase 14.
Figure 11:
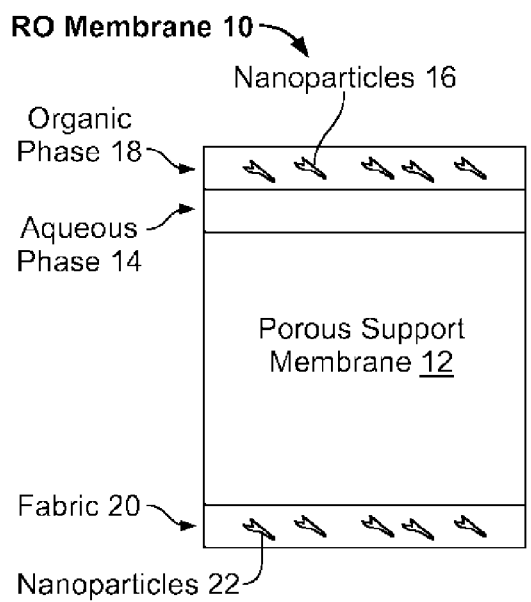
FIG. 11 is a diagrammatic view of RO membrane 10 during fabrication processing including soluble metal ions in organic phase 18.
Figure 12:
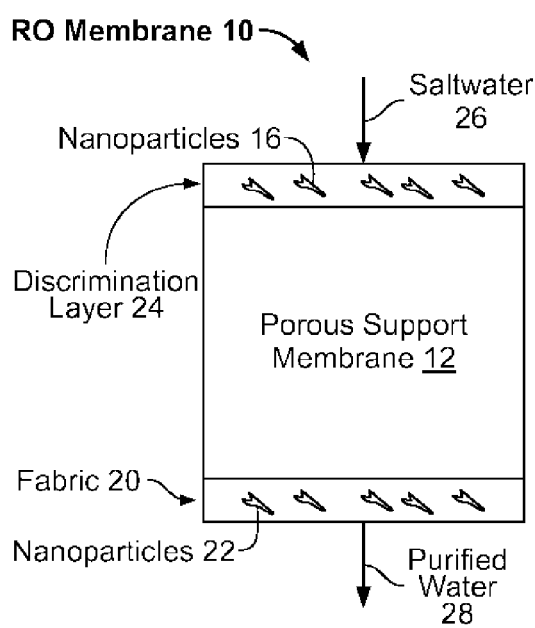
FIG. 12 is a diagrammatic view of RO membrane 10, including nanoparticles and soluble metal ions 16 in discrimination layer 24 during reverse osmosis.
Figure 13:
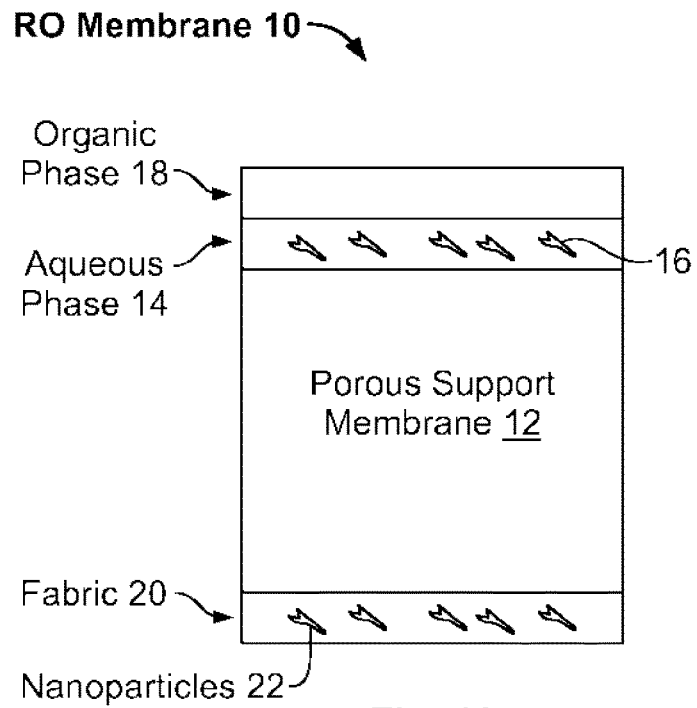
FIG. 13 is a diagrammatic view of RO membrane 10 during fabrication processing including nanoparticles and soluble metal ions 16 in aqueous phase 14.
Figure 14:
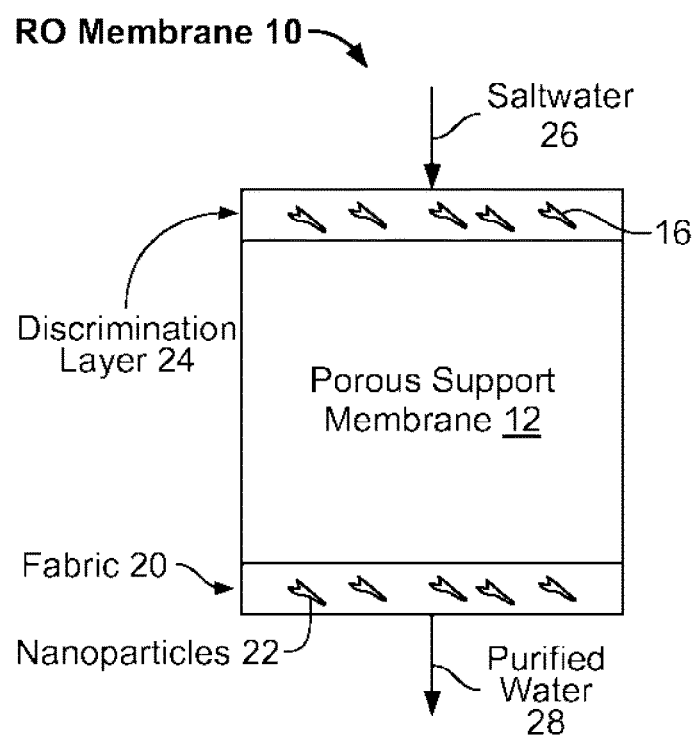
FIG. 14 is a diagrammatic view of RO membrane 10, including nanoparticles and soluble metal ions 16 in discrimination layer 24 during reverse osmosis.

In some embodiments, nanoparticles may be selected for their ability to release metal species such as alkaline earth or aluminum ions. Such particles may be dispersed within either the aqueous layer 14 or the organic phase layer 18, or both. Additional nanoparticles may also be present to impact surface properties or further increase performance, for example to improve fouling resistance. Nanoparticles 22 may be the same or different from nanoparticles 16. Metal ions 16 may be dissolved within either the aqueous layer 14, as shown in FIG. 10, or the organic phase layer 18, as shown in FIG. 11, or in both layers. Metal ions 16 may be dissolved within the aqueous layer 14, as shown in FIG. 13.

By dispersing aluminum releasing nanoparticles 16 in the aqueous or polar solvent 14 and/or organic phase layer 18 before interfacial polymerization, increased flux is often observed, especially when nanoparticles 16 are processed to enhance solubility of metal ions. Nanoparticles in solution may release aluminum before the polymerization reaction occurs to aqueous solution 14 or organic solution 18. The dissolved metal ions are thought to affect the polymerization reaction and ultimately membrane structure leading to improved performance. It is thought that the dissolved metal ions may serve as a template to guide polymerization leaving spaces or channels for increased water transport.

Figure 15:
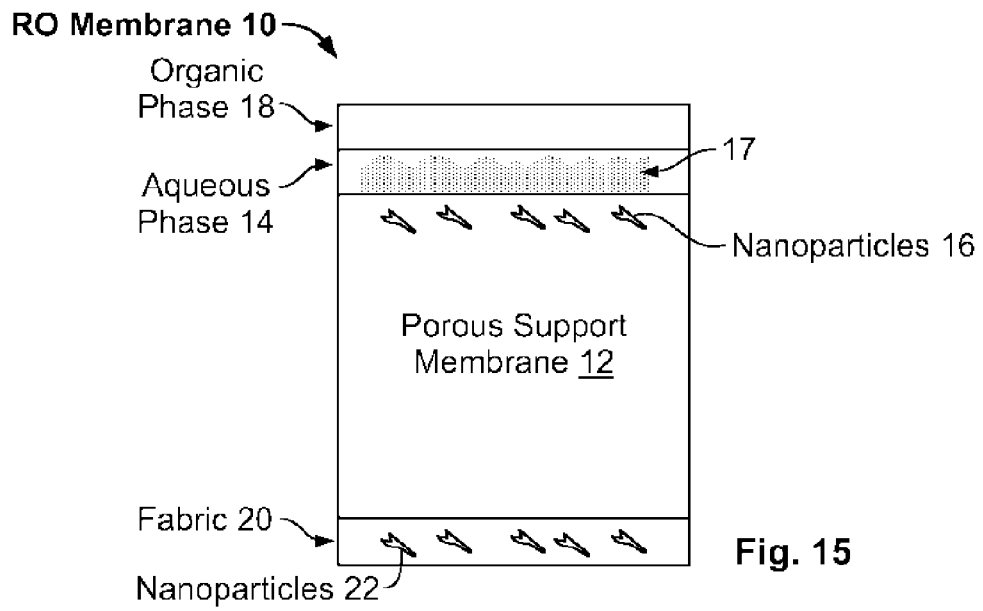
FIG. 15 is a diagrammatic view of RO membrane 10 during fabrication processing including soluble metal ions 17 in aqueous phase 14 released in whole or in part from nanoparticles 16 in porous support membrane 12, or from other carriers.

In FIG. 15, nanoparticles 16 selected to release soluble metal species to introduce metal ions 17 into aqueous layer 14, during fabrication may be dispersed within or on porous support membrane 12. Nanoparticles 16 may also be introduced into aqueous layer 14 or organic phase layer 18 or both to introduce additional metal ions 17 into aqueous layer 14 during fabrication. Additional nanoparticles 17 may also be present to impact surface properties or further increase performance of membrane 10. In some embodiments the interfacial polymerization process at least one of solutions a) and b) contains nanoparticles that release at least 1 ppm of a soluble metal species per 5% (w/w) nanoparticles, based on the weight of the mixture, and wherein said nanoparticles have been processed to maximize the amount of said soluble metal species contributed to the interfacial polymerization mixture.

RO membranes may be fabricated in which nanoparticles are included in the porous support membrane to release soluble metal ions for the interfacial polymerization process and/or improve flux flow decline by, perhaps, resisting compaction of the support membranes during reverse osmosis. The nanoparticles may be selected based on their ability to release 1 ppm or more of soluble metal species into the water contained in the support membrane. It may be advantageous to store the support membrane, for example for up to one hour, before interfacial polymerization on the support membrane between aqueous and organic phase solutions. It may also be advantageous to form the discrimination layer by contacting the aqueous phase solution to the organic phase solution on the support membrane for at least 10 seconds, preferably 2 minutes and more preferably 5 minutes after the organic phase solution is applied.

Figure 16:
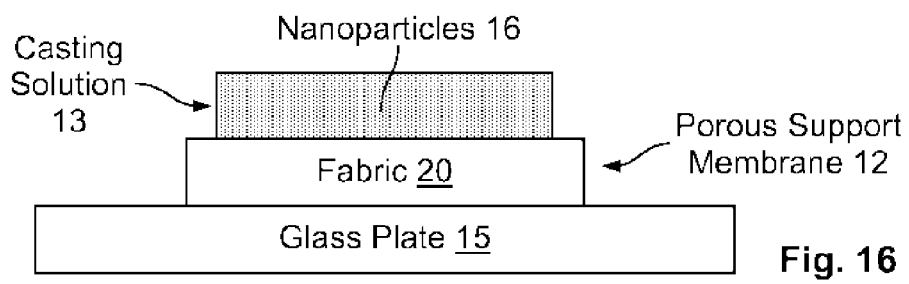
FIG. 16 is a diagrammatic view of support membrane 12 during fabrication in which casting solution 13 is coated on fabric 20 on glass plate 15.

Referring now to FIG. 16, casting solution 13 on fabric 20 becomes support membrane 12, after processing. Membrane 12 is typically a polymeric microporous support membrane which in turn is often supported by nonwoven or woven fabrics, such as fabric 20, for mechanical strength. Support membranes 12 are typically 25-250 microns in thickness and have been found to have the smallest pores located very near the upper surface. Porosity at the surface is often low, for instance from 5-15%, of the total surface area.

Nanoparticles 16 may be incorporated into support membrane 12 by including nanoparticles 16 with casting solution 13 used to prepare support membrane 12, or by including nanoparticles 16 within the nonsolvent, e.g. DI water, used to induce phase inversion during fabrication of support membrane 12.

Figure 17:
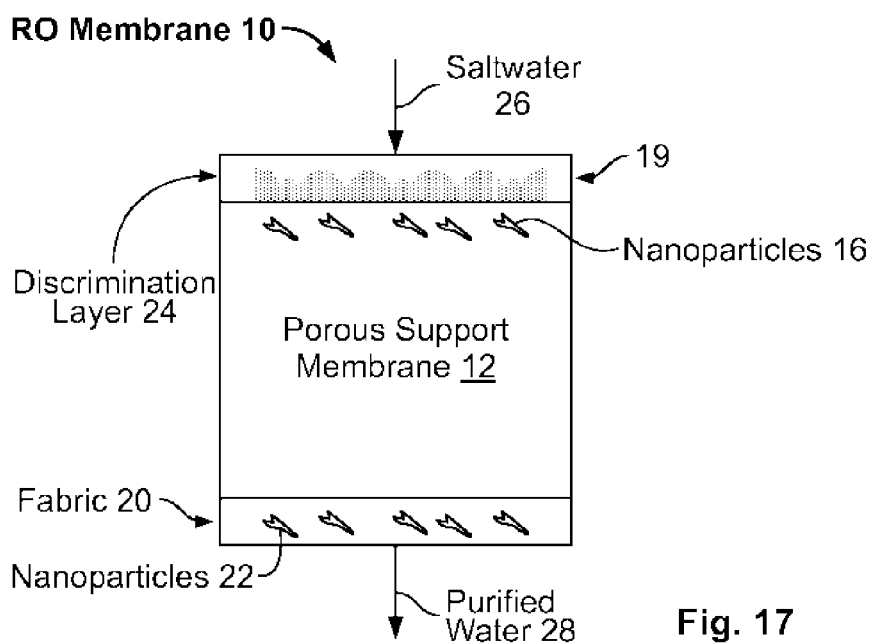
FIG. 17 is a diagrammatic view of RO membrane 10, including soluble metal ions 19 and/or soluble metal ions effect 19, in discrimination layer 24 during reverse osmosis.
Figure 18:
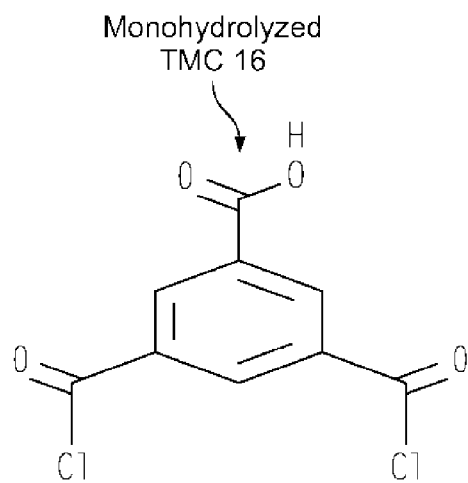
FIG. 18 is the chemical structure of mono-hydrolyzed TMC

Referring now to FIG. 17, in addition to providing metal ions 17 to aqueous phase 14, the addition of nanoparticles 16 to support membrane 12 may also serve to increase or maintain flux, or at least reduce the decline over time of the flux, of purified water 28 through membrane 10 from reverse osmosis of saltwater 26. During reverse osmosis, the application of hydrostatic pressures via saltwater 26 to conventional thin film composite membranes (TFC) is known to cause a reduction of membrane permeability, probably due to compaction of support membrane 12. When a polymeric membrane is put under pressure, the polymers are slightly reorganized and the structure is changed, resulting in a lowered porosity, increased membrane resistance, and eventually lowered flux. As the applied pressure is increases, so does the extent of physical compaction. Generally the flux decline of TFC membranes in brackish water desalination is around 15-25% and in sea water desalination it is as high as 30-40% due to compaction. The compaction problem in polyamide thin film composite (TFC) reverse osmosis (RO) membranes probably arises mainly due to compaction of the thick porous polysulfone support layer, membrane 12. The use of nanoparticles 16 in porous support membrane 12 may therefore also reduce flux flow decline over time by, perhaps, resisting or limiting compaction of support membrane 12.

By dispersing metal ion releasing nanoparticles 16 in support membrane 12 to release metal ions 17 in aqueous solution 14 before or during interfacial polymerization, increased flux is often observed in the resultant RO membrane 10. Nanoparticles in solution in aqueous solution 14 or organic solution 18 may release metal ions 17 before the polymerization. Dissolved metal ions 17 are thought to affect the polymerization reaction and ultimately membrane structure leading to improved performance. It is thought that the dissolved metal ions 17 may serve as a template to guide polymerization leaving spaces or channels for increased water transport.

During fabrication, porous support membrane 12 including nanoparticles 16 dispersed therein, and/or an the surface thereof, can be immersed in an aqueous solution, such as aqueous phase 14, containing a first reactant (e.g., 1,3-diaminobenzene or "MPD" monomer) to release soluble metal ions 17 therein. Support membrane 12 can then be put in contact with an organic solution, such as organic phase 18, containing a second reactant (e.g., trimesoyl chloride or "TMC" initiator). Typically, the organic or apolar liquid is immiscible with the polar or aqueous liquid, so that the reaction occurs at the interface between the two solutions, e.g. between aqueous and organic phases 14,18 to form a dense polymer layer on surface of support membrane 12.

Suitable nanoparticles 16 for dispersion in support membrane 12 as described above, include those selected for their ability to release alkaline earth metals, or other metal species, into organic phase 14 during the interfacial polymerization reaction, especially when nanoparticles 16 are processed to enhance solubility of metal ions such as alkaline earth metals 17.

Porous support membranes 12 are typically kept wet until use. Nanoparticles 16 may be selected to release metal ions 17 which may enter the water or other solvent contained within or on support membrane 12. The amount of metal ions 17 available for the interfacial polymerization of aqueous phase 14 and organic phase 18 may in some cases be increased by storing support membrane 12, for example in roll form, for a suitable time period such as at least one hour before fabrication of RO membrane 10.

It may be important to allow sufficient time for metal ions 17 to diffuse from support membrane 12 into aqueous phase 14 before or during interfacial polymerization. A time of between 2 seconds and 5 minutes, and preferably between 10 seconds and 2 minutes is currently believed to be suitable for such diffusion so that metal ions 17 from nanoparticles 16 impacts formation of discrimination layer 24 and improves performance of RO membrane for example by increasing water flux therethrough for the same applied pressure.

It may be advantageous to pre-process nanoparticles 16 by using sonic energy from a sonic probe or sonic bath before incorporation thereof in support membrane 12 and/or further sonicate either aqueous phase 14, organic phase 18 or both just before or during interfacial polymerization. Sonication processing nanoparticles 16 may include immersing a sonic probe directly into casting solution 13 from which support membrane 12 is formed or into organic or aqueous phases 14 and/or 18 and/or placing solutions with nanoparticles 16 in a vessel and immersing the vessel in a sonic bath. Solutions are subjected to sufficient sonic energy from 10 to 60 minutes to aid in the release of metal species, such as alkaline earth metal ions 17, into the solution. After sonication, the solution contains additional metal species. Additional sonication time may release additional metal species up to some limit equilibrium.

Processing of selected nanoparticles 16 may also be accomplished using shear, cavitation, and impact forces generated by 1 to 60 minutes in a Microfluidizer (a trademark of the Microfluidics Corp.). After processing, the solution contains additional metal species that were dissolved from nanoparticles 16.

Processing of selected nanoparticles 16 may be also accomplished using a solution containing nanoparticles 16 in a vessel with a stir bar and using a stir plate to propel the stir bar in the solution or alternatively using a motorized propeller to stir the solution or alternatively using a lab tray shaker. Stirring or shaking is most effective for nanoparticles that have been selected for high solubility in either the aqueous or the organic phases 14, 18.

Processing of the selected nanoparticles 16 may be accomplished using a solution containing nanoparticles 16 in a vessel and adjusting the pH either lower than about 6 and more preferably less than about 5 for at least 30 seconds, to a pH greater than about 8 and more preferably greater than about 9 for at least 30 seconds. Whether pH is adjusted higher than about 8 or lower than about 6 may dependent on the solubility characteristics of the specific type of nanoparticle 16.

The term "molecular additive" encompasses a wide range of additives including metal ions and mHTMC. In FIG. 15-17, preferred concentrations of molecular additives such as metal ions are from 0.0001% (weight percent equivalent of 1 ppm) to 5% by weight and more preferred from 0.05% to 1% into aqueous layer 14. Processing may enhance nanoparticle dissolution, or other techniques for adding molecular additives to assist in achieving the desired concentrations of molecular additives 17 in solution. In some embodiments, processed nanoparticles or other carries may have been broken or partially dissolved using shear, cavitation, or impact forces to maximize said soluble metal species contributed to the interfacial polymerization mixture, including a microfluidizer apparatus. The nanoparticles or other relatively insoluble carriers may have been calcined for at least 1 hour at 200° C. or more. The processed carriers can have been shaken in aqueous solution on a shaker table for at least 1 minute. Carriers may have been processed by subjecting them to sonic energy in a vessel having a sonic probe within a solution, said energy sufficient to increase the soluble metal species or other molecular additives contributed by the processed carriers to the interfacial polymerization mixture, e.g., in a vessel suspended in a sonic bath for at least 5 minutes.

The nanoparticles or other relatively insoluble carriers may have been processed in a solution at a pH lower than about 6 for at least 30 seconds or at a pH lower than about 5 for at least 30 seconds. The nanoparticles or other relatively insoluble carriers may have been processed in a solution at a pH greater than about 8 for at least 30 seconds or in a solution at a pH greater than about 9 for at least 30 seconds. Nanoparticles or other relatively insoluble carriers may have been processed with heat in a solution for at least 5 minutes at a temperature of 40° C. or more. Nanoparticles or other relatively insoluble carriers may have been processed with chelating agents in solution to bind soluble metal species or other molecular additives.

Zeolites and other inorganic mineral compounds may also be further selected for use as nanoparticles 16 to release molecular additives 17 based on the degree of crystallization the nanoparticles 16. Amorphous portions of nanoparticles 16 are typically more soluble than crystalline portions of the nanoparticle and processing can increase solubility. The amount of crystalline material can be determined through several techniques including x-ray crystallography.

Figure 2:
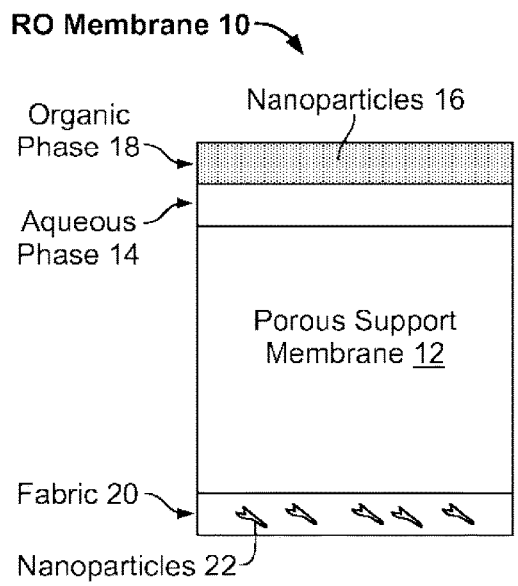
FIG. 2 is a block diagram illustrating the layers in a step in the process of preparing a TFC membrane in which nanoparticles 16 are present in organic phase 18.
Figure 3:
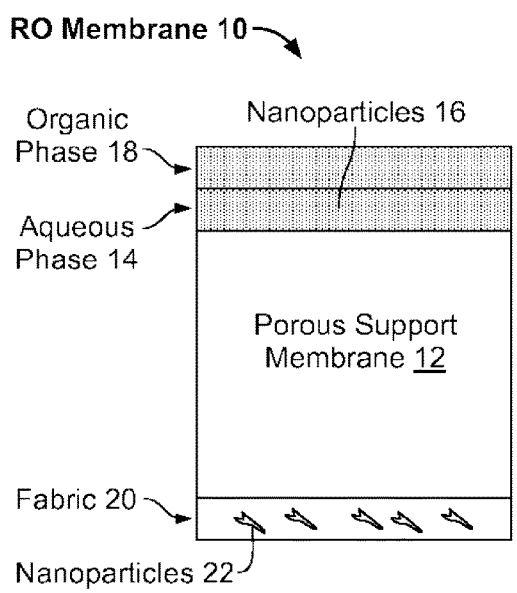
FIG. 3 is a block diagram illustrating the layers in a step in the process of preparing a TFC membrane in which nanoparticles 16 are present in both aqueous phase 14 and organic phase 18.
Figure 4:
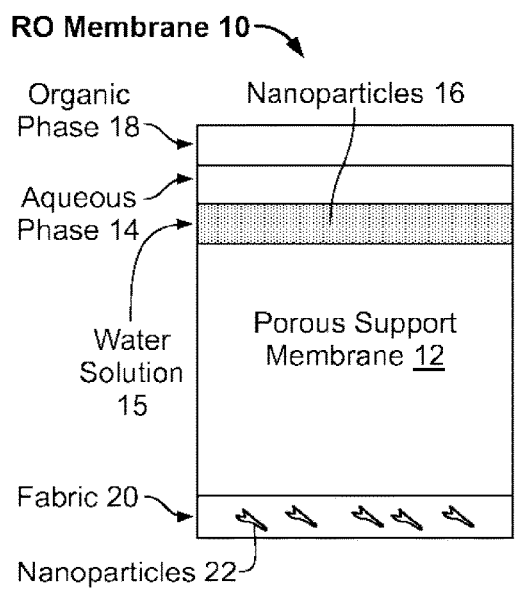
FIG. 4 is a block diagram illustrating the layers in a step in the process of preparing a TFC membrane in which nanoparticles 16 are present in water solution 15 between porous support membrane 12 and aqueous phase 14.

Referring now also to FIGS. 2-4, nanoparticles or other insoluble carriers 16 may be included in organic phase or layer 18, both aqueous layer 14 and organic layer 18, and/or also or only in a layer between aqueous phase 14 and support membrane 12 for example in water solution 15 in liquid communication with both aqueous layer 14 and the water wetted surface of support membrane 12. Nanoparticles or other relatively insoluble carriers 16 may in fact be in the water wetted surface of support membrane 12 whether or not included in the aqueous layer 14 or organic layer 18.

Support membrane 12 is typically a polymeric microporous support membrane, which in turn is often supported by non-woven or woven fabrics, such as fabric 20, for mechanical strength. Support membrane 12 may conventionally be made from polysulfone or other suitably porous membranes, such as polyethersulfone, poly(ether sulfone ketone), poly(ether ethyl ketone), poly(phthalazinone ether sulfone ketone), polyacrylonitrile, polypropylene, cellulose acetate, cellulose diacetate, or cellulose triacetate. These microporous support membranes 12 are typically 25-250 microns in thickness and may have the smallest pores located very near the upper surface. Porosity at the surface may be low, for instance from 5-15% of the total surface area.

The preparation of support membrane 12 may begin with the addition of N-methyl pyrrolidone (NMP) solvent (Acros Organics, USA) to a polysulfone polymer (M-26,000 from Aldrich, USA) in transparent bead form in airtight glass bottles. Alternatively dimethylformamide (DMF) may be used as the solvent. Nanoparticles 16 may be dispersed in the NMP before its addition to the polysulfone polymer. The solution may then be agitated for several hours until complete dissolution is achieved, forming the dope or casting solution 13. Casting solution 13 may then be cast or spread over non-woven fabric 20 attached to glass plate 15 via a knife-edge. Glass plate 15 may then be immediately immersed into demineralized water, which had preferably been maintained at the desired temperature. Immediately, phase inversion begins and after several minutes, non-woven support fabric 20 supporting polysulfone membrane 12 may be separated from glass plate 15. Membrane 12 is then washed thoroughly with deionized water and stored in cold conditions until used. In a continuous coating process, glass plate 15 would not be required.

Nanoparticles such as zeolites, particularly LTA, may be added to support membrane 12 during processing to improve flux for reverse osmosis by, perhaps, improving porosity e.g. at the surface of support membrane 12 and/or by making membrane 12 more resistant to compaction.

In some circumstances, nanoparticles or other relatively insoluble carriers 16 may be added to aqueous phase 14 to improve RO membrane characteristics such as flux without reducing rejection as much as adding nanoparticles 16 to the organic phase 18. Nanoparticles or other relatively insoluble carriers 16 may similarly be included in a layer between support membrane 12 and discrimination layer 24 as shown below in FIG. 6. In preferred embodiments, the rejection is at least 99.5% and the flux is at least 30, 35 or 40 GFD.

Nanoparticles or other relatively insoluble carriers 16 may includes a metallic species such as gold, silver, copper, zinc, titanium, iron, aluminum, zirconium, indium, tin, magnesium, or calcium or an alloy thereof or an oxide thereof or a mixture thereof. They can also be a nonmetallic species such as $Si_3N_4$, SiC, BN, $B_4C$, or TiC or an alloy thereof or a mixture thereof. They can be a carbon-based species such as graphite, carbon glass, a carbon cluster of at least $C_2$, buckminsterfullerene, a higher fullerene, a carbon nanotube, a carbon nanoparticle, or a mixture thereof.

Suitable zeolites for use as nanoparticles 16 include LTA, RHO, PAU, and KPI. Such synthetic zeolites have different Si/Al ratios, and exhibit different characteristic charge and hydrophilicity and may therefore be selected for RO membranes 10 in different circumstances. Nanoparticles 16 may also include zeolite precursors or amorphous aluminosilicates.

Zeolites can be crystalline aluminosilicates with fully cross-linked, open framework structures made up of corner-sharing $SiO_4$ and $AlO_4$ tetrahedra. A representative empirical formula of a zeolite is $M_{2/n}O.Al_2O_3.xSiO_2.yH_2O$ where M represents the exchangeable cation of valence n. M is generally a Group I or II ion, although other metal, non-metal, and organic cations can also balance the negative charge created by the presence of Al in the structure. The framework can contain interconnected cages and channels of discrete size, which can be occupied by water. In addition to $Sr^{4+}$ and $Al^{3+}$, other elements can also be present in the zeolitic framework. They need not be isoelectronic with $Si^{4+}$ or $Al^{3+}$, but are able to occupy framework sites. Aluminosilicate zeolites typically display a net negative framework charge, but other molecular sieve frameworks can be electrically neutral.

Aluminosilicate zeolites with a Si:Al ratio less than 1.5:1 are preferred. Other preferred minerals include Aluminite, Alunite, Ammonia Alum, Anauxite, Apjohnite, Basaluminite, Batavite, Bauxite, Beidellite, Boehmite, Cadwaladerite, Cardenite, Chalcoalumite, Chiolite, Chloraluminite, Cryolite, Dawsonite, Diaspore, Dickite, Gearksutite, Gibbsite, Halloysite, Hydrobasaluminite, Hydrocalumite, Hydrotalcite, Illite, Kalinite, Kaolinite, Mellite, Montmorillonite, Natroalunite, Nontronite, Pachnolite, Prehnite, Prosopite, Raistonite, Ransomite, Saponite, Thomsenolite, Weberite, Woodhouseite, and Zincaluminite.

Zeolites and other inorganic mineral compounds may also be further selected based on the degree of crystallization. Amorphous portions of the nanoparticle are typically more soluble than crystalline portions of the nanoparticle and processing can increase solubility. The amount of crystalline material can be determined through several techniques including x-ray crystallography. The nanoparticles may have a structure with greater than 0.5%, 1% or 5% amorphous material by mass within the particle and may have a surface containing at least 40% of aluminum atoms or oxygen atoms directly bound to aluminum atoms.

Minerals that have similar cage-like framework structures to Zeolites or have similar properties and/or are associated with zeolites include the phosphates: kehoeite, pahasapaite and tiptopite; and the silicates: hsianghualite, lovdarite, viseite, partheite, prehnite, roggianite, apophyllite, gyrolite, maricopaite, okenite, tacharanite and tobermorite. Thus, minerals similar to zeolites may also be molecular sieves based on $AlPO_4$. These aluminophosphates, silicoaluminophosphates, metalloaluminophosphates and metallosilicoaluminophosphates are denoted as $AlPO_{4-n}$, SAPO-n, MeAPO-n and MeAPSO-n, respectively, where n is an integer indicating the structure type. $AlPO_4$ molecular sieves can have the structure of known zeolites or other structures. When Si is incorporated in an $AlPO_{4-n}$ framework, the product can be known as SAPO. MeAPO or MeAPSO sieves are can be formed by the incorporation of a metal atom (Me) into an $AlPO_{4-n}$ or SAPO framework. These metal atoms include Li, Be, Mg, Co, Fe, Mn, Zn, B, Ga, Fe, Ge, Ti, and As.

Most substituted $AlPO_{4-n}$'s have the same structure as $AlPO_{4-n}$, but several new structures are only found in SAPO, MeAPO and MeAPSO materials. Their frameworks typically carry an electric charge.

Non-zeolite nanoparticles and or other relatively insoluble carriers may be selected from a list of inorganic mineral compounds that have a solubility product such that preferred concentrations of dissolved molecular additives can be achieved. For many compounds, these solubility products (Ksp) are well known. For compounds where these are not known experimentally, molecular additive releasing or other relatively insoluble carriers may also be selectable by their counter ion. In such cases, compounds may be selected based on the presence of sulfate, hydroxide or oxide counterions. Solubility of these non-zeolite nanoparticles or other relatively insoluble carriers can be enhanced using processing.

Particle size is often described in terms of average hydrodynamic diameter, assuming a spherical shape of the particles or other relatively insoluble carriers. Selected nanoparticle or other relatively insoluble carriers 16 can have an average hydrodynamic diameter of from about 0.1 nm to about 1000 nm, from about 10 nm to about 1000 nm, from about 20 nm to about 1000 nm, from about 50 nm to about 1000 nm, from about 0.11 nm to about 500 nm, from about 10 nm to about 500 nm, from about 50 nm to about 250 nm, from about 200 nm to about 300 nm, or from about 50 nm to about 500 nm.

Suitable nanoparticles or other relatively insoluble carriers are often dispersed in a solution compatible with the aqueous or polar solvent that will be used during interfacial polymerization. (In many cases water may be used as both the dispersion solvent and the aqueous solvent for use during the reaction). This dispersion largely includes isolated and individual nanoparticles or other relatively insoluble carriers. Suitable methods for dispersion include stirring, ultrasonication, shaking, use of surfactants or cosolvents, use of Microfluidizer™ (a trademark of the Microfluidics Corp.) material or similar materials, use of mortar and pestle, use of a ball mill or jar mill. In many cases some of the nanoparticles or other relatively insoluble carriers may still be associated with other nanoparticles or other relatively insoluble carriers. These aggregates may be left in solution, or removed by a suitable technique.

By dispersing nanoparticles or other relatively insoluble carriers in the aqueous or polar solvent used during interfacial polymerization, TFC membranes including nanoparticles or other relatively insoluble carriers having improved performance can be obtained. In particular increased flux is often observed with TFC membranes prepared with solutions containing well dispersed nanoparticles or other relatively insoluble carriers. Inclusion of suitable (e.g. having optimized size, shape, porosity, and/or surface chemistry) nanoparticles or other relatively insoluble carriers in the aqueous solution or organic solution, followed by appropriate preparation techniques, can lead to such well dispersed solutions of nanoparticle or other relatively insoluble carriers. As a result of using such well dispersed solutions or other relatively insoluble carriers films with a high number of nanoparticles or other relatively insoluble carriers incorporated in the final membrane can be prepared.

In such a dispersion, nanoparticles or other relatively insoluble carriers 16 can exist either as isolated and individual species or as building blocks incorporated in larger aggregate structures. These structures can be fairly stable and unchanging such as those formed during synthesis (for instance during calcinations of zeolites) or they can be transient structures arising from thermodynamics of the carriers and solution. Well dispersed solutions, that is solutions in which the nanoparticles or other relatively insoluble carriers are well dispersed, primarily contain isolated and individual nanoparticles or other relatively insoluble carriers rather than aggregates of such particles. In particularly, it may be preferable to use a solution containing primarily isolated and individual nanoparticles or other relatively insoluble carriers and very few larger structures such as aggregates. In this manner the largest number of isolated nanoparticles or other relatively insoluble carriers can be incorporated within the final membrane and/or serve to optimize the structure of the membrane.

Solutions in which nanoparticles or other relatively insoluble carriers are well dispersed, without substantial aggregates, can be attained by the use, for example of nanoparticles of zeolite LTA in the aqueous or polar solvent 14 that will be used during interfacial polymerization. (In many cases water is used as both the dispersion solvent and the aqueous solvent for use during the reaction). This dispersion largely has isolated and individual nanoparticles. This particular solution is well dispersed due to the hydrophilic surface of LTA and its strong interaction with water, its small size of less than 1 micron. Suitable methods for causing the desired dispersion include stirring, ultrasonication, shaking, use of surfactants or cosolvents, use of a Microfluidizer™ type material, use of mortar and pestle, use of a ball mill or jar mill. In particular, high intensity ultrasonication or the Microfluidizer performed for a sufficient time period results in well dispersed solutions.

Referring now to FIGS. 1-4, aqueous phase 14 used during interfacial polymerization may also include one of the reactants, nanoparticles, or other relatively insoluble carriers, and processing aids such as surfactants, drying agents, catalysts, coreactants, cosolvents, etc.

Generally, the polymer matrix which forms discrimination layer 24 can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers can also be chosen so as to be capable of undergoing an interfacial polymerization reaction to form a polymer matrix (i.e., a three-dimensional polymer network) when brought into contact. The first and second monomers can also be chosen so as to be capable of undergoing a polymerization reaction when brought into contact to form a polymer product that is capable of subsequent crosslinking by, for example, exposure to heat, light radiation, or a chemical crosslinking agent.

The first monomer can be selected so as to be soluble in a polar liquid, preferably water, to form a polar mixture. Generally, the difunctional or polyfunctional nucleophilic monomer can have primary or secondary amino groups and can be aromatic (e.g., a diaminobenzene, a triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, piperazine, and tris(2-diaminoethyl)amine). In a yet further example, the polar liquid and the first monomer can be the same compound; that is, the first monomer can provided and not dissolved in a separate polar liquid.

Examples of suitable amine species include primary aromatic amines having two or three amino groups, for example m-phenylene diamine, and secondary aliphatic amines having two amino groups, for example piperazine. The amine can typically be applied to the microporous support as a solution in a polar liquid, for example water. The resulting polar mixture typically includes from about 0.1 to about 20 weight percent, preferably from about 0.5 to about 6 weight percent, amine. Once coated on a porous support, excess polar mixture can be optionally removed. The polar mixture need not be aqueous, but the polar liquid should be immiscible with the apolar liquid. Although water is a preferred solvent, non-aqueous polar solvents can be utilized, such as acetonitrile and dimethylformamide (DMF).

The polar mixture can typically be applied to microporous support membrane 12 by dipping, immersing, coating or other well known techniques. Once coated on porous support membrane 12, excess polar mixture can be optionally removed by evaporation, drainage, air knife, rubber wiper blade, nip roller, sponge, or other devices or processes.

Organic phase 18 used during interfacial polymerization may also include one of the reactants, nanoparticles, or other relatively insoluble carriers, and processing aids such as catalysts, co-reactants, co-solvents, etc.

A second monomer can be selected so as to be miscible with the apolar (organic) liquid forming an apolar mixture, although for monomers having sufficient vapor pressure, the monomer can be optionally delivered from a vapor phase. The second monomer can optionally also be selected so as to be immiscible with a polar liquid. Typically, the second monomer can be a dielectrophilic or a polyelectrophilic monomer. The electrophilic monomer can be aromatic in nature and can contain two or more, for example three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability.

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide can be dissolved in the apolar organic liquid in a range of for example, from about 0.01 to about 10.0 weight percent or from about 0.05 to about 3 weight percent. Suitable apolar liquids are capable of dissolving the electrophilic monomers (e.g. polyfunctional acyl halides) and which are immiscible with a polar liquid (e.g., water). In particular, suitable apolar liquids can include those which do not pose a threat to the ozone layer and yet are sufficiently safe in terms of their flashpoints and flammability to undergo routine processing without having to undertake extreme precautions. These include $C_5$-$C_7$ hydrocarbons and higher boiling hydrocarbons, i.e., those with boiling points greater than about 90° C., such as $C_8$-$C_{24}$ hydrocarbons and mixtures thereof, which have more suitable flashpoints than their $C_5$-$C_7$ counterparts, but are less volatile. The apolar mixture can typically be applied to the microporous support membrane 12 by dipping, immersing, coating or other well known techniques.

In one embodiment, the polyfunctional acyl halide monomer (also referred to as acid halide) is coated on support membrane 12, typically from organic phase solution 18. Amine solution 14 is typically coated first on porous support 12 followed by acyl halide solution 18. The monomers can react when in contact, thereby polymerizing to produce a polymer (e.g., polyamide) matrix film discrimination layer 24 at the upper surface of support structure 12. Although one or both of the polyfunctional amine and acyl halide layers can be applied to porous support 12 from a solution, such as aqueous and organic solutions 14 and 18, they can alternatively be applied by other means such as by vapor deposition, or heat.

In another embodiment, by dissolving an molecular additives 16 in the aqueous or polar solvent 14 and/or organic phase layer 18 (or both) used during interfacial polymerization before contact therebetween, increased flux is often observed through membrane 10 during reverse osmosis without substantially affecting salt rejection.

Suitable earth alkaline metal species or other molecular additives 16 include salts or compounds that are dissolvable to some extent in either the aqueous phase layer 14 or the organic phase layer 18 or both. Different species may be used for the aqueous phase layer 14 and the organic phase layer 18. In many embodiments the beta-diketonate may be an acetoacetonate. Preferred species in the organic phase for aluminum species include $Al(acac)_3$, wherein (acac) is acetylacetonate, a bidentate ligand. Preferred species in the aqueous layer include sodium aluminate, aluminum citrate, and aluminum camphorsulfonate. Preferred species for other molecular additives including earth alkine metals are set forth in Tables I-XII herein below.

Preferred concentrations of the metal species are from 0.005 wt. % to 5 wt. % by weight and more preferred from 0.05 wt. % to 1 wt. % in either aqueous layer 14 or organic layer 18.

When molecular species are used in the organic phase 18, it may be beneficial to sonicate the solution. Sonication may serve to better disperse the molecular species. Sonication may also serve to drive reactions that would otherwise require higher temperatures, catalysts, or initiators to occur.

In some cases, performance can be further improved by the addition of a rinse in a high pH aqueous solution after RO membrane 10 is formed. For example, membrane 10 can be rinsed in a sodium carbonate solution. The pH is preferably from 8-12, and exposure time may vary from 10 seconds to 30 minutes or more. The rinse may alternatively be a hot water rinse with temperatures of 60-98 C. The rinse may also include a chlorine species such as sodium hypochlorite.

Figure 6:
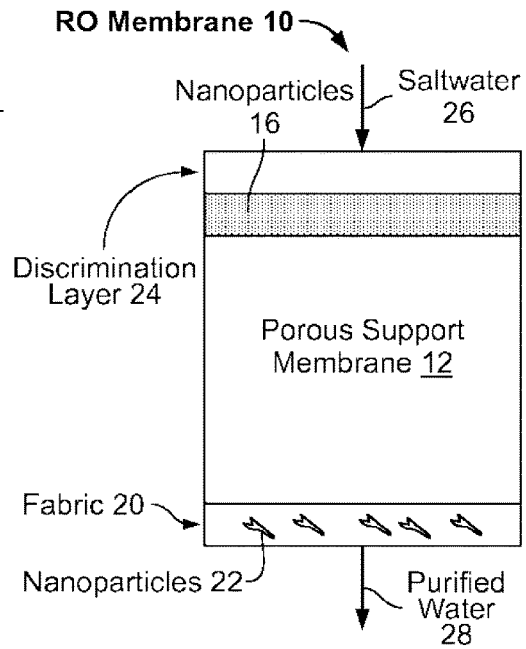
FIG. 6 is a block diagram showing the use of a TFC membrane, having nanoparticles 16 between discrimination layer 24 and porous support membrane 12, in a reverse osmosis process.
Figure 7:
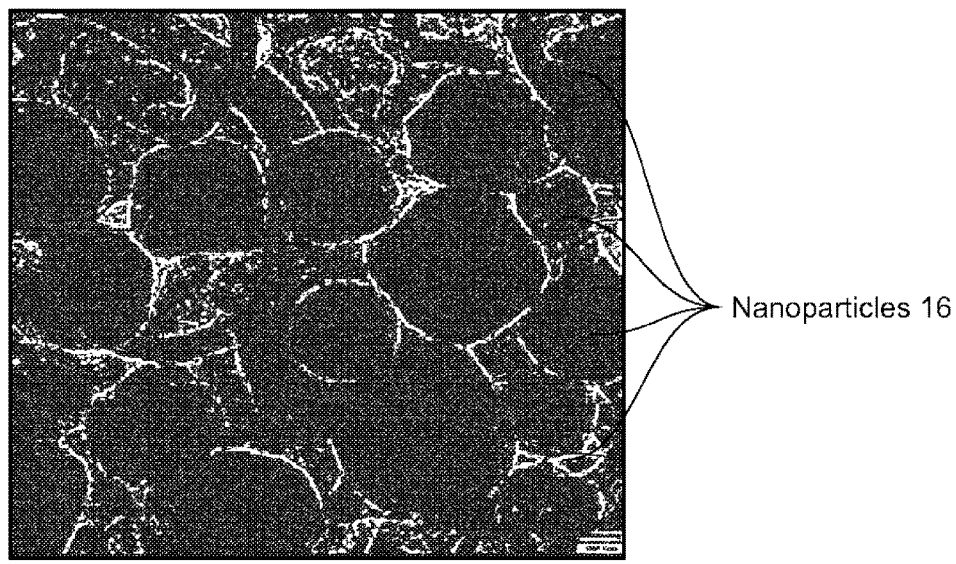
FIG. 7 is a TEM micrograph of discrimination layer 24 illustrating nanoparticles 16 in a thin film polymer matrix.
Figure 8:
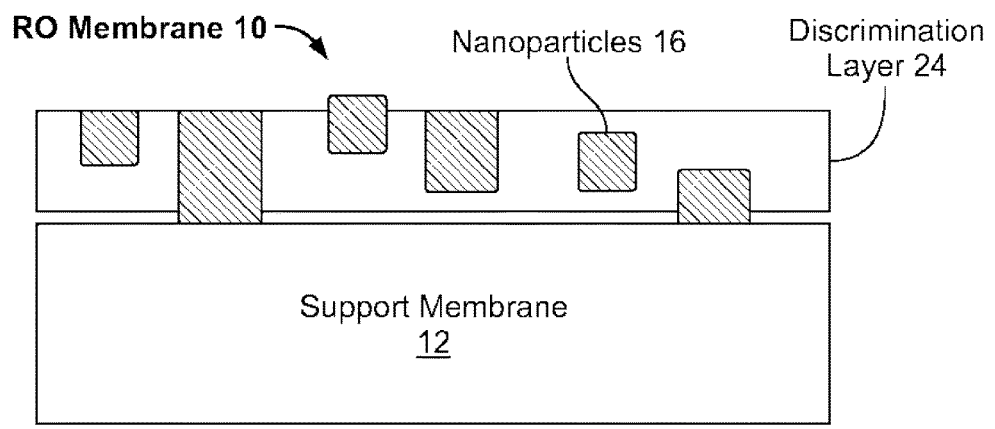
FIG. 8 is a cross section view of RO membrane 10 including nanoparticles 16 in discrimination layer 24 on support membrane 24.
Figure 9:
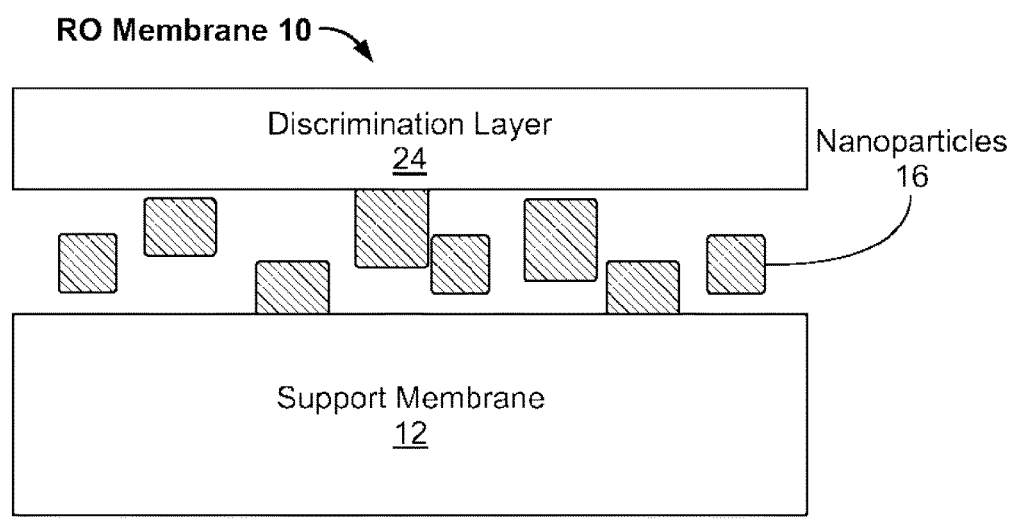
FIG. 9 is a cross section view of RO membrane 10 including nanoparticles 16 in discrimination layer 24 on support membrane 24.

Interfacial polymerization occurs at the interface between aqueous phase layer 14 and organic phase layer 18 to form discrimination layer 24, as shown in FIGS. 6, 8, and 9.

Discrimination layer 24 may typically be a composite polyamide membrane prepared by coating porous support membrane 12 with a polyfunctional amine monomer, most commonly coated from aqueous phase solution 14. Although water is a preferred solvent, non-aqueous solvents can be utilized, such as acetonitrile and dimethylformamide (DMF). A polyfunctional acyl halide monomer (also referred to as acid halide) may then subsequently be coated on support membrane 12, typically from organic phase solution 18. The amine solution 14 is typically coated first on 12 porous support followed by acyl halide solution 18. The monomers can react when in contact, thereby polymerizing to produce a polymer (e.g., polyamide) matrix film 24 at the upper surface of support structure 12. Although one or both of the polyfunctional amine and acyl halide can be applied to porous support 12 from a solution, such as aqueous and organic solutions 14 and 18, they can alternatively be applied by other means such as by vapor deposition, or heat.

In some embodiments, by dispersing molecular additives such as earth alkaline and other metals 16 in the aqueous or polar solvent 14 and/or organic phase layer 18 used during interfacial polymerization, increased flux is often observed. Nanoparticles and other relatively insoluble carriers in solution may release molecular additives before the polymerization reaction occurs to the aqueous solution 14 or organic solution 18. The dissolved molecular additive is thought to affect the polymerization reaction and ultimately membrane structure leading to improved performance. It is thought that the dissolved molecular additive may serve as a template to guide polymerization leaving spaces or channels for increased water transport. Suitable nanoparticles or other relatively insoluble carriers for dispersion include those selected for their ability to release the desired molecular additives in either the organic phase or the aqueous phase of an interfacial polymerization reaction.

The solubility constant may be considered to be the mass of molecular additive in solution (e.g. additive 17) divided by the initially used mass of nanoparticle or other carrier in the same solution. For example, a 5 wt % solution of nanoparticle that gives 1 ppm of dissolved metal species would give a 0.002% solubility constant, and a 1% solution giving 1 ppm give 0.01%. Solubility of minerals can be used as a general guide to the solubility of those same mineral nanoparticles.

However, smaller nanoparticles have greater surface exposure per unit mass and smaller nanoparticles increase the number of exposed metal or other atoms per unit area over and above a simple surface area effect. Greater exposure of such atoms or molecules in solution may increase solubility of the desired additives. Presence of counter ions such as sulfate, hydroxide and fluoride may also increase solubility.

Mineral solubility can be enhanced using processing.

Calcined zeolite nanoparticles may increase additive solubility because the calcining process may increase the amount of additive in pores and hence available for exchange.

Zeolites and other inorganic mineral compounds can be further selected based on the degree of crystallization. Amorphous portions of the nanoparticle are more soluble than crystalline portions of the nanoparticle. The amount of crystalline material can be determined through several techniques including x-ray crystallography.

Non-zeolite nanoparticles may be selected from a list of inorganic mineral compounds that have a solubility product such that preferred concentrations of dissolved metal species or other additives can be achieved. For many compounds these solubility products (Ksp) are well known. For compounds where these are not known experimentally, additive releasing nanoparticles can also be selected by their counter ion. In this case compounds are selected based on the presence of sulfate, hydroxide or oxide counter ions.

Preferred concentrations of the additives dissolved from nanoparticles are from 0.0001% to 5% by weight, and more preferred from 0.05 wt. % to 1 wt. % in either aqueous layer 14 or organic layer 18.

Non-zeolite hydrocarbon nanoparticles can be selected based on the presence of the desired additive in the ash of these hydrocarbons. The presence of the additive in the ash of these compounds may relate to the ability of these compounds to release the additive in solution. These hydrocarbon nanoparticles are preferably included in the organic phase 18.

It is often beneficial to sonicate the solution. Sonication may serve to better disperse the nanoparticles. Sonication may also serve to drive reactions that would otherwise require higher temperatures, catalysts, or initiators to occur.

The porous support structure can be immersed in an aqueous solution containing a first reactant (e.g., 1,3-diaminobenzene or "MPD" monomer). The substrate can then be put in contact with an organic solution containing a second reactant (e.g., trimesoyl chloride or "TMC" monomer). Typically, the organic or apolar liquid is immiscible with the polar or aqueous liquid, so that the reaction occurs at the interface between the two solutions to form a dense polymer layer on the support membrane surface.

Representative conditions for reaction of an amine (e.g., MPD) with an electrophile (e.g., TMC) to form a polyamide thin film composite membrane, employ a concentration ratio of MPD to TMC of about 10-20, with the MPD concentration being about 1 to 6 weight percent of the polar phase (aqueous phase 14). The polymerization reaction can be carried out at room temperature in an open environment, or the temperature of either the polar or the apolar liquid, or both, may be controlled. Once formed, the dense polymer layer, which becomes discrimination layer 24, can advantageously act as a barrier to inhibit contact between the reactants and to slow the reaction. Hence, a selective dense layer is formed which is typically very thin and permeable to water, but relatively impermeable to dissolved, dispersed, or suspended solids, such as salts to be removed from saltwater or brackish water in use to produce purified water. This type of membrane is conventionally described as a reverse osmosis (RO) membrane.

Once the polymer layer is formed, the apolar liquid can be removed by evaporation or mechanical removal. It is often convenient to remove the apolar liquid by evaporation at elevated temperatures, for instance in a drying oven.

In some cases, performance can be further improved by the addition of a rinse step using a high pH aqueous solution after RO membrane 10 is formed. For example, membrane 10 can be rinsed in a sodium carbonate solution. The pH is preferably from 8-12, and exposure time may vary from 10 seconds to 30 minutes or more.

Referring now to FIG. 6, when used for saltwater purification, saltwater 26 may be applied under pressure to discrimination layer 24 including nanoparticles 16. Purified water 28 then passes through porous support membrane 12 and fabric layer 20 if present.

Referring now also to FIG. 9, nanoparticles 16 may also, or only, be present between discrimination layer 24 and the top surface of support membrane 12.

Figure 5:
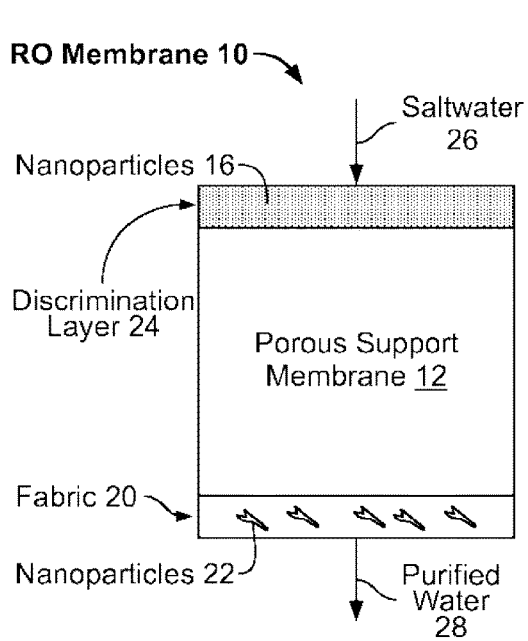
FIG. 5 is a block diagram showing the use of a TFC membrane, having nanoparticles 16 in a layer discrimination layer 24, in a reverse osmosis process.

Referring now to FIGS. 5, 6, and 8, nanoparticles can be included within membranes for several reasons, for instance to increase permeability, to alter surface chemistry, to alter roughness or morphology, or to enable anti-bacterial activity and particularly to reduce fouling especially in the presence of other molecular additives. For these and other applications it may be useful to increase the number of nanoparticles within RO membrane 10. The percent of the surface of RO membrane 10 containing nanoparticles 16 can be measured by any suitable technique. For nanoparticles 16 of zeolite LTA, this incorporation can effectively be measured by isolating the thin film of discrimination layer 24 and using transmission electron microscopy (TEM) to measure the percentage of the membrane containing nanoparticles.

Using well dispersed nanoparticle solutions, membranes with more than 5 wt %, 10 wt. % or even 20 wt. % incorporation of nanoparticle zeolite LTA can be prepared. In some embodiments at least 20% of the membrane surface area consists of nanoparticles.

Surface properties of RO membrane 10, such as hydrophilicity, charge, and roughness, typically correlate with surface fouling of RO membrane 10. Generally, membranes with highly hydrophilic, negatively charged, and smooth surfaces yield good permeability, rejection, and anti-fouling behavior. The more important surface attributes of RO membranes to promote fouling resistance are hydrophilicity and smoothness. Membrane surface charge can also be a factor when solution ionic strength is significantly less than 100 mM, because at or above this ionic strength, electrical double layer interactions are negligible. Since many RO applications involve highly saline waters, one cannot always rely on electrostatic interactions to inhibit foulant deposition. Moreover, it has been demonstrated that polyamide composite membrane fouling by natural organic matter (NOM) is typically mediated by calcium complexation reactions between carboxylic acid functional groups of the NOM macromolecules and pendant carboxylic acid functional groups on the membrane surface.

To prevent scratching of the membrane surface or alter adsorption, hydrophilic polymer layer 30 may be applied to the surface of membrane 10. For example, a solution of polyvinylalcohol in water may be applied to the surface of membrane 10 followed by a heat cure.

In some instances, membranes such as RO membrane 10 may be used to desalinate waters containing materials which tend to accumulate on the membrane surface, decreasing the apparent permeability. These materials can include but are not limited to natural organic matter, partially insoluble inorganic materials, organic surfactants, silt, colloidal material, microbial species including biofilms, and organic materials either excreted or released from microbial species such as proteins, polysaccharides, nucleic acids, metabolites, and the like. This drop in permeability is often smaller for nanocomposite membranes as described herein than for membranes prepared by prior conventional techniques, due to a decreased amounts, density, viability, thickness and/or nature of the accumulated material.

This improvement in fouling resistance is, in part, related to the increased hydrophilicity of nanocomposite RO membranes 10. The increased hydrophilicity of TFC membrane 10 can be measured by the equilibrium contact angle of the membrane surface with a drop of distilled water at a controlled temperature. TFC membrane 10 can have a contact angle that is reduced by 5°, 10°, 15°, 25° or more, relative to a similarly prepared membrane without nanoparticles. The equilibrium contact angle can be less than 45°, less than 40°, than 37°, or even less than 25°.

An additional processing step may then be performed to increase the number of nanoparticles 16 on the surface of support membrane 12. This step can include using pressure or vacuum to pull solution through membrane 10, causing nanoparticles 16 to build up at the surface of support membrane 12, or can include evaporation of the amine solution leading to deposition of nanoparticles 16 on the surface of support membrane 12. Since the final number of nanoparticles 16 on the surface of RO membrane 10 will often impact performance, the coating thickness of the solution evaporation and the concentration method are all important to control.

Referring now also to FIGS. 8 and 9, in some embodiments, some nanoparticles 16 may be located at the interface between support membrane 12 and thin polymer film of discrimination layer 24, whether or not they are included in discrimination layer 24. At this location at the surface of membrane 12, nanoparticles 16 can reduce the resistance of flow by creating channels and flow paths between discrimination layer 12 and the microporous pores at the surface of support membrane 12. Because of the relatively low density of pores at the surface of the microporous support membrane 12, reducing the resistance at this location can increase the membrane permeability of RO membrane 10 white maintaining the rejection characteristics.

In some embodiments, some nanoparticles 16 are located within the thin polymer film of discrimination layer 24. In these cases, the interfacial polymerization may occur around and eventually incorporate nanoparticles 16. This can lead to additional flow paths through nanoparticles 16 leading to increased flow. In some instances this may lead to an alteration of the polymer film adjacent to nanoparticles 16 within discrimination layer 24, increasing the polymer film's ability to permeate water and retain salutes. This impact on adjacent polymer can occur in the area up to 10 nm, 1 micron, and even up to 100 microns from a particular nanoparticle 16. In such a way, dramatic increases in performance can be obtained by relatively few incorporated nanoparticles 16.

In some instances nanoparticles 16 affect the polymer itself before and during the reaction and alter the film chemistry and/or morphology leading to improved properties without incorporation of nanoparticles 16 into RO membrane 10.

In many cases it has been found that smaller diameters of nanoparticles 16 may give improved performance of thin film nanocomposite RO membrane 10. It is believed that larger nanoparticles and microparticles can lead to unsupported areas of the thin film polymer as well as tears in the thin film. These small tears can result in leakage through the film and a reduction in solute rejection. Use of smaller nanoparticles 16 allows a flux response with the smallest change in rejection characteristics of RO membrane 10.

Concentration of the selected nanoparticle 16 can also be important in performance of RO membrane 10. In many cases a higher concentration of nanoparticles 16 will lead to more incorporation within discrimination layer 24, and thus give a larger increase in flux. However above a sufficiently high concentration (e.g., more than 0.2 wt %, more than 0.5 wt %, more than 1 wt %, or more than 5 wt. %) there is little or no added benefit. In these cases, there may be an optimum concentration giving the largest flux response with a negligible decrease in salt rejection, which may be determined by a person of skill in this art. In other cases, it appears that only very small concentrations of nanoparticles 16 are needed to enhance membrane performance and any further increase in the concentration of nanoparticles will have little or no additional effect. In these cases, the smallest amount (preferably less than 0.2 wt., less than 0.1 wt. %, less than 0.05 wt. %, less than 0.01 wt. %) that gives a reproducible performance improvement from resulting RO membrane 10 may be selected. In such situations, nanoparticles 16 are often assisting, templating, and or altering the formation of the polymer itself, and it is the change in the final polymer membrane of discrimination layer 24 which gives the performance change.

As shown above it can be useful to obtain nanoparticles 16 of a tighter size distribution by controlling what may be called polydispersity. One means of doing this is through the use of a centrifuge. In a centrifuge, particles of larger mass have a faster settling velocity and form sediment at the bottom of a container while the remaining particles stay in solution. By removing the remaining liquid or the sediment both a different size and dispersity can be obtained, e.g. nanoparticles having a smaller average size and a smaller range of sizes.

Another method of improving polydispersity is through the use of microfluidization. Polydispersity can be calculated by dividing the volume average particle diameter by the number average particle diameter. A polydispersity approaching 1 indicates a tight range of sizes, while a bigger number indicates a larger range of sizes. Preferred polydispersities are less than 10, 5, 2, 1.5, 1.25, and most preferably less than 1.1. For example using sonication alone on sample of 100 nm LTA lead to a dispersion with a polydispersity of 62.4, while use of sonication followed by microfluidization and centrifugation lead to a polydispersity of 1.7. A separate sample of 400 nm LTA after sonciation and microfluidization had a polydispersity of 1.53.

Molecular Additives

Figure 22:
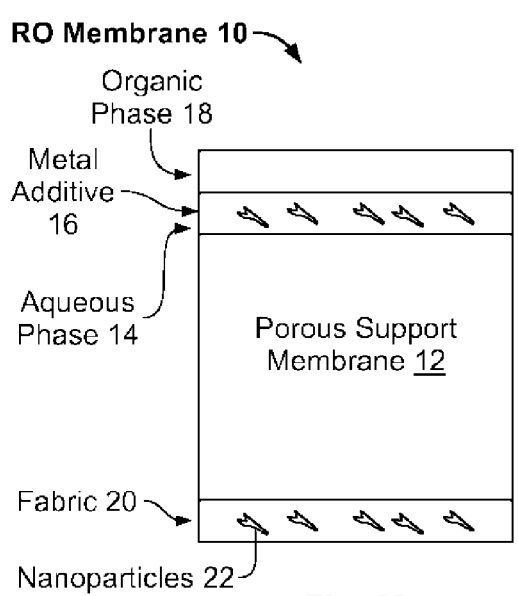
FIG. 22 is a diagrammatic view of RO membrane 10 during fabrication processing including molecular additive 16 in organic phase 18.
Figure 23:
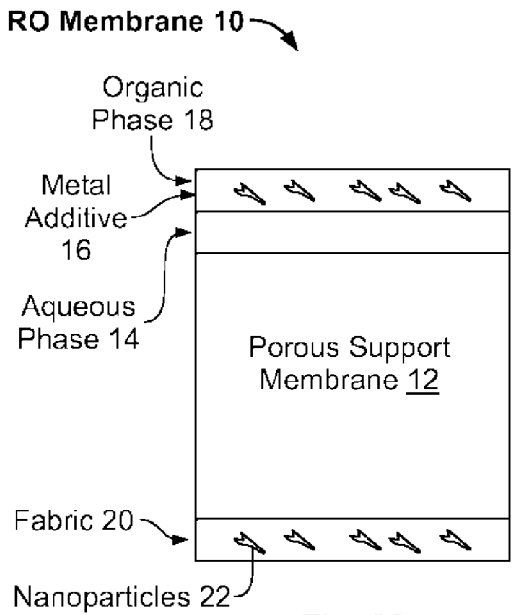
FIG. 23 is a diagrammatic view of RO membrane 10, including molecular additive 16 in discrimination layer 24 during reverse osmosis.
Figure 24:
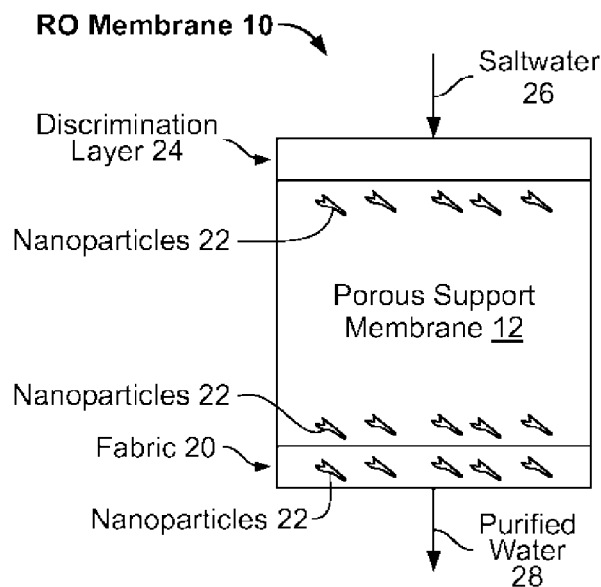
FIG. 24 is a diagrammatic view of RO membrane 10 used to purify saltwater.

Referring now to FIGS. 22 and 23, molecular additives 16 may be dissolved within the aqueous phase layer 14 as shown in FIG. 22, or in the organic phase layer 18 as shown in FIG. 23. Referring now particularly to FIG. 24, when RO membrane 10 is used for saltwater purification, saltwater 26 may be applied under pressure to discrimination layer 24. Purified water 28 then passes through porous support membrane 12 and fabric layer 20, if present. While not willing to be bound by theory, molecular additive 16 may become involved with the formation of the structure of the polymer forming discrimination layer 24 during interfacial polymerization and/or may not be present in discrimination layer 24 during operation of membrane 10.

By dissolving molecular additive 16 in aqueous or polar solvent 14 and/or organic phase layer 13 (or both) used during interfacial polymerization, increased flux is often observed through membrane 10 during reverse osmosis without substantially affecting salt rejection.

While not wishing to be bound by theory, it is believed that membrane 10 transports water by taking in water and providing conduits for water diffusion. These conduits within membrane 10 may be a result of the free volume in the polymer film and may be considered to be interconnected, atom-sized or larger voids within the polymer film. Membrane 10 made with metal or other molecular additive 16 may have increased free volume and thus may be capable of transporting water at a faster rate than a membrane prepared without metal other molecular additive 16. Metal other molecular additive 16 may initially be stable in solution, but HCl may be released from the polymerization reaction, metal additive 16 may be protonated and begin to precipitate, and this precipitation may give off heat at the locus of the polymerization. This heat may affect the aggregation of the forming polymer chains and may result in an altered structure that may have increased free volume potentially capable of taking in, and passing, more water. The ability to transport water through TFC membrane 10 may be thought of as a product of diffusion and the amount of water within membrane 10, this increased water uptake may result in increased permeability.

A molecular additive may be an at least partially soluble compound containing a central atom having a Pauling electronegativity of less than about 2.5. Molecular additives that have been previously been described have in some cases been relatively inefficient at increasing membrane permeability. In general the ligand is bound to an element selected from Groups 2-15 of the Periodic Table (IUPAC). In some embodiments the element selected from the group consisting of Groups 3-15 and Rows 3-6 of the Periodic Table (IUPAC), preferably Groups 3-14 and Rows 3-5 of the Periodic Table. In some embodiments, the metal may be aluminum, gallium, indium, vanadium, molybdenum, hafnium, cobalt, ruthenium, iron, chromium, cadmium, tin, beryllium, palladium, ytterbium, erbium, praseodymium, copper, zinc, magnesium, calcium, or strontium.

We have found that by adjusting the concentration of the reagents used to prepare the membrane to specific ranges, the molecular additives can be made to work more efficiently. More specifically, the concentration of TMC has been found to alter the effectiveness of molecular additives. Using concentrations of TMC 50% to 500% higher than commonly used in the industry (for example 0.1%) results in molecular additives giving a significantly larger increase in flux.

While using higher TMC concentrations, it may also be useful to adjust MPD concentrations, so that the ratio of MPD/TMC is kept below approximately 35/1. When this ratio is allowed to get too high, membrane rejection begins to suffer, for example membranes 148, 156, and 164. In some embodiments the TMC concentration in a) is 0.2-0.6% (w/w), preferably 0.3-0.5% (w/w). In some embodiments the TMC to monohydrolyzed TMC ratio in b) is from 50:1 to 15:1. In some embodiments the b) contains MPD, and the ratio of MPD/TMC is from 5-35 or from 5-25, or from 30-35.

B.5 Other Molecular Additives

Suitable molecular additives for additive 16 include compounds containing a central atom having a Pauling electronegativity of less than about 2.5 Particularly preferred are Al(acac)$_3$, Ga(acac)$_3$, In(acac)$_3$, V(acac)$_3$ and other aluminum, galium, indium or vanadium beta-diketonate complexes that are dissolvable to some extent in either the aqueous phase layer 14 or the organic phase layer 18 or both Preferred concentrations of the metal additive complex 16 are from 0.005% to 5% by weight and more preferred from 0.025% to 0.25% in organic layer 18. It may be beneficial to sonicate the solution. Sonication may serve to better disperse the metal in the organic solution 18. Sonication may also serve to drive reactions that would otherwise require higher temperatures, catalysts, or initiators to occur. It may also be useful to apply cosolvents to better solvate the metal complex. Preferred cosolvents are those that are able to form clear solutions of the beta diketonate metal complex before dilution. Particularly preferred are aromatic solvents including benzene, toluene, xylene, mesitylene, or ethyl benzene. These cosolvents are preferably used at sufficiently low concentration to not negatively affect membrane performance.

Improved resistance to accumulation for TFC membranes can in part be related to increased hydrophilicity of these membranes. The increased hydrophilicity can be measured by the equilibrium contact angle of the membrane surface with a drop of distilled water at a controlled temperature. Membranes prepared with metal complex 16 present during polymerization can have a contact angle that is reduced by 5, 15, or even 25 or more degrees relative to a similarly prepared membrane without the metal complex. The equilibrium contact angle can be less than 45°, less than 40°, or even less than 25°.

Preliminary Membrane Testing

Separation Efficacy

Membrane performance may be measured in a flat sheet cell test apparatus. Testing may be conducted at a Reynolds number of 2500, so that build up of rejected solutes at the membrane surface leads to a concentration no more than 10% higher than that in the bulk. All testing may be performed on 32,000 ppm NaCl in deionized (DI) or RO water, at 25° C. and 800 psi. Membranes may be run for 1 hour before performance characteristics (e.g. water flux and salt rejection) are measured.

Contact Angle

Contact angles may be those of DI water at room temperature. Membranes may be thoroughly rinsed with water, and then allowed to dry in a vacuum desiccator to dryness. Membranes 10 may be dried in a vertical position to prevent redeposition of any extracted compounds that may impact contact angle. Due to the occasional variability in contact angle measurements, 12 angles may be measured with the high and low angles being excluded and the remaining angles averaged.

Example A

Two aqueous solutions of 3.2 wt % MPD, 4.5 wt % triethylammonium camphorsulfonate (TEACSA) and 0.06 wt % sodium lauryl sulfate (SLS) in DI water were prepared, one of them also contained 0.1% of LTA (150 nm diameter). The solution with LTA was sonicated for 30 mins. An Isopar G solution with 0.3 wt % TMC was also prepared.

A piece of wet polysulfone support was placed flat on a clean glass plate. An acrylic frame was then placed onto the membrane surface, leaving an area for the interfacial polymerization (IP) reaction to take place.

Then 50 mL of an aqueous MPD solution prepared as described previously was poured onto the framed membrane surface and remained there for 1 minute. The solution was drained by tilting the frame until no more solution dripped from the frame.

The frame was taken off, and was left horizontally for at least 4 minutes at which point most of the surface water had evaporated. The membrane was then clamped with the glass plate in four corners. An air knife was used to finish drying of the membrane surface. The membrane was reframed using another clean and dry acrylic frame and kept horizontally for 1 minute.

Organic solution (50 mL of 0.3 wt % TMC/Isopar G solution) was poured onto the framed membrane surface and remained there for 2 min. The solution was drained by tilting the frame (vertically) till no solution dripped from the frame. The acrylic frame was removed, and the membrane was kept horizontally for 1 minute.

The membrane was clamped with the glass plate (four corners), and an air knife was used to dry the membrane surface.

| LTA (400 nm) | Flux (gfd) | Rejection |
|---|---|---|
| 0% | 19.10 | 99.12% |
| 0.10% | 34.05 | 97.50% |

Example B

A continuous coating process: an aqueous dispersion of LTA (300 nm) was added to an aqueous solution of composition similar to that used in a laboratory batch reaction (4 wt. % MPD). The final solution turbidity was 21 nephelometric turbidity units (NTU). All other solutions and processing conditions were unchanged. This continuous process included brief application of a vacuum, which led to the concentration of LTA particles at the surface of the support membrane.

| LTA (300 nm) | Flux (gfd) | Rejection | Contact angle |
|---|---|---|---|
| none | 17.7 | 99.40% | 50.7 |
| 21 NTU | 26.9 | 98.80% | 36.7 |

Example C

Two aqueous solutions of 4.0 wt % MPD, 4.5 wt % TEACSA and 0.2 wt % SLS in DI water were prepared, one also contained 0.05 wt. % of LTA (80 nm diameter). The solution with LTA was sonicated for 30 mins. An Isopar G solution with 0.3 wt % TMC was also prepared.

A piece of wet polysulfone support was placed flat on a clean glass plate. An acrylic frame was then placed onto the membrane surface, leaving an area for the IP reaction to take place.

An aqueous MPD solution (50 ml) prepared as described previously was poured onto the framed membrane surface and remained for 1 minute. The solution was drained by tilting the frame until no solution dripped from the frame.

The frame was taken off, and was left horizontally for at least 4 minutes at which point most of the surface water had evaporated. The membrane was then clamped with the glass plate in four corners. An air knife was used to finish drying of the membrane surface. The membrane was reframed using another clean and dry acrylic frame and kept horizontally for 1 minute.

Organic solution (50 mL of 0.3 wt % TMC/Isopar G solution) was poured onto the framed membrane surface and remained for 2 minutes. The solution was drained by tilting the frame (vertically) until no solution dripped from the frame. The acrylic frame was removed, and the membrane was kept horizontally for 1 minute.

The membrane was then dried at 95° C. for 6 minutes.

| LTA (80 nm) | Flux (gfd) | Rejection |
|---|---|---|
| 0% | 20.7 | 99.50% |
| 0.05% | 22.5 | 99.62% |

Metal-Releasing Nanoparticles

Example D

Template-free zeolite LTA nanoparticles in an aqueous dispersion were found to have aluminum content after being subjected to impact, cavitation and shear forces in a microfluidizer. The dispersion contained approximately 39 weight percent LTA made with double distilled water. When measured using ICP analysis, the solution had an aluminum content of 130.9 parts per million (ppm). This aluminum content is likely related to aluminum dissolution in the aqueous dispersion based on the data shown in Example 5. A similar dispersion of templated zeolite LTA nanoparticles (5%) showed an aluminum content of 2.9 ppm.

Example E

As shown in Table 1, zeolite LTA (0.05 wt. %) prepared by two different methods produces two different Si:Al ratios and two different solubilities in double deionized water (DDI) at room temperature of approximately 20 degrees Celsius when shaken on a laboratory shaker table for multiple days. Although not tested as long (Table I) zeolite FAU (0.05 wt. %) shows results that are consistent with the zeolite LTA data.

TABLE 1

Comparison of Zeolite LTA, Si:Al Ratio and Shaker Dissolution

| Material | Framework Si:Al Ratio | Shaker Dissolution Aluminum parts per million plateau in 500 ml DDI water solution |
|---|---|---|
| Zeolite LTA (template-free) | 1:1 | 35.90* |
| Zeolite LTA (template) | 1.5:1 | <0.1** |
| Zeolite FAU | ~2.5 | <0.1*** |

*Average of 77 to 160-day data;
**Average of 1 to 84-day data;
***2-day data

Example F

As shown in Table 2, membranes prepared from nanoparticles with differing Si:Al ratios have different flux as expressed in gfd (gallons per square foot of membrane per day). Membranes were prepared as follows:

Two aqueous solutions of 4.0 wt % MPD, 4.5 wt % TEACSA and 0.2 wt % SLS in DI water were prepared, one also contained 0.05 wt. % of zeolite nanoparticles. The solution with nanoparticles was sonicated for 30 minutes. An Isopar G solution with 0.3 wt % TMC was also prepared.

A piece of wet polysulfone support was placed flat on a clean glass plate. An acrylic frame was then placed onto the membrane surface, leaving an area for the IP reaction to take place.

An aqueous MPD solution 50 mL prepared as described previously was poured onto the framed membrane surface and remained for 1 min. The solution was drained by tilting the frame till no solution dripped from the frame.

The frame was taken off, and was left horizontally for at least 4 minutes at which point most of the surface water had evaporated. The membrane was then clamped with the glass plate in four corners. An air knife was used to finish drying of the membrane surface. The membrane was reframed using another clean and dry acrylic frame and kept horizontally for 1 min.

Organic solution (50 mL of 0.3 wt % TMC/Isopar G solution) was poured onto the framed membrane surface and remained for 2 min. The solution was drained by tilting the frame (vertically) until no solution dripped from the frame. The acrylic frame was removed, and the membrane was kept horizontally for 1 minute.

The membrane was then dried at 95° C. for 6 minutes.

TABLE 2

Comparison of Membrane Flux Increase with Nanoparticle Type Percentage increase of flux over similarly made control membranes without nanoparticles.

| Material | Framework Si:Al Ratio | Increased Membrane Flux with Nanoparticles (gfd) |
|---|---|---|
| Zeolite LTA (template-free) | 1:1 | 13% |
| Zeolite LTA (template) | 1.5:1 | 9% |
| Zeolite KFI | 2.2:1 | 0% |

In another experiment under similar conditions, zeolite concentration was increased to 0.1 wt % and the flux increase was 50%.

Example G

In a continuous coating process; an aqueous dispersion of LTA prepared by sonicating a 5% solution of LTA in water for 5 minutes, followed by 20 minutes of microfluidization, and stirring overnight, was added to an aqueous solution of 4% MPD, 4.5% TEACSA, and 0.2% SLS. An organic solution of 0.3% TMC in Isopar G was also prepared. The continuous process followed the same steps and order of solution coating, removal, and drying as detailed in example F.

| LTA | Flux (gfd) | Rejection |
|---|---|---|
| 0% | 17.7 | 99.4% |
| 0.10% | 24.8 | 98.9% |

All performance data unless otherwise noted was obtained from flat sheet testing on NaCl (32,000 ppm) in DI water tested at 600 psi after 1 hour of running.

Example H: Al(acac)3

An aqueous solution of 4.0 wt % MPD, 4.5 wt % TEACSA and 0.2 wt % SLS in DI water was prepared. An Isopar G solution with 0.3 wt % TMC and 0.25% Al(acac)3 was also prepared and sonicated for 60 minutes.

A piece of wet polysulfone support was placed flat on a clean glass plate. An acrylic frame was then placed onto the membrane surface, leaving an area for the interfacial polymerization reaction to take place.

Aqueous MPD solution (50 mL) prepared as described previously was poured onto the framed membrane surface and remained for 1 min. The solution was drained by tilting the frame till no solution dripped from the frame.

The frame was taken off, and was left horizontally for 4 minutes at which point most of the surface water had evaporated. The membrane was then clamped with the glass plate in four corners. An air knife was used to finish drying of the membrane surface. The membrane was reframed using another clean and dry acrylic frame and kept horizontally for 1 min.

Organic solution (50 mL) was poured onto the framed membrane surface and remained for 2 min. The solution was drained by tilting the frame (vertically) till no solution dripped from the frame. The acrylic frame was removed, and the membrane was kept horizontally for 1 minute. The membrane was then dried at 95 C for 6 minutes. A second membrane was prepared as above, but the Isopar solution contained no Al(acac)3 so the membrane could serve as a control.

|  | flux | rejection |
|---|---|---|
| control | 9.9 | 99.3% |
| Al(acac)3 | 20.2 | 99.7% |

Example I: Al(Acac)3 Tested on Pacific Ocean Seawater

A membrane made following the Al(acac)3 procedure above but using the Al(acac)3 at a level of 0.1%. The membrane was tested in flat cells on pretreated seawater taken from the Pacific Ocean.

|  | flux | rejection |
|---|---|---|
| control | 15.9 | 99.73% |
| Al(acac)3 | 25.5 | 99.35% |

Example J: Sodium Aluminate

An aqueous solution of 3.2 wt % MPD and 0.5% sodium aluminate, in DI water was prepared. A Hexane solution with 0.17 wt % TMC was also prepared.

A piece of wet polysulfone support was placed flat on a clean glass plate. An acrylic frame was then placed onto the membrane surface, leaving an area for the IP reaction to take place.

Aqueous MPD solution (50 mL) prepared as described previously was poured onto the framed membrane surface and remained for 1 minute. The solution was drained by tilting the frame till no solution dripped from the frame.

The frame was taken off, the membrane was then clamped with the glass plate in four corners. An air knife was used to meter and dry the membrane surface. The membrane was reframed using another clean and dry acrylic frame and kept horizontally for 1 minute.

Organic solution (50 mL) was poured onto the framed membrane surface and remained for 2 min. The solution was drained by tilting the frame (vertically) till no solution dripped from the frame. The acrylic frame was removed, and the membrane was kept horizontally for 1 minute.

A second membrane was prepared as above but the aqueous solution contained no sodium aluminate.

|  | flux | rejection |
|---|---|---|
| control | 20.0 | 98.99% |
| sodium aluminate | 30.6 | 96.77% |

Example K: Aluminum Citrate

To the amine in the sodium aluminate example above, citric acid was added to bring the pH to the range of 7.5-9. The control did not require any acid addition.

|  | flux | rejection |
|---|---|---|
| control | 18.2 | 98.78% |
| Aluminum citrate | 26.3 | 98.30% |

Example L: Aluminum Camphorsulfonate

To the amine in the sodium aluminate example above, camphorsulfonic acid was added to bring the pH to the range of 7.5-9. The insoluble precipitate that formed was filtered before use. The control did not require any acid addition.

|  | flux | rejection |
|---|---|---|
| control | 18.2 | 98.78% |
| aluminum camphorsulfonate | 25.9 | 98.80% |

Example M: AlCl$_3$

An aqueous solution of 3.2 wt % MPD in DI water was prepared. A Hexane solution with 0.17 wt % TMC and 0.3% AlCl3 was also prepared and sonicated for 60 minutes.

A piece of wet polysulfone support was placed flat on a clean glass plate. An acrylic frame was then placed onto the membrane surface, leaving an area for the IP reaction to take place.

A 50 mL of aqueous MPD solution prepared as described previously was poured onto the framed membrane surface and remained for 1 minute. The solution was drained by tilting the frame till no solution dripped from the frame.

The frame was taken off, the membrane was then clamped with the glass plate in four corners. An air knife was used to meter and dry the membrane surface. The membrane was reframed using another clean and dry acrylic frame and kept horizontally for 1 minute.

Organic solution (50 mL) was poured onto the framed membrane surface and remained for 2 minutes. The solution was drained by tilting the frame vertically till no solution dripped from the frame. The acrylic frame was removed, and the membrane was kept horizontally for 1 minute.

A second membrane was prepared as above but the hexane solution contained no AlCl$_3$.

|  | flux | rejection |
|---|---|---|
| control | 14.0 | 99.47% |
| AlCl3 | 16.1 | 99.60% |

Example N Effect of Rinsing

Two membranes were made following the Al(acac)3 procedure above but using the Al(acac)3 at a level of 0.2%. One was then rinsed in a 0.2% sodium carbonate solution prior to testing.

|  | flux | rejection |
| --- | --- | --- |
| Al(acac)3 | 21.5 | 99.42% |
| Al(acac)3, then sodium carbonate rinse | 27.6 | 99.13% |

Example O: Effect of Mixing Process

A membrane was made according to the Al(acac)3 example with the only exception being the organic solution was only sonicated for 10 minutes, a second membrane was made with the organic solution mechanically stirred for 60 minutes. No sonication was used. A control was made without any Al(acac)3 present.

|  | Flux | Rejection |
| --- | --- | --- |
| control | 17.6 | 99.6% |
| stirring | 21.2 | 99.5% |
| sonication | 27.7 | 99.2% |

Example P: Contact Angle

Membranes were made according to the method of example H, and a second membrane was made without al(acac)3. The membrane contact angle with DI water was then measured.

|  | Contact angle |
| --- | --- |
| Control | 52.9 |
| Al(acac)3 | 25.2 |

The soluble aluminum 17 released by nanoparticles 16 in support membrane 12 are available in the water on the surface of membrane 12 which is kept wet until aqueous phase 14 is applied to support membrane 12 during processing to prepare discrimination layer 24. As a result, soluble Al 17 is available in aqueous phase 14 during interfacial polymerization between organic and aqueous phases 18 and 14 to form discrimination layer 24. The following examples are used to show the improved flux flow are a result of the presence of soluble Al 17 in aqueous phase during interfacial polymerization which forms discrimination layer 24, referred to as Al or Al effect 19 in FIG. 3.

Example E shows the release of soluble aluminum from nanoparticles, while Example J shows the effect of soluble aluminum, in the aqueous phase during interfacial polymerization, on the flux and rejection characteristics of a resultant membrane suitable for use in reverse osmosis.

Example Q: Release of Soluble Aluminum

Template-free zeolite LTA nanoparticles in an aqueous dispersion were found to have aluminum content after being subjected to impact, cavitation and shear forces in a microfluidizer. The dispersion contained approximately 39 weight percent LTA made with double distilled water. When measured using ICP analysis, the solution had an aluminum content of 130.9 parts per million (ppm).

Example R

Commercial Scale Membrane Production

In a continuous coating process; the amine solution and a 0.475% Ga(acac)3 containing organic solution of example 2 were used to prepare membrane. Contact times for aqueous and organic solutions were about 15 seconds. Other solutions and processing conditions were similar to those in example 2.

|  | flux | rejection |
| --- | --- | --- |
| control | 22.7 | 99.5% |
| Ga(AcAc)$_3$ | 43.0 | 98.7% |

Example S, Effect of Impurity

Two membranes were prepared by the method in the aluminum citrate example above, using two different lots of TMC. One was approximately 99.5% pure, the other about 98.5% pure (purity from vendor) with trace amounts of mono, di-, and tri hydrolyzed TMC.

Control membranes with either TMC lot gave similar performance and were averaged for the "control" data below.

|  | flux | rejection |
| --- | --- | --- |
| control | 18.3 | 98.85% |
| 99.5% pure | 20.5 | 98.75% |
| 98.5% pure | 33.2 | 96.32% |

Section B: Hybrid Membranes

Referring now generally to FIG. 18-26 and Tables I-X11 summarize our discoveries that various combinations of additives and techniques provide substantially superior TFC membranes for forward and reverse osmosis for use, for example, in the purification of brackish and saltwater. Such membranes have improved flux performance and fouling resistance and retain high rejection characteristics. In particular, in addition to the advances in the use of nanoparticles and soluble metal ions as additives noted above, there have been substantial advances made in the use of the following additives alone and in various combinations and the following techniques alone and in combination, namely:

- the use of nanoparticles in combination with various additives to increase resistance to fouling and reduce the loss of flux over time due to fouling,
- the use of combinations of additives to increase flux without substantial loss of rejection characteristics,
- the use of mono-hydrolyzed TMC as an additive including the monitoring of a deflection point,
- the use of alkaline earth metals as additives,
- the use of other molecular additives,
- the use of nanotubes as additives,
- the use of higher concentrations of TMC,
- the use of lower ratios of MPD to TMC, as well as
- the monitoring of the percent improvement of such additives and combinations compared to control membranes.

Tables I-XII in Section C provide 172 additional examples of various additives used solely and in combination to identify points within ranges of the use of such additives and combinations, concentrations and ranges.

In particular, as noted above, a combination of additives, such as template fee zeolite LTA nanoparticles, and metal ions, such as sodium aluminate, in the aqueous phase of an interfacially polymerized membrane provide advantages not easily achievable if at all with single additives in similar membranes. Likewise, the use of zeolite LTA nanoparticles, combined with the use of a small amount of mono and/or di-hydrolyzed TMC in the organic phase layer can have benefits not observed with either used alone, due to interactions between the nanoparticles and mono and/or di-hydrolyzed TMC.

Still further, the use of alkaline earth metals and other molecular additives, alone or combined with the other additives and/or with the techniques, concentrations and ranges described provide hybrid TFC membranes with high flux, high rejection and increased resistance to fouling. Although alkaline earth metals have not been used as additives in RO membranes and were not expected to work, we surprisingly found that they could in fact work extremely well at increasing membrane permeability. Alkaline earth metals as a group are also abundant, low cost, and easy to use in processing. Members of this group including Magnesium, Calcium, and Strontium are also environmentally benign and can be available as counter ions from zeolite nanoparticles. Mordenite and Ferrierite are two example of zeolites with calcium or magnesium exchangeable counterions.

Hybrid nanocomposite membranes can be thought of as a subclass of thin film composite or TFC membranes, where the polymer phase of the discrimination layer both includes nanoparticles and has been modified through the use of one or more of these additives. Hybrid nanocomposite TFC membranes are interfacially prepared membranes formed in the presence of nanoparticles, and/or one or more additives, and yielding a mixed matrix membrane of the nanoparticles, and/or additives, together with polymer, nanoparticles and additives, supported by an underlying layer, typically an ultra or microfiltration membrane.

The addition of a combination of nanoparticles, with other additives, to form hybrid nanocomposite TFC membranes may provide substantial increased resistance to fouling, that is, to the loss of flux over time due to contamination by the seawater or other material to be purified.

Other advantages of the various membrane additives and techniques identified so far are may include
  substantial increased flux compared to the use of the membranes with the individual additives,
  substantial increased flux by the addition of small amounts of mhTMC as an additive,
  substantial flux and rejection performance by additives with poor performance as single additives, and
  substantial increased rejection for additives with poor rejection characteristics as single additives.

Fouling

With regard now in general to fouling, in some instances, hybrid nanocomposite TFC membranes may be used to desalinate waters that contain materials which have a tendency to accumulate on the membrane surface in contact with the contaminated water, decreasing the effective membrane permeability, e.g. decreasing membrane flux over time. These materials can include but are not limited to natural organic matter, partially insoluble inorganic materials, organic surfactants, silt, colloidal material, microbial species including biofilms, and organic materials either excreted or released from microbial species such as proteins, polysaccharides, nucleic acids, metabolites, and the like. This drop in permeability or membrane flux is often smaller for membranes prepared as disclosed herein than for membranes prepared by conventional techniques due to a decreased amount, density, viability, thickness and/or nature of accumulated material. Membrane surface properties, such as hydrophilicity, charge, and roughness, often affect this accumulation and permeability change. Generally, membranes with highly hydrophilic, negatively charged, and smooth surfaces yield good permeability, rejection, and fouling behavior. The addition of nanoparticles, such as zeolite LTA nanoparticles, have been shown to reduce roughness, increase negative charge without addition of carboxylate groups, and reduce contact angles.

Nanoparticles can also be added to increase membrane permeability while maintaining good rejection, and/or to improve the mechanical strength of the thin film or support layer.

Molecular additives have been used to alter the performance of pure polymer TFC membranes. However these improvements have often lead to membranes having altered fouling propensity or decreased rejection, particularly when the membrane is used at high pressure and salinity, for instance during desalination of ocean water.

Hybrid membranes, that is, membranes with nanoparticles, and additives such as soluble ions, organometallic compounds, inorganic additives with or without ligands, and/or mhTMC enable a new degree of design flexibility to improve the overall flux, rejection, and fouling properties of membranes. The several cases discussed below are meant to illustrate the range of benefits that can be realized through the application of hybrid membrane technology and are not meant to limit the scope of this application which is provided by the issued claims.

Some nanoparticles under specific processing conditions may have a large effect on membrane fouling, but have little or no effect, or at least an insufficient impact, on membrane flux. In such cases, molecular additives may be added to the membrane to provide an additional increase in flux while permitting the TFC membrane to retain the benefit of the fouling resistance provided, for example, by the nanoparticles.

Referring now in particular to Table IX. FOULING TEST, example 119 is based on other experiments in which 0.1% of nanoparticles zeolite LTA, was added to the organic phase before interfacial polymerization or IFP with an aqueous phase to produce a discrimination layer on a support layer and form a thin film nanocomposite or TFC membrane.

Membranes were prepared using the method of example 12. Membranes were run on a feed solution of DI water with 32,000 ppm of a salt blend formulated to simulate natural ocean water (Instant Ocean®). Temperature was maintained at 25° C. and a pressure of 800 psi was used throughout testing. No filtration was used during this test allowing inorganic and organic colloids to recirculate through the system and biological material to grow. Performance data was taken 1 hr after testing began and again 47 hrs later after continuous operation.

The nanocomposite TFC membrane had 22.5 GFD flux rate, which is not an improvement over a control membrane made in the same manner but without the nanoparticle additive, and had 98.5% salt rejection. The flux was maintained at 22.5 GFD by fouling after about two days.

Example 120 shows that a particular molecular additive Ga(acac)3, provided a reasonable total flux flow of 30.8 GFD, which provided a flux improvement of about 36% over a control without additives and maintained a very good salt rejection of over 99.5%. However, the Ga additive membrane showed a poor flux performance after 47 hours of fouling testing, losing almost half of its flux capacity.

Example 121 illustrates one of the benefits of a hybrid TFC membrane approach in which nanoparticles, such as LTA are combined with molecular additives, such as Ga(acac)3, to form an improved hybrid TFC membrane with qualities superior than are provided by either additive separately. In particular, the hybrid LTA Ga membrane provided 31.9 GFD flux, an improvement of about 41% more than the control with only slight loss in salt rejection. The further increase in flux is on the order of an addition 14% when compared to the 36% flux increase of the Ga(acac)3 additive. Perhaps even more importantly, the flux rate after the 47 hour test was 27.3 GFD, i.e. the flux loss was only 17% after the 47 hour test. As a result, the hybrid TFC membrane has substantially the flux improvement of its soluble additive, in this case the Ga(acac)3, and the fouling resistance of the LTA nanoparticles.

Figure 25:
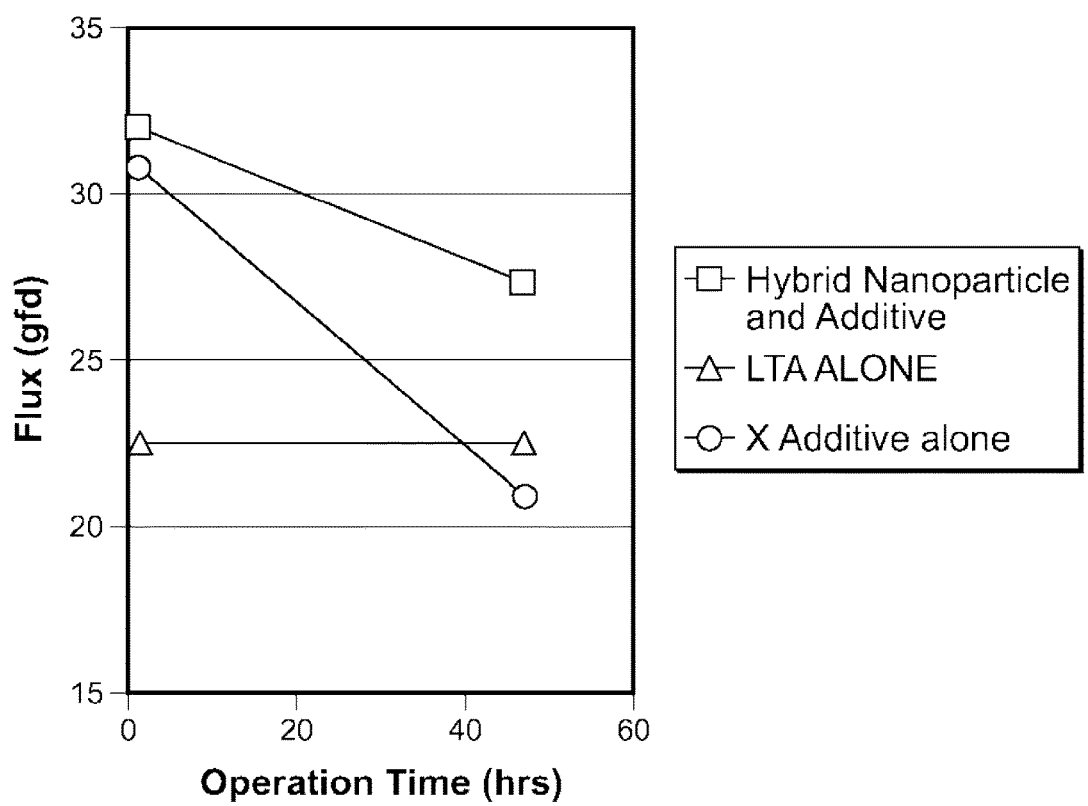
FIG. 25 is a simple graphical representation of the reduced loss of flux over time as a result of fouling for three different membrane configurations.

Referring now to FIG. 25, a simple graphical representation of the reduced loss of flux over time is shown in which the LTA alone shows low flux improvement with low flow loss due to fouling, the Ga additive alone shows high flux improvement with substantial flux loss due to fouling while the hybrid shows the best of both additives, high flux improvement with low flux loss due to fouling. It should also be noted that the TFC membrane with the additive alone has a lower flux than the nanocomposite TFC membrane while the nanocomposite hybrid TFC membrane shows a flux improvement over the nanoparticle hybrid TFC membrane of about 21% in only 2 days. The rate of flux drop tends to decrease in conventional membranes over time, but nanoparticle hybrid TFC membranes are expected to maintain an improvement of 20 to 100% above similar membranes with single additives or conventional membranes.

Increased Flux

Regarding increased flux compared to membranes with the individual additives, and referring now in particular to Tables II, IIA.2 and IIA.3, some nanoparticles and other additives may by themselves provide a moderate increase in flux, when a larger response might be desired. In such cases, hybrid membrane technology can be used to produce membranes having the best overall performance.

Referring now to example 25, the use is illustrated of a concentration of a particular nanoparticle, in this case a 0.05% concentration of zeolite LTA, in the aqueous phase before contact with the organic phase for interfacial polymerization to form a nanocomposite TFC membrane providing 26.2 GFD at a 99.17% flux rejection. The flux rate provides a 16% improvement over a control membrane made without the nanoparticle, which may be useful in some cases especially in light of the other benefits of nanoparticles. However, substantial further additional flux improvement is often desired.

Referring now to example 30, the addition of a molecular additive, such as a 0.058% concentration of Sr(f6(acac)2 in the organic phase, before contact with the aqueous phase, may produce a TFC membrane yielding a 29.7 GFD flux rate, which at 31% has roughly double the 16% flux improvement of example 25 in the table.

Referring now to example 2, a combination of the LTA and strontium additives may yield a hybrid nanocomposite TFC membrane with, at a 36.8 GFD flux rate, a 63% improvement over a control membrane while providing an extremely good salt rejection of 99.57%.

mhTMC as an Additive

Referring now to FIGS. 18-21, monohydrolyzed TMC or mhTMC 16 may be dissolved as an additive, alone or in combination with another additive such as a nanoparticle or rare earth alkaline metal or other molecular additive, in organic phase layer 18 before contact with aqueous layer 14 during interfacial polymerization to increased flux and/or improve rejection characteristics when TFC membrane 10 is used, for example, during reverse osmosis to purify saltwater 26.

Monohydrolyzed TMC 16 is a molecule of trimesoyl chloride or TMC in which one of the —Cl bonded groups has been replaced with a bonded OH group. Di-hydrolyzed trimesoyl chloride and tri-hydrolyzed trimesoyl chloride (i.e., trimesic acid) often accompany monohydrolyzed TMC at low levels in TMC which has been hydrolyzed. Tri-hydrolyzed trimesoyl chloride is believed to be a contaminant in that it appears to be insoluble in organic phase 18 and may serve to increase flux in TFC membrane 10 at the expense of rejection characteristics. The characteristics of di-hydrolyzed trimesoyl chloride are not clearly understood, but do not at this time appear to be substantially beneficial to the flux and rejection characteristics of TFC membranes which may explain why convention wisdom teaches the avoidance of contaminated TMC.

It may be beneficial, however, to have a small amount of mono-hydrolyzed TMC (1-carboxy-3,5-dichloroformylbenzene) and possibly some di-hydrolyzed TMC (1,3-dicarboxy-5-chloroformylbenzene) present in the organic phase layer 18 during the interfacial polymerization reaction. The ratio of mono and/or di-hydrolyzed TMC to TMC in the organic phase layer 18 is preferably in the range of about 0.1/100 to 10/100 and more preferably from 0.5/100 to 5/100. This impurity may interact with the nanoparticles and result in the formation of aligned channels and/or other mechanisms within the thin polymer film of discrimination membrane 24 providing improved water flux.

To alter performance or solubility, a salt of monohydrolyzed TMC 16 may be used in place of the acid form. Preferred salts may be those formed from substituted amines such as di, tri, or tetra methyl, ethyl, propyl, or butyl derivatives.

In addition to monohydrolyzed trimesoyl chloride or mhTMC, other partially hydrolyzed reactants may also be effective at improving flux. For example monohydrolyzed versions of 1,2,4 benzenetricarbonyl trichloride; 1,2,3-benzenetricarbonyl trichloride; and tricarbonyl chloride substituted naphthalene, anthracene, phenanthrene, biphenyl, or other aromatic rings. Tricarbonyl chloride substituted cycloaliphatic rings, or bicycloaliphatics are also included. Carbonyl chlorides of higher substitution than three may also be di or higher hydrolyzed, as long as at least 2 carbonyl chloride groups remain allowing polymerization to occur.

Monohydrolyzed TMC was synthesized for the examples described herein in two lots, labeled lots 1 and 2 in Tables I-XII as will be discussed below in greater detail by the techniques described immediately below. Other monohydrolyzed polyhalides may be synthesized using similar methods.

Figure 21:
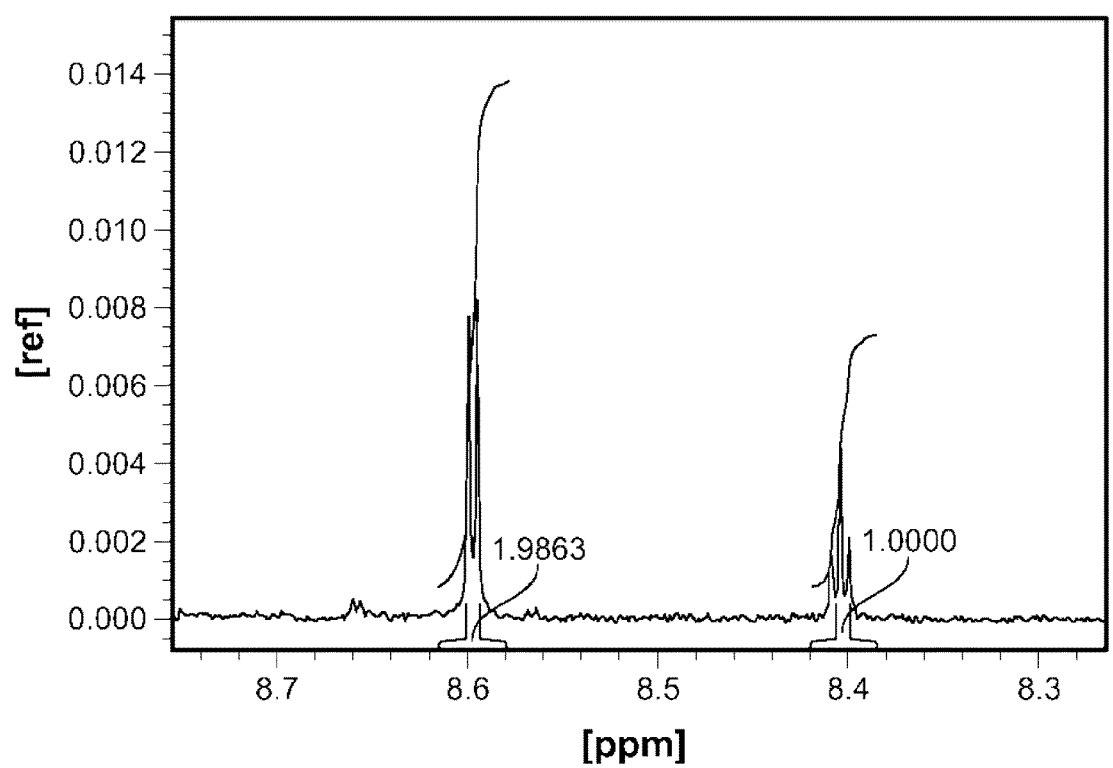
FIG. 21 is a 1H-NMR of mono-hydrolyzed TMC.

TMC was purified by reflux in thionyl chloride with DMF as catalyst. Impurities were pulled off under vacuum. The purified TMC was then dissolved in methylene chloride and reacted with Wang Resin (a commercially available solid phase polymer with reactive hydroxyl groups) at 0° C. Dilute triethylamine was added drop-wise over 2 hours and the solution was then allowed to slowly warm up to room temperature overnight. Excess reagents were rinsed away with excess methylene chloride. Cleavage with trifluoroacetic acid lead to isolation of monohydrolyzed TMC. Compound identity and purity was verified with 1H-NMR of the isolated solid. NMR was run in deuterated toluene and is shown in FIG. 21 which identifies the presence of the synthesized mhTMC.

Preferred concentrations of the monohydrolyzed TMC 16 are from 0.005% to 5% by weight and more preferred from 0.025% to 0.25% in organic layer 18. The amount of monohydrolyzed TMC may also be compared in a ratio with the amount of TMC. Preferred TMC/monohydrolyzed TMC ratios are less than 50:1, 25:1, 15:1, 5:1, or 1:1. From this it can be seen that at high TMC concentrations more monohydrolyzed TMC may be needed to see a comparable flux increase. It may be beneficial to sonicate the solution. Sonication may serve to better disperse the monohydrolyzed TMC 16 in organic solution 18. Sonication may also serve to drive reactions that would otherwise require higher temperatures, catalysts, or initiators to occur. It may also be useful to use cosolvents to better solvate the monohydrolyzed TMC. Preferred cosolvents are those that are able to form clear solutions of the monohydrolyzed TMC before dilution. Particularly preferred are aromatic solvents including benzene, toluene, xylene, mesitylene, or ethyl benzene. These cosolvents are preferably used at sufficiently low concentration to not negatively affect membrane performance.

Figure 19:
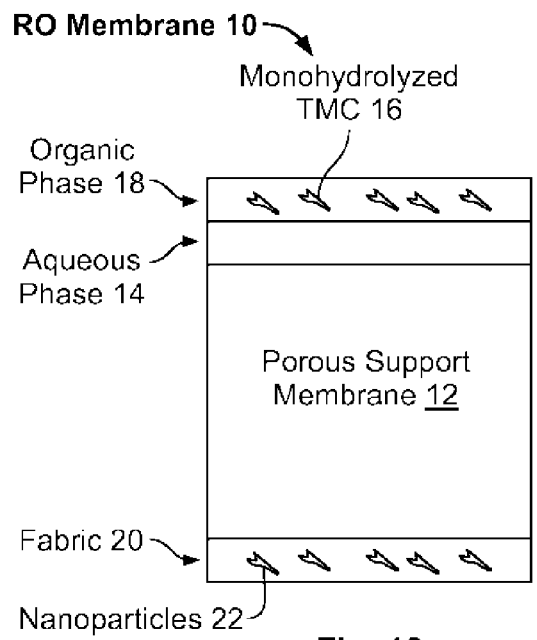
FIG. 19 is a diagrammatic view of RO membrane 10 during fabrication processing including mono-hydrolyzed TMC 16 in organic phase 18.
Figure 20:
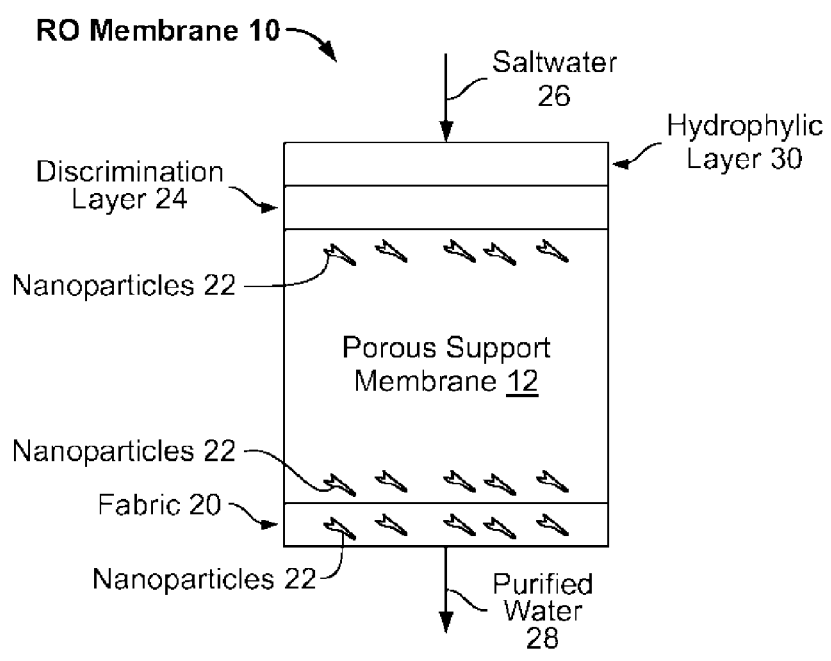
FIG. 20 is a diagrammatic view of RO membrane 10, including mono-hydrolyzed TMC 16 in discrimination layer 24 during reverse osmosis.

Referring now to FIGS. 19-20, mhTMC may be applied as an additive to organic phase 18 before contact with aqueous phase 14 on porous support 12 of RO membrane 10 during fabrication by interfacial polymerization to form discrimination layer of to TFC membrane 10. Other additives may be added to the organic or aqueous phases or support or fabric layers 12 or 20. Hydrophilic layer 30 may be applied to discrimination layer 24 so that seawater 26 may be applied under pressure to TFC membrane 10 to produce purified water 28.

The purity of the synthesized monohydrolyzed TMC may be estimated from NMR spectra. Crude and purified monohydrolyzed TMC is dissolved in deuterated acetone for the NMR experiment. The purity calculation may be performed by looking at the relative quantities of trimesic acid, 1,3,5-Benzenetricarbonyl trichloride, monohydrolyzed TMC and dihydrolyzed 1,3,5-Benzenetricarbonyl trichloride. These values may then be reduced by any extraneous NMR peaks which usually impurities from the synthesis.

Referring now again to FIG. 21, identity and purity of monohydrolyzed TMC can be verified through the use of $H^1$-NMR. After synthesis of monohydrolyzed TMC, the resultant product can be dissolved in deuterated toluene or deuterated acetone for this analysis. The doublet at 8.6 ppm corresponds to the two aromatic ring protons adjacent to both a carbonyl chloride and a carboxylic acid group. The integrated area of this peak, 1.99, is twice that of the triplet at 8.4 ppm because there are two protons. The triplet at 8.4 ppm corresponds to the single aromatic ring proton between two carbonyl chloride groups. Purity of this compound can be checked by comparing the integrated area of these protons versus those of the non-hydrolyzed TMC, dihydrolyzed TMC, and trimesic acid.

Figure 26:
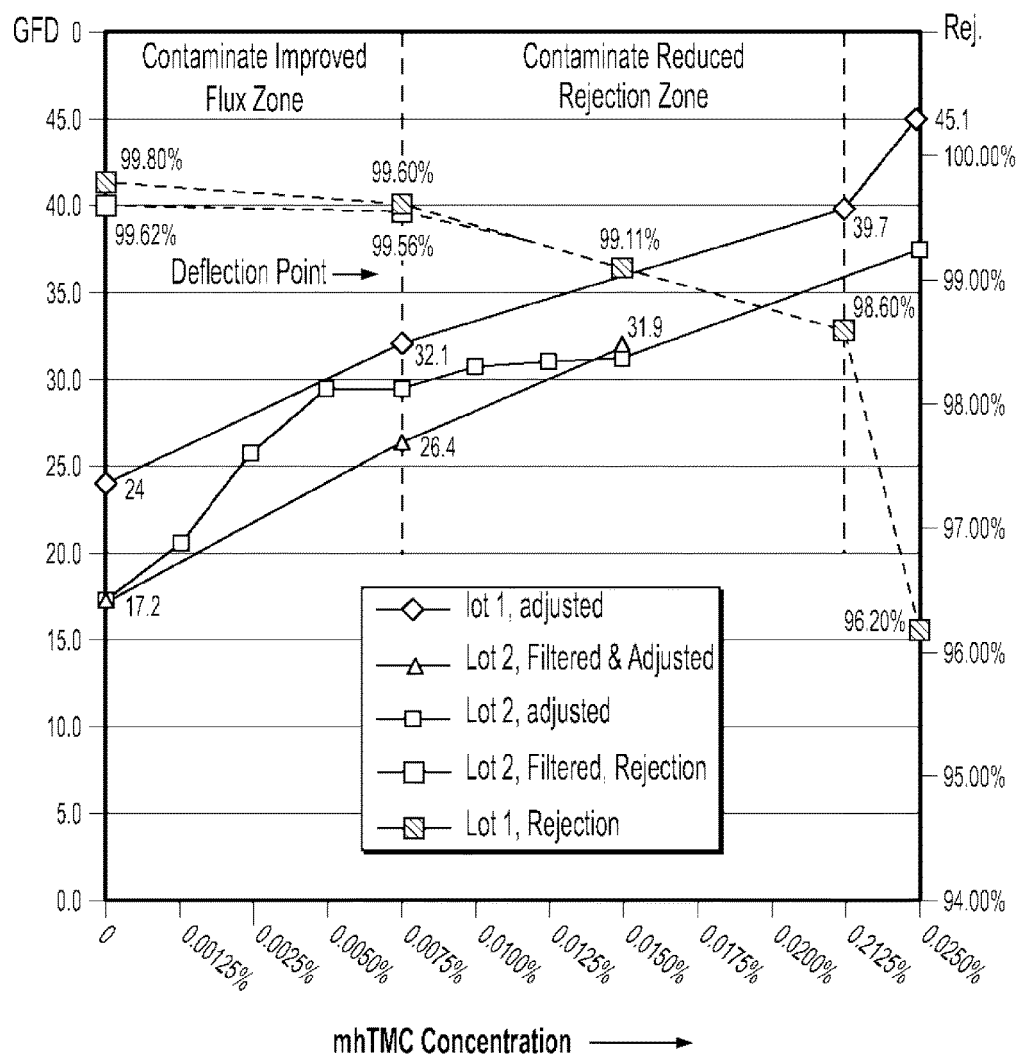
FIG. 26 is a graph relating membrane performance to purity of mono-hydrolyzed TMC.

Referring now to FIG. 26, membrane performance is illustrated graphically as a function of the concentration of the mhTMC adjusted for purity. In particular, the entries in Tables I-XII for mhTMC reflect the actual concentration of the synthesized mhTMC used identifying the source of the mhTMC, i.e. synthesized lots 1 or 2. The graph lines in FIG. 26 have been adjusted for the estimated purity of the synthesized mhTMC. The data for lots 1 and 2 have been adjusted for the estimated concentrations of synthesized mhTMC based on an NMR assay, including simple percentage of materials dissolvable in toluene. FIG. 26 provides a visual representation of the adjusted concentrations as functions of GFD and Salt Rejection for lot 1 (80% pure mhTMC) and 2 (25% pure mhTMC), as well as a separate plot line for a portion of lot 2 which had been filtered to remove larger contaminants.

The filtering process substantially improved the salt rejection and only slightly reduced the flux. The remaining contamination seems to improve the flux flow when it's at low values without much damage to rejection, but at the point of interest, at about 99.5% salt rejection, further contamination hurts the rejection at a much greater rate and only slight improves flux. Another inflection point appears at about 0.020% or 0.0215% where the flux climbs dramatically and the rejections drops dramatically. This may indicate holes or tearing or some other degrading of the membrane. These regions of the chart may be characterized as contamination-improved flux, contamination diminished-rejection, and contamination-damaged zones.

In particular, the graph line for lot 1, adjusted to reflect that the synthesized mhTMC of lot 1 was estimated to have about 80% concentration of pure mhTMC, showed an increasing flux from 24 GFD at 0% concentration, i.e. at the control membrane concentration, to about 32.1 GFD at about 0.0075% concentration adjusted at what appears to be a deflection point. The flux continued to grow, but at a slightly slower rate until it reaches 39.7 GFD at the next data point at about 0.0215% adjusted mhTMC concentration and then dramatically increased to 45.1 GFD at 0.2050% adjusted concentration. The rejection characteristics of lot 1 adjusted were very good at the 0% concentration of the control membrane at 99.8% rejection and had a similar deflection point at about 99.60% rejection at about the 0.0075% adjusted mhTMC concentration of the deflection point. Thereafter, the rejection continued to decay through 99.11% at about 0.0150% adjusted concentration to 98.60% at 0.02125% before it dropped to 96.20% at about 0.0250% concentration.

As a result, the addition of from 0% to perhaps 0.0150% adjusted concentration provided very useful membrane performance, with concentrations as high as about 0.02% to about 0.02125% being useful at some conditions, but concentrations above that level suggest, together with the dramatically increased flux, to indicate damage to the membrane. The optimal point appears to be in the neighborhood of the deflection point at about 0.0075% adjusted mhTMC concentration, perhaps between 0.0050% and 0.01% adjusted concentration. The exact optimum point may have to be determined by experimentation.

Referring now to the graph line for lot 2, adjusted to reflect an estimated 25% concentration of pure mhTMC but not filtered, an increasing flux was shown from the control membrane concentration of 0% mhTMC of 17.2 GFD growing dramatically to just under 30 GFD at about 0.0050% adjusted concentration at which point the flux leveled off and reached only 31 GFD at about 0.0150% adjusted concentration. Thereafter it rose to about 37.5 GFD at 0.0250% adjusted concentration.

The flux characteristics of lot 2, adjusted and filtered, indicate that the flux grew reasonably linearly, from 17.2 GFD at 0% concentration, generally in parallel with the higher purity of the mhTMC from lot 1 to 26.4 GFD at the deflection point of 0.0075% adjusted mhTMC concentration and substantially joined the graph line of lot 2 unfiltered at about 31.9 GFD at 0.0150% adjusted concentration. The fact that the combination of the lot 2 adjusted and filtered flux growth lines substantially join each other and run generally parallel with the flux growth line for the higher purity samples for lot 1 indicate good consistency in the tests.

The rejection characteristics for lot 2, adjusted and filtered, show little degradation of rejection from the control membrane rejection at 0% concentration of about 40 GFD to the same deflection point for lot 1 at about 0.0075% adjusted concentration of mhTMC and follow lot 1 to about 99.11% at about 0.0150% adjusted concentration. The consistency between the deflection point indications in both lots strongly indicate that the deflection point in generally in the same range. Although the commercially practical purity of the concentration of the mhTMC additive, alone or together with other additives such as nanoparticles, alkaline earth metals or other molecular additives has not been determined, it is a matter of experimentation to determine the appropriate deflection point for optimal additive concentrations of the mhTMC and other additives, and combinations of additives, in accordance with the techniques as disclosed herein.

While not willing to be bound by theory, it is believed that the area to the left of the vertical line at the concentration identified as the deflection point, is the range of concentrations in which the additives disclosed herein promote increased flux while any remaining contaminants—to the extent they effect the formation or structure of the interfacially polymerized thin film discrimination layer of the TFC membrane, serve to more or less increase the flux characteristics of the TFC membrane without substantially reducing the rejection characteristics. This area has been designated for convenience as the contaminate improved flux zone. After the deflection point, the effect of such contaminants has less beneficial effect on the growth of the flux but begins to have a substantial detriment to the rejection characteristics of the membrane and has therefore been designated as the contaminate reduced rejection zone. As the impact of the contaminants continues to increase with increasing concentration of the additive or additives, a point will be reached, shown at 0.02125% adjusted concentration, at which the contaminants increase the passage of both pure water and materials to be rejected indicating damage or other detriment to membrane.

Without willing to be bound by theory, monohydrolyzed TMC 16 in particular as an additive in organic phase 18 is believed to react with metaphenylene diamine during the interfacial polymerization to improve the hydrophilicity of the resultant polymer discrimination layer 24 to provide additional benefits. It is thought that monohydrolyzed TMC 16 may react with the polyfunctional nucleophilic monomer and may be incorporated into the polymeric discriminating layer 24 along with non-hydrolyzed polyfunctional acyl halide. During polymerization the hydrolyzed acid group present on this reactant may interact with terminal charged amine residuals on the polyfunctional amine reactant forming ionic crosslinks. Such ionic crosslinks may increase the hydrophilicity of the polymer relative to a polymer containing amide crosslinks exclusively, and thus promote increased water uptake and flux. At the same time rejection may be maintained by virtue of the electrostatic interactions between the charged group, which is stabilized relative to normal electrostatic interactions, by the rigidity of the cross-linked aromatic backbone keeping the two charged centers close to each other.

Referring now to one particular example of a hybrid nanocomposite TFC membrane, as shown in example 8, the addition of 0.02% mono-hydrolyzed TMC, or mhTMC, has been shown to be extremely beneficial to the LTA, strontium hybrid TFC membrane described above. The resultant hybrid TFC membrane including both strontium and mhTMC in the organic phase before contact with the aqueous phase during interfacial polymerization to produce a discrimination layer which may deliver 42.4 GFD flux at a very good 99.16% salt rejection rate. The flux improvement of 88%, from the 22.6 GFD flux of the control membrane coupled with a very modest loss in salt rejection makes for a useful membrane for several applications.

Poor Performance as Simile Additive

Regarding additives with poor performance as single additives, and referring now again to Tables II, IIA.2 and IIA.3, some additives and nanoparticles do not provide an obvious or substantial improvement in performance when used alone. However, combinations of nanoparticles and additives have proven to be substantially useful by providing flux increases when incorporated into hybrid TFC membranes.

As shown in example 26, a 0.05% concentration of LTA to the Isopar based organic phase before contact during IFP with the aqueous phase yields a nanocomposite TFC membrane with a 22.6 GFD flux, equal to that of the control membrane, but a salt rejection of 98.77%, lower than the 99.68% of the control membrane.

As shown in example 29, a 0.09% Ca(f6acac)2 additive to the ISOPAR based organic phase yields a TFC membrane with 24.8 GFD flux having about a 10% flux increase over the control membrane without additives, with a good salt rejection of 99.63%.

Referring now to examples 19, a membrane made with LTA and the Ca additive, in the ISOPAR based organic phase yields a nanocomposite hybrid TFC membranes having 34.4 GFD flux having, a 52% flux increase over the control membrane without additives but with good salt rejection of 99.03%.

Regarding additives with poor decreased rejection and referring now to Table II, IIA.2 and X, additives can be used with some nanoparticles that may by themselves have acceptable flux increases but decreased rejection, to produce hybrid TFC membranes can be made that have the same or similar flux responses, but with improved rejection relative to either additive alone.

Poor Rejection Characteristics as Single Additive

Referring now to example 25, a nanocomposite TFC membrane with 0.05% LTA additive in the aqueous phase may yield a flux of 26.2 GFD, a 10% flux improvement over a control membrane without nanoparticle as well as a 99.17% salt rejection, below the 99.68% rejection of the control membrane Referring now to example 129, a TFC membrane with 0.02% mhTMC additive in the organic phase may yield a flux of 29.5 GFD having a 31% flux improvement over a control membrane without additives as well as a 99.24% salt rejection, also below the rejection of the control membrane.

Referring now to example 21, a hybrid TFC membrane with both the LTA and mhTMC additives may yield a flux of 30.7 GFD, yielding a better flux improvement of 36% and, perhaps more importantly, a substantially improved salt rejection of 99.63%, much closer to the 99.68% salt rejection of the control membrane.

Section C

Concentration of TMC

An analysis of the concentration of TMC used in organic phase 18 indicates that a minimum concentration may be required to get the full benefit of the additive(s) described herein. As shown in Tables I-XII, concentrations of TMC less than about 0.17% or 0.2% TMC or greater than about 0.5% TMC were not optimal to get the beneficial effects of many of the additives. The preferred range is therefore about 0.15% to about 0.6%, more preferred from 0.2% to 0.5% and most preferred from about 0.25% to 0.33%.

Ratio of MPD to TMC

The ratio of MPD to TMC may be another important factor in the preparation of high flux, high rejection, low fouling TFC membranes, particularly with the additives and combinations of additives described herein. The preferred range is less than a ratio of about 35 for use in conjunction with the TMC concentrations discussed above, more preferably less than 25 and even more preferably less than about 15. A most preferred ratio is about 13.

Nanotubes

When nanotubes 16 are included in the aqueous phase it may be preferable to include surfactants such as; Alkyl polyethylene oxide), Copolymers of polyethylene oxide) and poly(propylene oxide) (commercially called Poloxamers or Poloxamines), Alkyl polyglucosides including Octyl glucoside or Decyl maltoside, Fatty alcohols including Cetyl alcohol or Oleyl alcohol, Cocamide MEA, or cocamide DEA, to help disperse the nanotubes. These may also be chosen so as to help align nanotubes 16 in a specific arrangement. It will be obvious to one skilled in the art to use other nonionic, cationic, anionic, or zwitterionic surfactants to aid in dispersing or aligning the nanoparticles.

Nanoparticles such as tubes 16 may be carbon nanotubes, may be made of FeC, titania, WS2, MoS2, Boron Nitride, Silicon, Cu, Bi, ZnO, GaN, In2O3, Vanadium oxide, or Manganese oxide. When carbon nanotubes 16 are used they may be single or multiwall, and may have a functionalized surface including derivitization with alcohol or carboxylic acid groups. Nanotube length may be from 100 nm up to 50 microns, more preferably 100 nm to 2 microns, and more preferably 0.5 microns to 2 microns. Nanotube diameter may be less than 50 nm, preferably less than 25 nm and more preferably from 1-2 nm. Nanotubes 16 may be thoroughly rinsed, or used as is. When used as is, trace impurities may be present including unreacted carbon precursors or carbon in other phases, oxidized materials, nanotube synthesis materials such as cobalt containing compounds, and other impurities. Nanotubes 16 may also be processed before use to make them more beneficial for use in thin film nanocomposite membranes. For instance laser ablation or treatment with a strong acid can be used to shorten the average length of the nanotubes. Ultra-high pressure homogenization, for instance by a Microfluidizer® may be used to break up nanoparticle bundles and to shorten average nanoparticle length.

In some instances it may be preferred to align nanotubes 16 within the membrane. For example in some instances it may preferred to align nanotubes 16 normal to the superficial membrane surface. This can be used for example in situations where transport occurs through the interior of the nanotube and the smallest length of nanotube is desired to minimize resistance to transport. This can be accomplished by utilizing a magnetic catalyst that is incorporated with at least some and preferably a plurality of each of the nanotubes of nanotubes 16. In this case a magnetic field may be used during the interfacial polymerization to then trap nanotubes 16 in this configuration. In a similar manner, surfactants may be used to align nanotubes 16, particularly when used in the aqueous phase. Suitable surfactants include; Alkyl poly(ethylene oxide), Copolymers of poly (ethylene oxide) and polypropylene oxide) (commercially called Poloxamers or Poloxamines), Alkyl polyglucosides including Octyl glucoside or Decyl maltoside, Fatty alcohols including Cetyl alcohol or Oleyl alcohol, Cocamide MEA, or cocamide DEA. It may also be possible to use other nonionic, cationic, anionic, or zwitterionic surfactants to aid in aligning the nanoparticles.

In other instances the preferred alignment may be in the plane of membrane 10. This allows much longer nanotubes 16 to be used that can impart improved mechanical properties to thin film nanocomposite membrane 10. To accomplish this, shear may be applied to the coating solution, for instance by application of the amine or organic solution by a slot die coating method, or a dip coating process. Nanotubes 16 may be aligned by this method in either the aqueous or organic solution.

Nanocomposite TFC membranes 10 containing nanotubes 16 can also have surprising biocidal activity. It appears that in some instances that partially exposed nanotubes 16 may be able to pierce, or cut the cell wall of microorganisms leading to cell death. In this way the membrane surface exhibits antimicrobial activity.

An aqueous solution of 4.0 wt % MPD, 4.5 wt % TEACSA and 0.06 wt % SLS in DI water was prepared. An Isopar G solution with 0.3 wt % TMC and 0.1% carbon nanotubes 16 (0.5-2 micron long single wall) was also prepared and sonicated for 60 minutes. The membrane was prepared as described above. The membrane was then dried at 95 C for 6 minutes. Performance is shown in example 44.

|  | Average Flux (gfd) | Average Rejection (%) |
|---|---|---|
| Control | 22.1 (2.5) | 99.66 (0.11) |
| 0.1% Carbon Nanotubes | 28.5 (1.8) | 99.64 (0.08) |

Section D: Tables I-XII, Examples 1-172

| Ex.# | MPD | TMC | MPD/TMC RATIO | AQ NP | ORG NP | ORG ADDITIVE | % FLUX IMPROVEMENT | FLUX | REJ. |
|---|---|---|---|---|---|---|---|---|---|
| | | | | I. CONTROL MEMBRANE (NO ADDITIVES) | | | | | |
| 1 | 4% MPD | 0.30% TMC | 13.3 | | | | | 22.6 GFD | 99.68% |

| | | | | | | | | |
|---|---|---|---|---|---|---|---|---|
| | II. HYBRID MEMBRANES WITH LTA NP/ALKALINE EARTH ADDITIVES/mhTMC | | | | | | | |
| 2 | 4% MPD | 0.30% TMC | 13.3 | 0.05% LTA | | 0.058% Sr(f6acac)2 | 63% | 36.8 GFD | 99.57% |
| 3 | 4% MPD | 0.30% TMC | 13.3 | 0.1% LTA | | 0.116% Sr(f6acac)2 | 87% | 42.3 GFD | 98.44% |
| 4 | 3% MPD | 0.20% TMC | 15.0 | 0.1% LTA | | 0.116% Sr(f6acac)2 | | 40.7 GFD | 99.20% |
| 5 | 3% MPD | 0.40% TMC | 7.5 | 0.1% LTA | | 0.116% Sr(f6acac)2 | | 39.3 GFD | 99.12% |
| 6 | 5% MPD | 0.20% TMC | 25.0 | 0.1% LTA | | 0.116% Sr(f6acac)2 | | 40.3 GFD | 99.41% |
| 7 | 5% MPD | 0.40% TMC | 12.5 | 0.1% LTA | | 0.116% Sr(f6acac)2 | | 31.3 GFD | 99.27% |
| 8 | 4% MPD | 0.30% TMC | 13.3 | 0.05% LTA | | 0.06% Sr(f6acac)2 0.02% mhTMC lot 2 | 88% | 42.4 GFD | 99.16% |
| 9 | 4% MPD | 0.30% TMC | 13.3 | | 0.05% LTA | 0.058% Sr(f6acac)2 | 57% | 35.5 GFD | 99.48% |
| 10 | 4% MPD | 0.30% TMC | 13.3 | | 0.1% LTA | 0.116% Sr(f6acac)2 | 77% | 40 GFD | 98.63% |
| 11 | 3% MPD | 0.40% TMC | 7.5 | | 0.1% LTA | 0.116% Sr(f6acac)2 | | 29.5 GFD | 98.61% |
| 12 | 5% MPD | 0.40% TMC | 12.5 | | 0.1% LTA | 0.116% Sr(f6acac)2 | | 30.3 GFD | 99.15% |
| 13 | 4% MPD | 0.30% TMC | 13.3 | | 0.05% LTA | 0.06% Sr(f6acac)2 0.02% mhTMC lot 2 | 25% | 28.2 GFD | 98.81% |
| 14 | 4% MPD | 0.30% TMC | 13.3 | 0.05% LTA | | 0.09% Ca(F6acac)2 0.02% mhTMC lot 2 | 69% | 38.1 GFD | 99.31% |
| 15 | 4% MPD | 0.30% TMC | 13.3 | | 0.05% LTA | 0.09% Ca(F6acac)2 0.02% mhTMC lot 2 | 52% | 34.4 GFD | 95.11% |
| 16 | 4% MPD | 0.30% TMC | 13.3 | 0.05% LTA | | 0.09% Ca(F6acac)2 | 1% | 22.9 GFD | 99.53% |
| 17 | 4% MPD | 0.30% TMC | 13.3 | 0.05% LTA | | 0.44% Mg(F6acac)2 | 27% | 28.7 GFD | 99.71% |
| 18 | 4% MPD | 0.30% TMC | 13.3 | 0.05% LTA | | 0.11% Ca(acac)2 | 2% | 23.0 GFD | 99.60% |
| 19 | 4% MPD | 0.30% TMC | 13.3 | | 0.05% LTA | 0.09% Ca(F6acac)2 | 52% | 34.4 GFD | 99.02% |
| 20 | 4% MPD | 0.30% TMC | 13.3 | 0.05% LTA | | 0.02% Be(acac)2 | 8% | 24.3 GFD | 99.50% |
| | IIA.1 WITH LTA NP AND mhTMC | | | | | | | |
| 21 | 4% MPD | 0.30% TMC | 13.3 | 0.05% LTA | | 0.02% mhTMC lot 2 | 36% | 30.7 GFD | 99.63% |
| 22 | 4% MPD | 0.30% TMC | 13.3 | | 0.05% LTA | 0.02% mhTMC lot 2 | 14% | 25.8 GFD | 99.63% |
| | IIA.2 WITH LTA NP ONLY | | | | | | | |
| 23 | 2.75% MPD | 0.09% TMC | 30.6 | 0.05% LTA | | | | 30.2 GFD | 99.48% |
| 24 | 2.75% MPD | 0.09% TMC | 30.6 | 0.1% LTA | | | | 29.7 GFD | 97.29% |
| 25 | 4% MPD | 0.30% TMC | 13.3 | 0.05% LTA | | | 16% | 26.2 GFD | 99.17% |
| 26 | 4% MPD | 0.30% TMC | 13.3 | | 0.05% LTA | | 0% | 22.6 GFD | 98.77% |
| 27 | 2.75% MPD | 0.09% TMC | 30.6 | | 0.05% LTA | | | 30.1 GFD | 99.56% |
| 28 | 2.75% MPD | 0.09% TMC | 30.6 | | 0.1% LTA | | | 28.5 GFD | 99.62% |
| | IIA.3 WITH ALKALINE EARTH ADDITIVES ONLY | | | | | | | |
| 29 | 4% MPD | 0.30% TMC | 13.3 | | | 0.09% Ca(F6acac)2 | 10% | 24.8 GFD | 99.63% |
| 30 | 4% MPD | 0.30% TMC | 13.3 | | | 0.058% Sr(f6acac)2 | 31% | 29.7 GFD | 99.57% |
| 31 | 4% MPD | 0.30% TMC | 13.3 | | | 0.02% mhTMC lot 2 | 31% | 29.5 GFD | 99.24% |
| 32 | 4% MPD | 0.30% TMC | 13.3 | | | 0.44% Mg(f6acac)2 | 24% | 28.0 GFD | 99.6% |
| 33 | 4% MPD | 0.30% TMC | 13.3 | | | 0.11% Ca(acac)2 | 23% | 27.9 GFD | 99.58% |
| 34 | 4% MPD | 0.30% MC | 13.3 | | | 0.048% Be(acac)2 | 29% | 29.2 GFD | 99.49% |
| | III. HYBRID EXEMPLAR with CuMOF NP & ALKALINE EARTH ADDITIVES | | | | | | | |
| 35 | 4% MPD | 0.30% TMC | 13.3 | | 0.05% Cu MOF | 0.058% Sr(f6acac)2 | 51% | 34.2 GFD | 99.53% |

-continued

| | | | | III.A EXEMPLAR WITH Cu MOF NP ONLY | | | | | |
|---|---|---|---|---|---|---|---|---|---|
| 36 | 4% MPD | 0.30% TMC | 13.3 | | 0.05% Cu MOF | | 8% | 24.3 GFD | 99.71% |
| | | | | IV. HYBRID EXEMPLAR with SiO2 NP & ALKALINE EARTH ADDITIVES | | | | | |
| 37 | 4% MPD | 0.30% TMC | 13.3 | 0.05% SiO2 | | 0.058% Sr(f6acac)2 | 62% | 36.6 GFD | 98.66% |
| | | | | IV.A EXEMPLAR WITH SiO2 NP ONLY | | | | | |
| 38 | 4% MPD | 0.30% TMC | 13.3 | 0.05% SiO2 | | | −1% | 22.3 GFD | 99.57% |
| | | | | V. HYBRID EXEMPLAR with ZEOLITE BETA NP & ALKALINE EARTH ADDITIVES | | | | | |
| 39 | 4% MPD | 0.30% TMC | 13.3 | 0.05% BETA | | 0.058% Sr(f6acac)2 | 33% | 30 GFD | 99.61% |
| | | | | V.A EXEMPLAR WITH ZEOLITE BETA NP ONLY | | | | | |
| 40 | 4% MPD | 0.30% TMC | 13.3 | 0.05% BETA | | | 0% | 22.7 GFD | 99.51% |
| | | | | VI. HYBRID EXEMPLAR with CARBON NANOTUBE NP & ALKALINE EARTH ADDITIVES | | | | | |
| 41 | 4% MPD | 0.30% TMC | 13.3 | | 0.05% NANOTUBE | 0.058% Sr(f6acac)2 | 72% | 38.76 GFD | 98.83% |
| 42 | 4% MPD | 0.30% TMC | 13.3 | | 0.05% NANOTUBE | 0.04% Ga(acac)3 | 39% | 31.5 GFD | 99.62% |
| 43 | 4% MPD | 0.30% TMC | 13.3 | | 0.05% NANOTUBE | 0.06% mhTMC | 62% | 36.5 GFD | 97.37% |
| | | | | VI.A EXEMPLAR WITH CARBON NANOTUBE NP ONLY | | | | | |
| 44 | 4% MPD | 0.30% TMC | 13.3 | | 0.1% NANOTUBE | | 26% | 28.5 GFD | 99.64% |
| | | | | VII. HYBRID EXEMPLAR with ZEOLITE FAU NP & ALKALINE EARTH ADDITIVES | | | | | |
| 45 | 4% MPD | 0.30% TMC | 13.3 | 0.05% FAU | | 0.058% Sr(f6acac)2 | 47% | 33.2 GFD | 99.42% |
| | | | | VIII. HYBRID MEMBRANES WITH LTA/ADDITIVE/mhTMC | | | | | |
| 46 | 4% MPD | 0.30% TMC | 13.3 | 0.05% LTA | | 0.04% Al(acac)3 | 56% | 35.3 GFD | 99.44% |
| 47 | 4% MPD | 0.30% TMC | 13.3 | 0.1% LTA | | 0.08% Al(acac)3 | 63% | 36.8 GFD | 98.81% |
| 48 | 3% MPD | 0.20% TMC | 15.0 | 0.1% LTA | | 0.08% Al(acac)3 | | 48.6 GFD | 98.37% |
| 49 | 3% MPD | 0.40% TMC | 7.5 | 0.1% LTA | | 0.08% Al(acac)3 | | 44.9 GFD | 98.69% |
| 50 | 5% MPD | 0.40% TMC | 12.5 | 0.1% LTA | | 0.08% Al(acac)3 | | 35.5 GFD | 99.13% |
| 51 | 4% MPD | 0.30% TMC | 13.3 | | 0.05% LTA | 0.04% Al(acac)3 | 48% | 33.4 GFD | 99.54% |
| 52 | 4% MPD | 0.30% TMC | 13.3 | | 0.1% LTA | 0.08% Al(acac)3 | 67% | 37.7 GFD | 99.32% |
| 53 | 3% MPD | 0.20% TMC | 15.0 | | 0.1% LTA | 0.08% Al(acac)3 | | 40.1 GFD | 99.22% |
| 54 | 3% MPD | 0.40% TMC | 7.5 | | 0.1% LTA | 0.08% Al(acac)3 | | 41.6 GFD | 98.61% |
| 55 | 5% MPD | 0.20% TMC | 25.0 | | 0.1% LTA | 0.08% Al(acac)3 | | 37.2 GFD | 99.30% |
| 56 | 5% MPD | 0.40% TMC | 12.5 | | 0.1% LTA | 0.08% Al(acac)3 | | 29.3 GFD | 99.32% |
| 57 | 4% MPD | 0.30% TMC | 13.3 | 0.05% LTA | | 0.04% Al(acac)3 0.02% mhTMC lot 2 | 41% | 31.8 GFD | 99.51% |
| 58 | 4% MPD | 0.30% TMC | 13.3 | | 0.05% LTA | 0.04% Al(acac)3 0.02% mhTMC lot 2 | 35% | 30.4 GFD | 99.58% |
| 59 | 4% MPD | 0.30% TMC | 13.3 | | 0.1% LTA | 0.08% Ga(acac)3 | 50% | 33.8 GFD | 99.54% |
| 60 | 4% MPD | 0.30% TMC | 13.3 | 0.05% LTA | | 0.03% Tributylphosphate | 19% | 26.9 GFD | 99.60% |
| 61 | 4% MPD | 0.30% TMC | 13.3 | 0.05% LTA | | 0.03% Triphenylphosphine | 85% | 41.7 GFD | 99.27% |
| 62 | 4% MPD | 0.30% TMC | 13.3 | 0.05% LTA | | 0.04% Pd(acac)2 | 4% | 23.5 GFD | 99.55% |
| 63 | 4% MPD | 0.30% TMC | 13.3 | 0.05% LTA | | 0.07% Hf(acac)4 | 3% | 23.3 GFD | 99.44% |
| 64 | 4% MPD | 0.30% TMC | 13.3 | 0.05% LTA | | 0.139%% Nd(f6acac)3 | 2% | 23.1 GFD | 99.35% |
| 65 | 4% MPD | 0.30% TMC | 13.3 | 0.05% LTA | | 0.029% Na(acac) | −1% | 22.4 GFD | 99.52% |

| # | MPD | TMC | | LTA | Additive | | | |
|---|---|---|---|---|---|---|---|---|
| 66 | 4% MPD | 0.30% TMC | 13.3 | 0.05% LTA | 0.06% Yb(acac)3 | −4% | 21.8 GFD | 99.50% |
| 67 | 4% MPD | 0.30% TMC | 13.3 | 0.05% LTA | 0.06% Er(acac)3 | 9% | 24.6 GFD | 99.53% |
| 68 | 4% MPD | 0.30% TMC | 13.3 | 0.05% LTA | 0.03% Zn(acac)2 | 4% | 23.4 GFD | 99.58% |
| 69 | 4% MPD | 0.30% TMC | 13.3 | 0.05% LTA | 0.034% K(acac) | 6% | 24.0 GFD | 99.66% |
| 70 | 4% MPD | 0.30% TMC | 13.3 | 0.05% LTA | 0.024% % Li(acac) | 4% | 23.5 GFD | 99.63% |
| 71 | 4% MPD | 0.30% TMC | 13.3 | 0.05% LTA | 0.107% % Dy(acac)3 | −9% | 20.6 GFD | 99.46% |
| 72 | 4% MPD | 0.30% TMC | 13.3 | 0.05% LTA | 0.113% Tb(acac)3 | −4% | 21.6 GFD | 99.51% |
| 73 | 4% MPD | 0.30% TMC | 13.3 | 0.05% LTA | 0.1%% Zr(acac)4 | 11% | 25.0 GFD | 99.51% |
| 74 | 4% MPD | 0.30% TMC | 13.3 | 0.05% LTA | 0.087% % Ni(acac)2 | −4% | 21.8 GFD | 99.53% |
| 75 | 4% MPD | 0.30% TMC | 13.3 | 0.05% LTA | 0.111% % Sm(acac)3 | 2% | 23.0 GFD | 99.60% |
| 76 | 4% MPD | 0.30% TMC | 13.3 | 0.05% LTA | 0.092% Mn(acac)3 | 21% | 27.4 GFD | 99.43% |
| 77 | 4% MPD | 0.30% TMC | 13.3 | 0.05% LTA | 0.093% Mn(acac)2 | 6% | 24.0 GFD | 99.61% |
| 78 | 4% MPD | 0.30% TMC | 13.3 | 0.05% LTA | 0.04% Fe(acac)3 | 31% | 29.7 GFD | 99.57% |
| 79 | 4% MPD | 0.30% TMC | 13.3 | 0.05% LTA | 0.05% Sn(bu)2(acac)2 | 71% | 38.7 GFD | 98.87% |
| 80 | 4% MPD | 0.30% TMC | 13.3 | 0.05% LTA | 0.04% Cu(f6acac)2 | 41% | 32.0 GFD | 99.24% |
| 81 | 4% MPD | 0.30% TMC | 13.3 | 0.05% LTA | 0.04% Co(acac)3 | 12% | 25.2 GFD | 99.50% |
| 82 | 4% MPD | 0.30% TMC | 13.3 | 0.05% LTA | 0.09% Pr(f6acac)3 | 91% | 43.3 GFD | 98.38% |
| 83 | 4% MPD | 0.30% TMC | 13.3 | 0.05% LTA | 0.06% Zn(f6acac)2 | 16% | 26.3 GFD | 99.61% |
| 84 | 4% MPD | 0.30% TMC | 13.3 | 0.05% LTA | 0.04% Cr(acac)3 | 23% | 27.8 GFD | 99.60% |
| 85 | 4% MPD | 0.30% TMC | 13.3 | 0.05% LTA | 0.05% In(acac)3 | 16% | 26.3 GFD | 99.37% |
| 86 | 4% MPD | 0.30% TMC | 13.3 | 0.05% LTA | 0.05% V(acac)3 | 26% | 28.4 GFD | 99.54% |
| 87 | 4% MPD | 0.30% TMC | 13.3 | 0.05% LTA | 0.04% Sn(acac)2Cl2 | 8% | 24.5 GFD | 99.61% |
| 88 | 4% MPD | 0.30% TMC | 13.3 | 0.05% LTA | 0.05% Ru(acac)3 | 24% | 28.0 GFD | 99.65% |
| 89 | 4% MPD | 0.30% TMC | 13.3 | 0.05% LTA | 0.038% MoO2(acac)2 | 2% | 23.0 GFD | 99.51% |
| 90 | 4% MPD | 0.30% TMC | 13.3 | 0.05% LTA | 0.03% Cu(acac)2 | 9% | 24.6 GFD | 99.39% |
| 91 | 4% MPD | 0.30% TMC | 13.3 | 0.05% LTA | 0.03% Sn(t-bu)2Cl2 | 5% | 23.8 GFD | 99.54% |
| 92 | 4% MPD | 0.30% TMC | 13.3 | 0.05% LTA | 0.04% Cd(acac)2 | 1% | 22.9 GFD | 99.58% |
| 93 | 4% MPD | 0.30% TMC | 13.3 | 0.05% LTA | 0.172%% Y(f6acac)3 | 8% | 24.4 GFD | 97.28% |
| VIIIB. EXEMPLARS WITH Additives ONLY | | | | | | | | |
| 94 | 4% MPD | 0.30% TMC | 13.3 | | 0.04% Al(acac)3 | 34% | 30.2 GFD | 99.38% |
| 95 | 4% MPD | 0.30% TMC | 13.3 | | 0.084% Fe(acac)3 | 90% | 42.9 GFD | 98.70% |
| 96 | 4% MPD | 0.30% TMC | 13.3 | | 0.1% Sn(bu)2(acac)2 | 117% | 49.1 GFD | 97.81% |
| 97 | 4% MPD | 0.30% TMC | 13.3 | | 0.085% Cu(f6acac)2 | 83% | 41.3 GFD | 98.98% |
| 98 | 4% MPD | 0.30% TMC | 13.3 | | 0.086% Co(acac)3 | 47% | 33.2 GFD | 99.62% |
| 99 | 4% MPD | 0.30% TMC | 13.3 | | 0.18% Pr(f6acac)3 | 46% | 33 GFD | 99.28% |
| 100 | 4% MPD | 0.30% TMC | 13.3 | | 0.12% Zn(f6acac)2 | 44% | 32.6 GFD | 99.63% |
| 101 | 4% MPD | 0.30% TMC | 13.3 | | 0.086% Cr(acac)3 | 37% | 31 GFD | 99.64% |
| 102 | 4% MPD | 0.30% TMC | 13.3 | | 0.1% In(acac)3 | 38% | 31.2 GFD | 99.30% |
| 103 | 4% MPD | 0.30% TMC | 13.3 | | 0.1% V(acac)3 | 28% | 28.9 GFD | 99.60% |

-continued

| Ex.# | MPD | TMC | MPD/TMC RATIO | ORG NP | ORG ADDITIVE | FLUX at 1 hr | FLUX at 47 hrs | REJ. |
|---|---|---|---|---|---|---|---|---|
| 104 | 4% MPD | 0.30% TMC | 13.3 | | 0.086% Sn(acac)2Cl2 | 27% | 28.8 GFD | 99.46% |
| 105 | 4% MPD | 0.30% TMC | 13.3 | | 0.092% Ru(acac)3 | 23% | 27.8 GFD | 99.72% |
| 106 | 4% MPD | 0.30% TMC | 13.3 | | 0.076% MoO2(acac)2 | 31% | 29.5 GFD | 99.53% |
| 107 | 4% MPD | 0.30% TMC | 13.3 | | 0.06% Cu(acac)2 | 19% | 26.8 GFD | 99.48% |
| 108 | 4% MPD | 0.30% TMC | 13.3 | | 0.065% Sn(t-bu)2Cl2 | 17% | 26.5 GFD | 99.07% |
| 109 | 4% MPD | 0.30% TMC | 13.3 | | 0.072% Cd(acac)2 | 15% | 26 GFD | 99.70% |
| 110 | 4% MPD | 0.30% TMC | 13.3 | | 0.077% Pd(acac)2 | 15% | 25.9 GFD | 99.66% |
| 111 | 4% MPD | 0.30% TMC | 13.3 | | 0.013% Hf(acac)4 | 12% | 25.4 GFD | 99.55% |
| 112 | 4% MPD | 0.30% TMC | 13.3 | | 0.13% Nd(f6acac)3 | 11% | 25 GFD | 99.60% |
| 113 | 4% MPD | 0.30% TMC | 13.3 | | 0.029% Na(acac) | 11% | 25 GFD | 99.44% |
| 114 | 4% MPD | 0.30% TMC | 13.3 | | 0.11% Yb(acac)3 | 9% | 24.6 GFD | 99.52% |
| 115 | 4% MPD | 0.30% TMC | 13.3 | | 0.11% Er(acac)3 | 5% | 23.7 GFD | 99.62% |
| 116 | 4% MPD | 0.30% TMC | 13.3 | | 0.065% Zn(acac)2 | 4% | 23.6 GFD | 99.48% |
| 117 | 4% MPD | 0.30% TMC | 13.3 | | 0.034% K(acac) | 0% | 22.6 GFD | 99.44% |
| 118 | 4% MPD | 0.30% TMC | 13.3 | | 0.024% Li(acac) | −1% | 22.3 GFD | 99.54% |

| Ex.# | MPD | TMC | MPD/TMC RATIO | ORG NP | ORG ADDITIVE | FLUX at 1 hr | FLUX at 47 hrs | REJ. |
|---|---|---|---|---|---|---|---|---|
| IX. FOULING TEST | | | | | | | | |
| 119 | 4% MPD | 0.30% TMC | 13.3 | 0.1% LTA | | 22.5 GFD | 22.5 GFD | 98.50% |
| 120 | 4% MPD | 0.30% TMC | 13.3 | | 0.08% Ga(acac)3 | 30.8 GFD | 20.9 GFD | 99.53% |
| 121 | 4% MPD | 0.30% TMC | 13.3 | 0.1% LTA | 0.08% Ga(acac)3 | 31.9 GFD | 27.3 GFD | 99.42% |

| Ex.# | MPD | TMC | MPD/TMC RATIO | ORG ADDITIVE | ORGANIC FILTERED | FLUX | REJ. |
|---|---|---|---|---|---|---|---|
| X. IMPROVEMENTS WITH mhTMC IN TFC MEMBRANES | | | | | | | |
| 122 | 4% MPD | 0.30% TMC | 13.3 | 0% mhTMC lot 1 | NO | 24 GFD | 99.70% |
| 123 | 4% MPD | 0.30% TMC | 13.3 | 0.0094% mhTMC lot 1 | NO | 32.1 GFD | 99.60% |
| 124 | 4% MPD | 0.30% TMC | 13.3 | 0.028% mhTMC lot 1 | NO | 39.7 GFD | 98.60% |
| 125 | 4% MPD | 0.30% TMC | 13.3 | 0.031% mhTMC lot 1 | NO | 45.1 GFD | 96.20% |
| 126 | 4% MPD | 0.30% TMC | 13.3 | 0% mhTMC lot 2 | NO | 17.2 GFD | 99.62% |
| 127 | 4% MPD | 0.30% TMC | 13.3 | 0.005% mhTMC lot 2 | NO | 20.5 GFD | 99.54% |
| 128 | 4% MPD | 0.30% TMC | 13.3 | 0.01% mhTMC lot 2 | NO | 25.8 GFD | 99.45% |
| 129 | 4% MPD | 0.30% TMC | 13.3 | 0.02% mhTMC lot 2 | NO | 29.5 GFD | 99.24% |
| 130 | 4% MPD | 0.30% TMC | 13.3 | 0.03% mhTMC lot 2 | NO | 29.6 GFD | 99.05% |
| 131 | 4% MPD | 0.30% TMC | 13.3 | 0.04% mhTMC lot 2 | NO | 30.8 GFD | 98.18% |
| 132 | 4% MPD | 0.30% TMC | 13.3 | 0.05% mhTMC lot 2 | NO | 31.1 GFD | 97.69% |
| 133 | 4% MPD | 0.30% TMC | 13.3 | 0.06% mhTMC lot 2 | NO | 31.2 GFD | 96.07% |
| 134 | 4% MPD | 0.30% TMC | 13.3 | 0.1% mhTMC lot 2 | NO | 37.4 GFD | 92.25% |
| 135 | 4% MPD | 0.30% TMC | 13.3 | 0.03% mhTMC lot 2 | YES | 26.4 GFD | 99.56% |
| 136 | 4% MPD | 0.30% TMC | 13.3 | 0.06% mhTMC lot 2 | YES | 31.9 GFD | 99.11% |

| Ex.# | MPD | TMC | MPD/TMC Ratio | ORG NP | ORG ADDITIVE | % FLUX INCREASE | FLUX | REJ. |
|---|---|---|---|---|---|---|---|---|
| XI. EFFECT OF TMC CONCENTRATION ON ADDITIVE FLUX INCREASE ||||||||
| 137 | 4% MPD | 0.30% TMC | 13.33 | | 0.1% Al(acac)3 | | 31 GFD | 99.05% |
| 138 | 4% MPD | 0.30% TMC | 13.33 | | 0.062% Tributylphosphate | | 31.8 GFD | 99.37% |
| 139 | 4% MPD | 0.30% TMC | 13.33 | | 0.08% Ga(acac)3 | | 32 GFD | 99.64% |
| 140 | 4% MPD | 0.30% TMC | 13.33 | | 0.116% Sr(f6acac)2 | | 32.2 GFD | 99.38% |
| 141 | 3.2% MPD | 0.17% TMC | 18.82 | | 0.1% Al(acac)3 | 76% | | 98.33% |
| 142 | 3.2% MPD | 0.30% TMC | 10.67 | | 0.1% Al(acac)3 | 80% | | 98.86% |
| 143 | 4% MPD | 0.17% TMC | 23.53 | | 0.1% Al(acac)3 | 29% | | 95.23% |
| 144 | 4% MPD | 0.30% TMC | 13.33 | | 0.1% Al(acac)3 | 102% | | 99.05% |
| 145 | 2.5% MPD | 0.09% TMC | 27.78 | | 0.062% Tributylphosphate | 10% | | 99.32% |
| 146 | 2.5% MPD | 0.30% TMC | 8.33 | | 0.062% Tributylphosphate | 48% | | 99.19% |
| 147 | 2.5% MPD | 0.50% TMC | 5.00 | | 0.062% Tributylphosphate | 85% | | 98.92% |
| 148 | 4% MPD | 0.09% TMC | 44.44 | | 0.062% Tributylphosphate | −28% | | 91.64% |
| 149 | 4% MPD | 0.30% TMC | 13.33 | | 0.062% Tributylphosphate | 44% | | 99.37% |
| 150 | 4% MPD | 0.50% TMC | 8.00 | | 0.062% Tributylphosphate | 44% | | 99.00% |
| 151 | 2.5% MPD | 0.10% TMC | 25.00 | | 0.08% Ga(acac)3 | 20% | | 99.00% |
| 152 | 2.5% MPD | 0.20% TMC | 12.50 | | 0.08% Ga(acac)3 | 31% | | 99.11% |
| 153 | 2.5% MPD | 0.30% TMC | 8.33 | | 0.08% Ga(acac)3 | 42% | | 99.48% |
| 154 | 2.5% MPD | 0.40% TMC | 6.25 | | 0.08% Ga(acac)3 | 34% | | 99.32% |
| 155 | 2.5% MPD | 0.50% TMC | 5.00 | | 0.08% Ga(acac)3 | 23% | | 99.22% |
| 156 | 4% MPD | 0.10% TMC | 40.00 | | 0.08% Ga(acac)3 | 29% | | 24.05% |
| 157 | 4% MPD | 0.20% TMC | 20.00 | | 0.08% Ga(acac)3 | 34% | | 99.37% |
| 158 | 4% MPD | 0.30% TMC | 13.33 | | 0.08% Ga(acac)3 | 28% | | 99.64% |
| 159 | 4% MPD | 0.40% TMC | 10.00 | | 0.08% Ga(acac)3 | 42% | | 99.50% |
| 160 | 4% MPD | 0.50% TMC | 8.00 | | 0.08% Ga(acac)3 | 57% | | 99.55% |
| 161 | 2.5% MPD | 0.09% TMC | 27.78 | | 0.116% Sr(f6acac)2 | 1% | | 99.25% |
| 162 | 2.5% MPD | 0.30% TMC | 8.33 | | 0.116% Sr(f6acac)2 | 53% | | 99.21% |
| 163 | 2.5% MPD | 0.50% TMC | 5.00 | | 0.116% Sr(f6acac)2 | 46% | | 99.11% |
| 164 | 4% MPD | 0.09% TMC | 44.44 | | 0.116% Sr(f6acac)2 | 13% | | 23.38% |
| 165 | 4% MPD | 0.30% TMC | 13.33 | | 0.116% Sr(f6acac)2 | 46% | | 99.38% |
| 166 | 4% MPD | 0.50% TMC | 8.00 | | 0.116% Sr(f6acac)2 | 34% | | 99.11% |
| XII. EFFECT OF TMC CONCENTRATION ON ADDITIVE FLUX INCREASE ||||||||
| 167 | 6% MPD | 0.20% TMC | 30.00 | | 0.05% Al(acac)3 | 55% | 37.6 GFD | 98.73% |
| 168 | 6% MPD | 0.30% TMC | 20.00 | | 0.05% Ga(acac)3 | 43% | 34.8 GFD | 98.43% |
| 169 | 6% MPD | 0.30% TMC | 20.00 | | 0.05% Fe(acac)3 | 41% | 34.2 GFD | 99.47% |
| 170 | 6% MPD | 0.30% TMC | 20.00 | | 0.08% Cr(acac)3 | 13% | 27.5 GFD | 98.21% |
| 171 | 6% MPD | 0.30% TMC | 20.00 | | 0.06% Tributylphosphate | 24% | 30.1 GFD | 99.51% |

| 172 | 6% MPD | 0.30% TMC | 20.00 | 0.06% Triphenylphosphine | 32% | 32 GFD | 97.45% |

Section E. Preparation and Testing Methodology for the Example Membranes

Fouling Example

Description of Nanoparticles Used
LTA: Linde Type A zeolite from Nanoscape. 100 nm Diameter freeze dried.
$SiO_2$: Ludox silica
Cu MOF: A metal organic framework complex prepared from Cu and trimesic acid as described in Science 283, 1148 (1999); Stephen S.-Y. Chui, et al. "[Cu3(TMA)2(H2O)3]n A Chemically Functionalizable Nanoporous Material"
FAU: Linde type Y zeolite as described in MICROPOROUS AND MESOPOROUS MATERIALS Volume: 59 Issue: 1 Pages: 13-28 Published: Apr. 18, 2003 by Holmberg B A, Wang H T, Norbeck J M, Yan Y S
Beta: Zeolite Beta as described in MICROPOROUS AND MESOPOROUS MATERIALS Volume: 25 Issue: 1-3 Pages: 59-74 Published: Dec. 9, 1998 by Camblor M A, Corma A, Valencia S

Aqueous Phase Nanoparticles. Example 2-8, 16-18, 20, 21, 23-25, 37-40, 45-50, 57, 60-93

To an aqueous dispersion of nanoparticles was added MPD, 4.5 wt % TEACSA and 0.06 wt % SLS in DI water. An Isopar G solution with TMC was also prepared and sonicated for 10 minutes. To this solution was added a homogenous solution of the molecular additive dissolved in an aromatic cosolvent (xylene or mesitylene). Final concentration of the cosolvent was 4 wt % by weight and the concentration of MPD, Nanoparticle, TMC, and molecular additive are listed in the tables.

A piece of wet polysulfone support was placed flat on a clean glass plate. An acrylic frame was then placed onto the membrane surface, leaving an area for the interfacial polymerization reaction to take place.

Aqueous MPD solution (50 mL) prepared as described previously was poured onto the framed membrane surface and remained for 1 min. The solution was drained by tilting the frame till no solution dripped from the frame.

The frame was taken off, and was left horizontally for 1 minute. The membrane was then clamped with the glass plate in four corners. An air knife was used to finish drying the membrane surface. The membrane was reframed using another clean and dry acrylic frame and kept horizontally for 1 min.

Organic solution (50 mL) was poured onto the framed membrane surface and remained for 2 min. The solution was drained by tilting the frame (vertically) till no solution dripped from the frame. The acrylic frame was removed, and the membrane was kept horizontally for 1 minute. The membrane was then dried at 95° C. for 6 minutes.

Organic Phase Nanoparticles. Example 9-13, 15, 19, 22, 26-28, 35, 36, 41-44, 51-56, 58, 59, 119, 121

An aqueous of MPD, 4.5 wt % TEACSA and 0.06 wt % SLS in DI water was prepared. An Isopar G solution with TMC and nanoparticle was also prepared and sonicated for 30 minutes. To this solution was added a homogenous solution of the molecular additive dissolved in an aromatic cosolvent (xylene or mesitylene). Final concentration of the cosolvent was 4 wt % by weight and the concentration of MPD, Nanoparticle, TMC, and molecular additive are listed in the tables.

A piece of wet polysulfone support was placed flat on a clean glass plate. An acrylic frame was then placed onto the membrane surface, leaving an area for the interfacial polymerization reaction to take place.

Aqueous MPD solution (50 mL) prepared as described previously was poured onto the framed membrane surface and remained for 1 min. The solution was drained by tilting the frame till no solution dripped from the frame.

The frame was taken off, and was left horizontally for 1 minute. The membrane was then clamped with the glass plate in four corners. An air knife was used to finish drying the membrane surface. The membrane was reframed using another clean and dry acrylic frame and kept horizontally for 1 min.

Organic solution (50 mL) was poured onto the framed membrane surface and remained for 2 min. The solution was drained by tilting the frame (vertically) till no solution dripped from the frame. The acrylic frame was removed, and the membrane was kept horizontally for 1 minute. The membrane was then dried at 95 C for 6 minutes.

Membranes without Nanoparticles. Example 14, 29-34, 94-118, 120, 126-136, 137-166

An aqueous solution of MPD, 4.5 wt % TEACSA and 0.06 wt % SLS in DI water was prepared. An Isopar G solution with TMC was also prepared and sonicated for 10 minutes. To this solution was added a homogenous solution of the molecular additive dissolved in an aromatic cosolvent (xylene or mesitylene). Final concentration of the cosolvent was 4 wt % by weight and the concentration of MPD, TMC, and molecular additive are listed in the tables.

A piece of wet polysulfone support was placed flat on a clean glass plate. An acrylic frame was then placed onto the membrane surface, leaving an area for the interfacial polymerization reaction to take place.

Aqueous MPD solution (50 mL) prepared as described previously was poured onto the framed membrane surface and remained for 1 min. The solution was drained by tilting the frame till no solution dripped from the frame.

The frame was taken off, and was left horizontally for 1 minute. The membrane was then clamped with the glass plate in four corners. An air knife was used to finish drying the membrane surface. The membrane was reframed using another clean and dry acrylic frame and kept horizontally for 1 min.

Organic solution (50 mL) was poured onto the framed membrane surface and remained for 2 min. The solution was drained by tilting the frame (vertically) till no solution dripped from the frame. The acrylic frame was removed, and the membrane was kept horizontally for 1 minute. The membrane was then dried at 95° C. for 6 minutes.

The percentage of flux improvement may then calculated relative to a control membrane made with the same concentration of MPD and TMC, with no nanoparticles or additives, as the increase in GFD divided by the GFD of the control.

Preparation of Membrane from Monohydrolyzed TMC. Examples 1, 122-125

An aqueous solution of 4.0 wt % MPD, 4.5 wt % TEACSA and 0.06 wt % SLS in DI water was prepared. An Isopar G solution with 0.3 wt % TMC was also prepared and sonicated for 10 minutes which also contained monohydrolyzed TMC as specified in the Tables. The Isopar solution was allowed to sit for 1 hour before use.

A piece of wet polysulfone support was placed flat on a clean glass plate. An acrylic frame was then placed onto the membrane surface, leaving an area for the interfacial polymerization reaction to take place.

Aqueous MPD solution (50 mL) prepared as described previously was poured onto the framed membrane surface and remained for 1 min. The solution was drained by tilting the frame till no solution dripped from the frame.

The frame was taken off, and was left horizontally for 1 minute. The membrane was then clamped with the glass plate in four corners. An air knife was used to finish drying the membrane surface. The membrane was reframed using another clean and dry acrylic frame and kept horizontally for 1 min.

Organic solution (50 mL) was poured onto the framed membrane surface and remained for 2 min. The solution was drained by tilting the frame (vertically) till no solution dripped from the frame. The acrylic frame was removed, and the membrane was kept horizontally for 1 minute. The membrane was then dried at 95° C. far 6 minutes.
See Table X.

The invention claimed is:

1. A reverse osmosis (RO) membrane, comprising:
   a porous support membrane; and
   a polyamide membrane discrimination layer on the porous support membrane, the discrimination layer comprising a molecular additive compound that is a beta-diketonate complex including an alkaline earth metal.

2. The RO membrane of claim 1, wherein the beta-diketonate complex includes an acetylacetonate (acac) ligand bound to the alkaline earth metal.

3. The RO membrane of claim 1, wherein the alkaline earth metal is Mg, Ca or Sr.

4. The RO membrane of claim 1, wherein the alkaline earth metal is Sr.

5. The RO membrane of claim 2, wherein the acac ligand includes a fluorine substituent.

6. The RO membrane of claim 2, wherein the acac ligand includes six fluorine substituents.

7. The RO membrane according to claim 1, wherein the molecular additive compound is $Sr(F_6(acac))_2$.

8. A method of purifying brackish water or seawater, comprising contacting the brackish water or seawater with an RO membrane of claim 1.

9. A method for preparing a RO membrane, comprising:
   preparing a first solution including a polyamine monomer;
   preparing a second solution including a polyfunctional acyl halide monomer; and
   forming a discrimination layer by an interfacial polymerization reaction of the first solution and the second solution, on a porous support membrane,
   wherein at least one of the first solution and the second solution includes a molecular additive compound that is a beta-diketonate complex including a beta-diketonate ligand bonded to an alkaline earth metal.

10. The method of claim 9, wherein the beta-diketonate complex includes an acac ligand bound to the alkaline earth metal.

11. The method of claim 10, wherein the acac ligand includes a fluorine substituent.

12. The method of claim 10, wherein the acac ligand includes six fluorine substituents.

13. The method of claim 9, wherein the alkaline earth metal is Mg, Ca or Sr.

14. The method of claim 9, wherein the alkaline earth metal is Sr.

15. The method of claim 9, wherein the molecular additive compound is $Sr(F_6(acac))_2$.

* * * * *